US011333346B1

(12) United States Patent
Masek et al.

(10) Patent No.: US 11,333,346 B1
(45) Date of Patent: May 17, 2022

(54) HANDLE-INTEGRATED COOKING SURFACE LIGHTING FOR LIDS OF GRILLS

(71) Applicant: Weber-Stephen Products LLC, Palatine, IL (US)

(72) Inventors: Douglas W. Masek, Palatine, IL (US); Nicholas M. Nanos, Jr., Crystal Lake, IL (US); Chris Crowell, Chicago, IL (US); Mark D'Ambrosio, Chicago, IL (US); James Keclik, McHenry, IL (US); Thomas J. Schnell, Jr., Chicago, IL (US); Kerry S. Berland, West Chicago, IL (US); Michael A. Graef, Aurora, IL (US); Nathan Mellas, Lenoir City, TN (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 0 days.

(21) Appl. No.: 17/472,254

(22) Filed: Sep. 10, 2021

Related U.S. Application Data

(60) Provisional application No. 63/120,530, filed on Dec. 2, 2020, provisional application No. 63/203,656, filed on Jul. 27, 2021.

(51) Int. Cl.
*F21V 33/00* (2006.01)
*A47J 37/07* (2006.01)

(52) U.S. Cl.
CPC ......... *F21V 33/008* (2013.01); *A47J 37/0786* (2013.01)

(58) Field of Classification Search
CPC .................... F21V 33/008; A47J 37/0786
See application file for complete search history.

(56) References Cited

U.S. PATENT DOCUMENTS

| 6,073,623 | A | 6/2000 | Maschhoff |
| 6,079,843 | A | 6/2000 | Latella et al. |
| 6,132,055 | A | 10/2000 | Grisamore et al. |
| 6,851,820 | B2 | 2/2005 | Choi et al. |
| 6,935,327 | B1 | 8/2005 | Williams et al. |

(Continued)

FOREIGN PATENT DOCUMENTS

| AU | 2005100137 | 5/2005 |
| CA | 2493654 | 7/2006 |

(Continued)

OTHER PUBLICATIONS

International Searching Authority, "International Search Report and Written Opinion," issued in connection with International Patent Application No. PCT/US2021/054222, dated Jan. 18, 2022, 10 pages.

*Primary Examiner* — Thomas M Sember
(74) *Attorney, Agent, or Firm* — Hanley, Flight & Zimmerman, LLC

(57) ABSTRACT

Example handle-integrated lighting assemblies including one or more lighting module(s) located substantially within a handle of a lid of a grill are described. An example lighting assembly configured to be coupled to a lid of a grill includes a handle and a lighting module. The handle includes a crossbar and a stem coupled to and oriented at an angle relative to the crossbar. The lighting module includes a light source located within the handle. The light source is configured to project light through the stem in a direction away from the crossbar.

23 Claims, 37 Drawing Sheets

(56) References Cited

U.S. PATENT DOCUMENTS

| | | | |
|---|---|---|---|
| 7,008,072 B2 | 3/2006 | Witzel et al. | |
| 7,104,667 B2 | 9/2006 | Keller | |
| 7,168,363 B1 | 1/2007 | Brown | |
| 7,222,620 B2 | 5/2007 | Wolter et al. | |
| 7,301,127 B1 | 11/2007 | Derridinger, Jr. | |
| 7,500,759 B2 | 3/2009 | Lin | |
| 7,559,320 B2 | 7/2009 | Chen | |
| 7,931,381 B2 | 4/2011 | Balbinotti et al. | |
| 9,261,281 B2 | 2/2016 | Reinhard-Herrscher et al. | |
| 9,909,754 B1 | 3/2018 | Reiter | |
| 10,240,763 B2 | 3/2019 | Chance | |
| 10,271,687 B2 | 4/2019 | Wenzel et al. | |
| 2004/0001334 A1* | 1/2004 | Choi | F21S 2/005 362/127 |
| 2004/0032729 A1 | 2/2004 | Choi et al. | |
| 2005/0092188 A1 | 5/2005 | Huegerich et al. | |
| 2005/0155597 A1* | 7/2005 | Wolter | F21V 33/008 126/25 R |
| 2007/0163568 A1 | 7/2007 | Murray et al. | |
| 2008/0196709 A1 | 8/2008 | Davis et al. | |
| 2008/0316731 A1 | 12/2008 | Choi et al. | |
| 2009/0122563 A1 | 5/2009 | Ko et al. | |
| 2010/0012165 A1 | 1/2010 | Bedard | |
| 2010/0027253 A1 | 2/2010 | Home | |
| 2011/0056477 A1 | 3/2011 | Leavens | |
| 2011/0273887 A1 | 11/2011 | Nilssen, II | |
| 2014/0077047 A1 | 3/2014 | Chance | |
| 2014/0090633 A1 | 4/2014 | Gleaton et al. | |
| 2018/0296032 A1 | 10/2018 | Wenzel et al. | |
| 2020/0046166 A1 | 2/2020 | Wenzel et al. | |

FOREIGN PATENT DOCUMENTS

| | | |
|---|---|---|
| CN | 208725545 | 4/2019 |
| EP | 3680560 | 7/2020 |
| WO | 9966278 | 12/1999 |

* cited by examiner

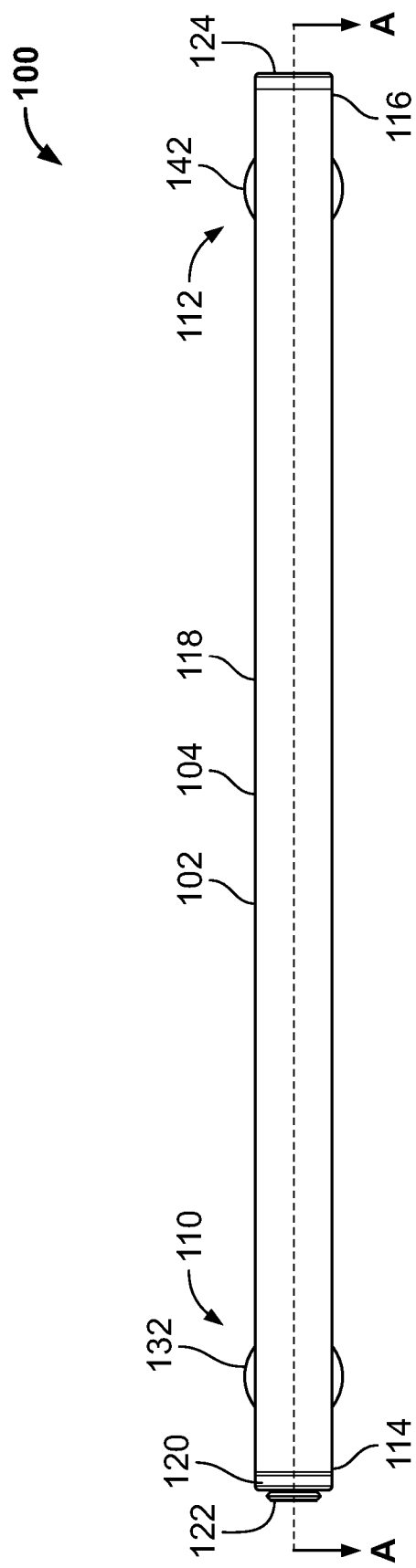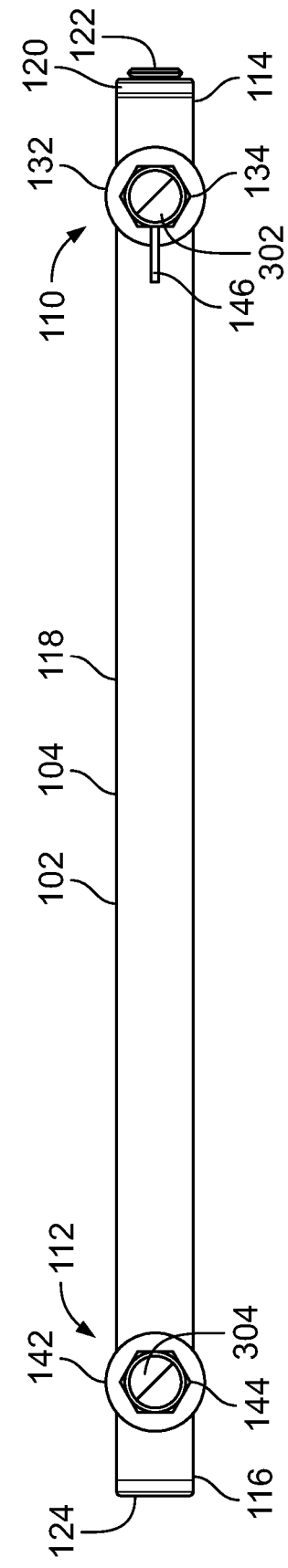
FIG 2
FIG 3

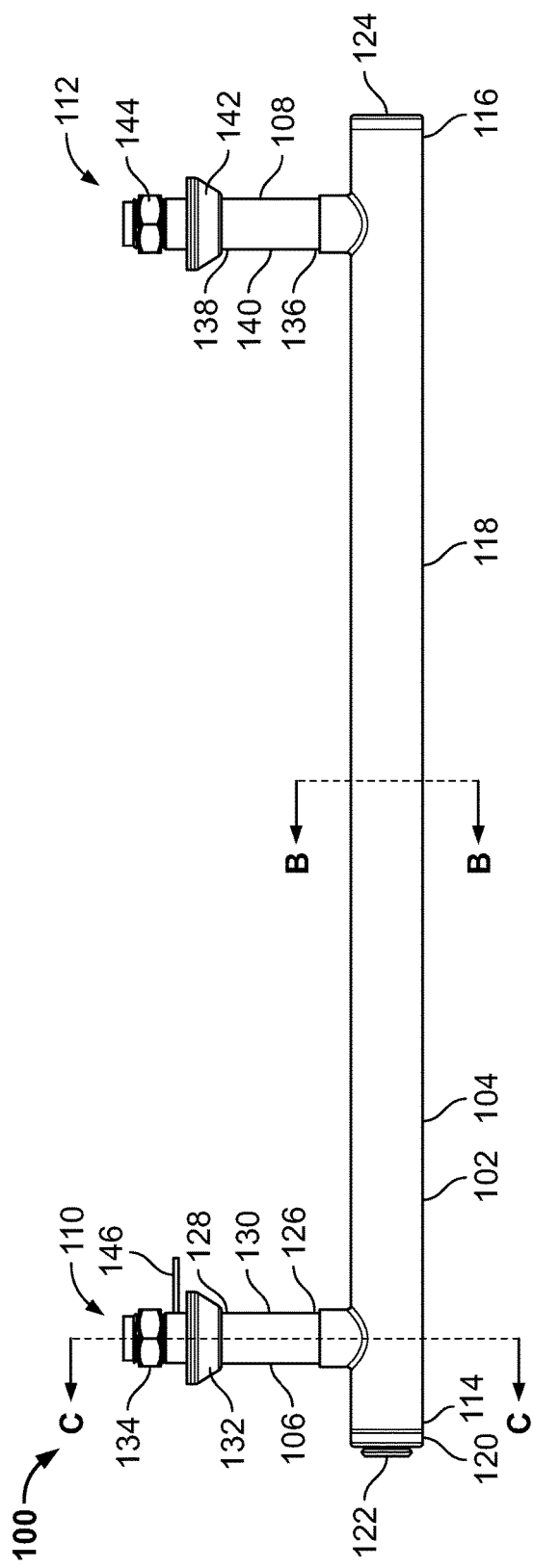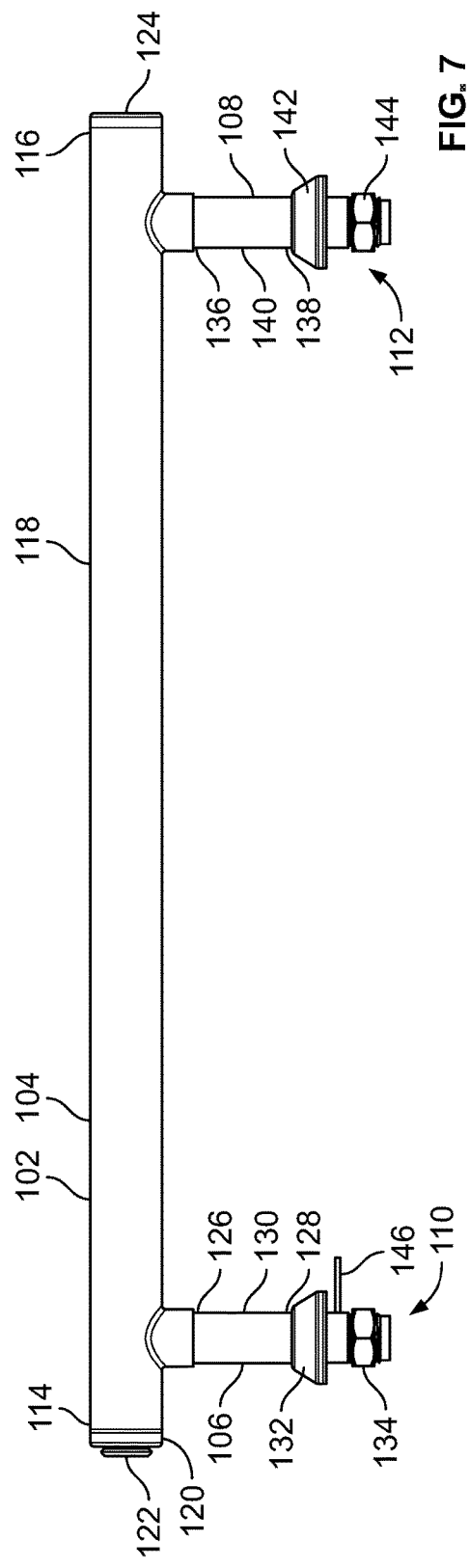

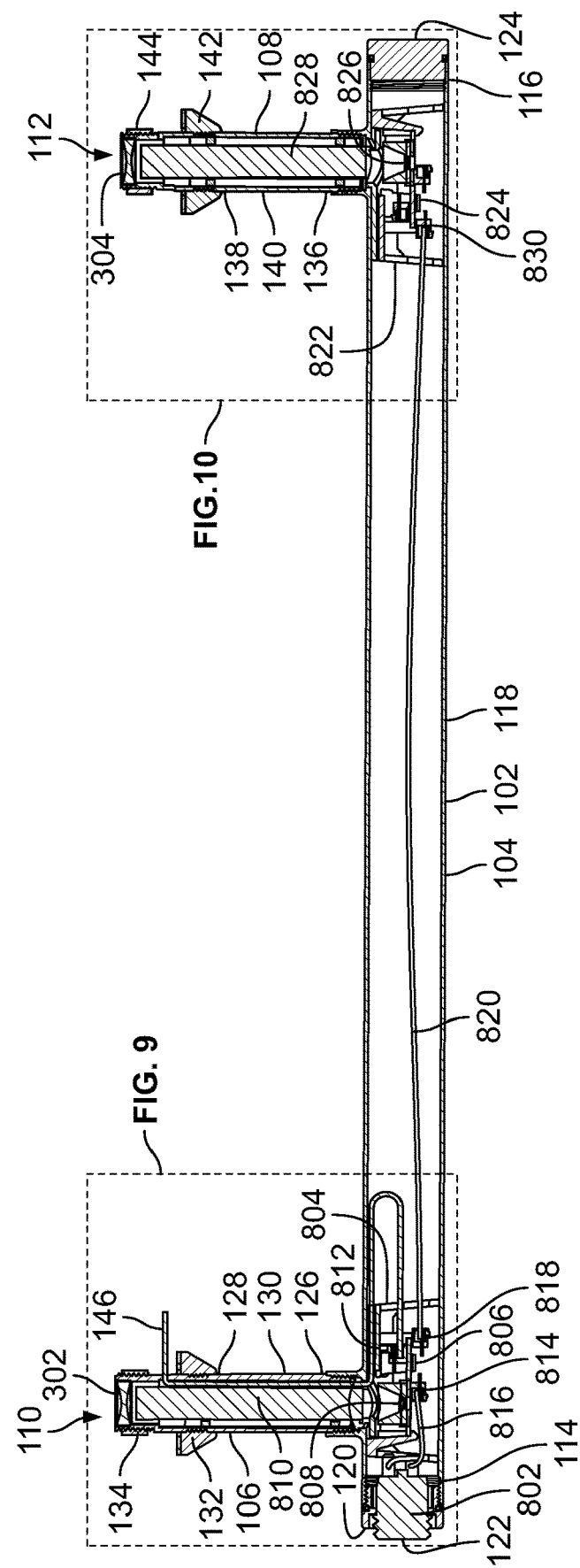

SECTION B-B

SECTION C-C

SECTION D-D

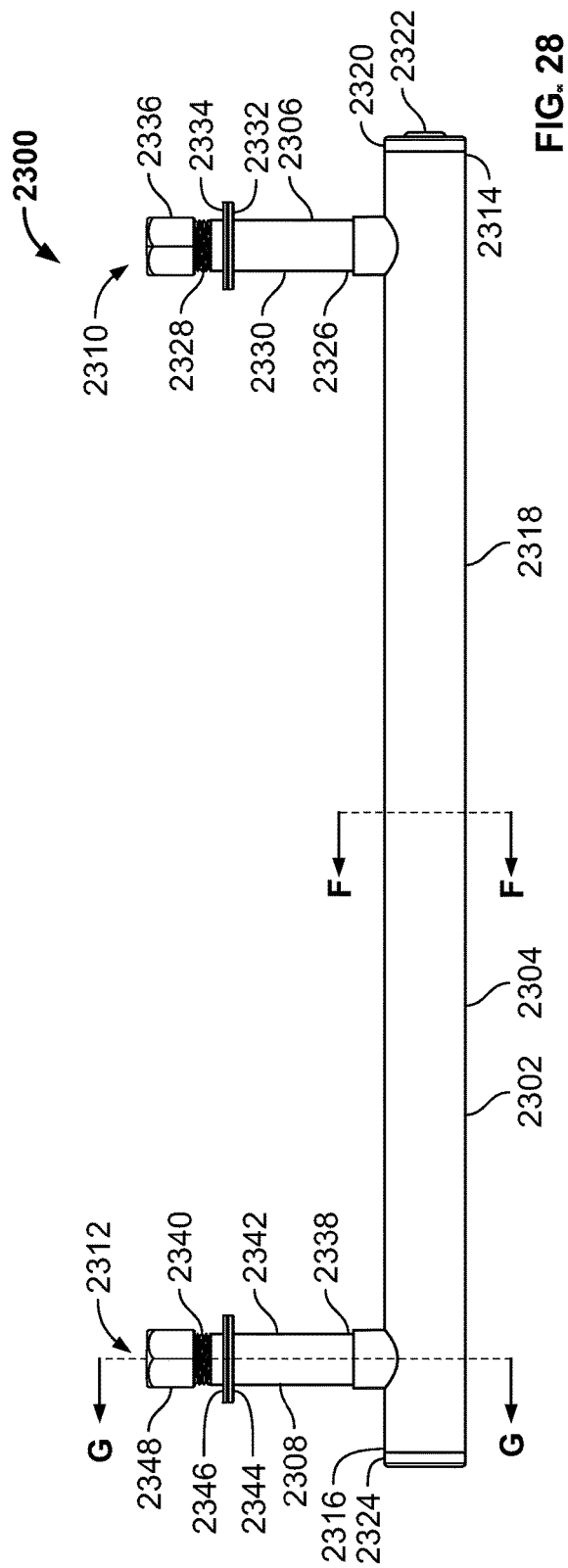
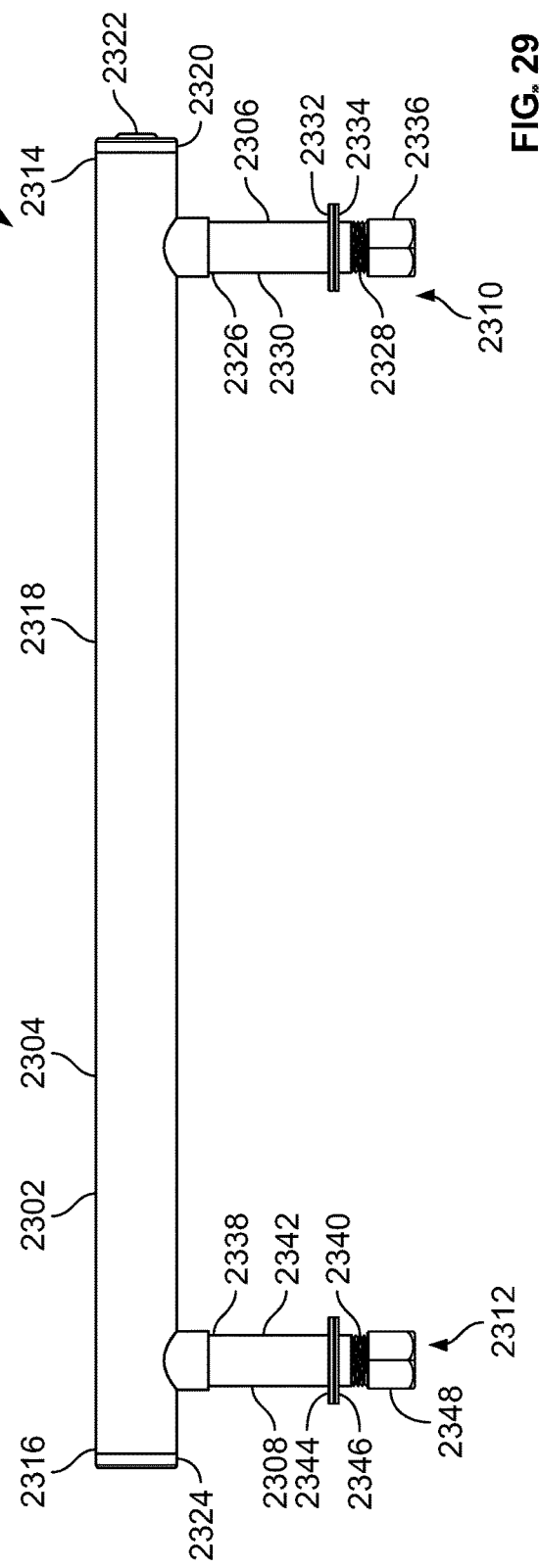

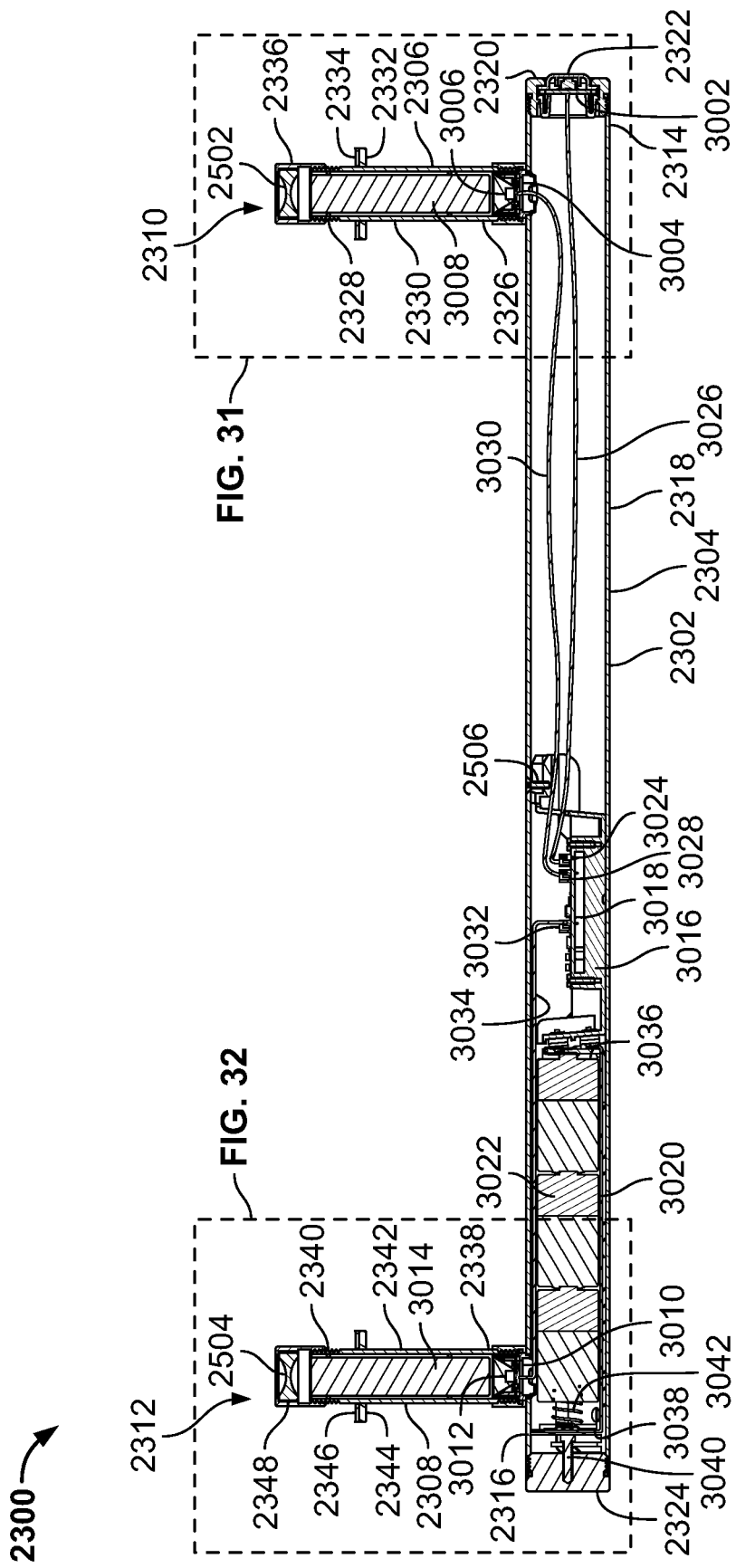

SECTION F-F

SECTION G-G

SECTION H-H

HANDLE-INTEGRATED COOKING SURFACE LIGHTING FOR LIDS OF GRILLS

RELATED APPLICATIONS

This application claims priority to U.S. Provisional Patent Application No. 63/203,656, filed Jul. 27, 2021, and to U.S. Provisional Patent Application No. 63/120,530, filed Dec. 2, 2020. The entireties of U.S. Provisional Patent Application No. 63/203,656 and U.S. Provisional Patent Application No. 63/120,530 are hereby incorporated by reference herein.

FIELD OF THE DISCLOSURE

This disclosure relates generally to cooking surface lighting and, more specifically, to handle-integrated cooking surface lighting for lids of grills.

BACKGROUND

Grills (e.g., gas grills, charcoal grills, pellet grills, electric grills, etc.) are routinely used during hours of the day where daylight is lacking. In the absence of adequate daylight, some form of auxiliary and/or supplemental lighting may be required for a user of the grill to visually monitor a cooking surface of the grill, including but not limited to visual monitoring of one or more food item(s) being cooked on the cooking surface of the grill.

In some instances, such auxiliary and/or supplemental cooking surface lighting can be provided via an overhead hardwired light source (e.g., a patio, deck, or garage light). Such overhead hardwired light sources are not always available however, and, even when available, often have shortcomings with regard to adequately directing and/or focusing light onto the cooking surface of the grill. In other instances, such auxiliary and/or supplemental cooking surface lighting can be provided via a user-controlled lighting instrument (e.g., a flashlight, a flash module of a smartphone, etc.). While such user-controlled lighting instruments have become relatively commonplace in terms of user availability, the use thereof disadvantageously occupies at least one hand of the user, which may in turn hamper the user's ability to perform one or more desired cooking operation(s) in connection with the food item(s) being cooked on the cooking surface of the grill.

The aforementioned shortcomings have more recently led to commercial efforts to provide auxiliary and/or supplemental cooking surface lighting via one or more light source(s) coupled to either the lid or the lid handle of the grill. For example, some known grills are equipped with halogen lighting modules located and/or positioned along an interior surface of the lid of the grill. In many instances, however, the lighting emitted by such halogen lighting modules has insufficient brightness. Replacing such surface-mounted halogen lid lighting with substantially brighter surface-mounted light-emitting diode (LED) based lid lighting has typically not been possible, as such surface-mounted LED lid lighting would likely not be able to withstand the high temperatures present in the cooking chamber of the grill, which the lid unavoidably forms a part of.

Lighting accessories in the form of handle-mountable lighting modules and/or lamps which are removably couplable to the outside of the lid handle are also known. In many instances, however, such handle-mountable lighting modules and/or lamps prove to be cumbersome to the user, as such handle-mountable lighting modules and/or lamps often interfere with the user's ability to interact in an unimpeded manner with food item(s) being cooked on the cooking surface of the grill.

BRIEF DESCRIPTION OF THE DRAWINGS

FIG. 2 is a front view of the handle-integrated lighting assembly of FIG. 1.

FIG. 3 is a rear view of the handle-integrated lighting assembly of FIGS. 1 and 2.

FIG. 6 is a top view of the handle-integrated lighting assembly of FIGS. 1-5.

FIG. 7 is a bottom view of the handle-integrated lighting assembly of FIGS. 1-6.

FIG. 8 is a cross-sectional view of the handle-integrated lighting assembly of FIGS. 1-7 taken along section A-A of FIG. 2.

FIG. 28 is a top view of the handle-integrated lighting assembly of FIGS. 23-27.

FIG. 29 is a bottom view of the handle-integrated lighting assembly of FIGS. 23-28.

FIG. 30 is a cross-sectional view of the handle-integrated lighting assembly of FIGS. 23-29 taken along section E-E of FIG. 24.

Figure 1:
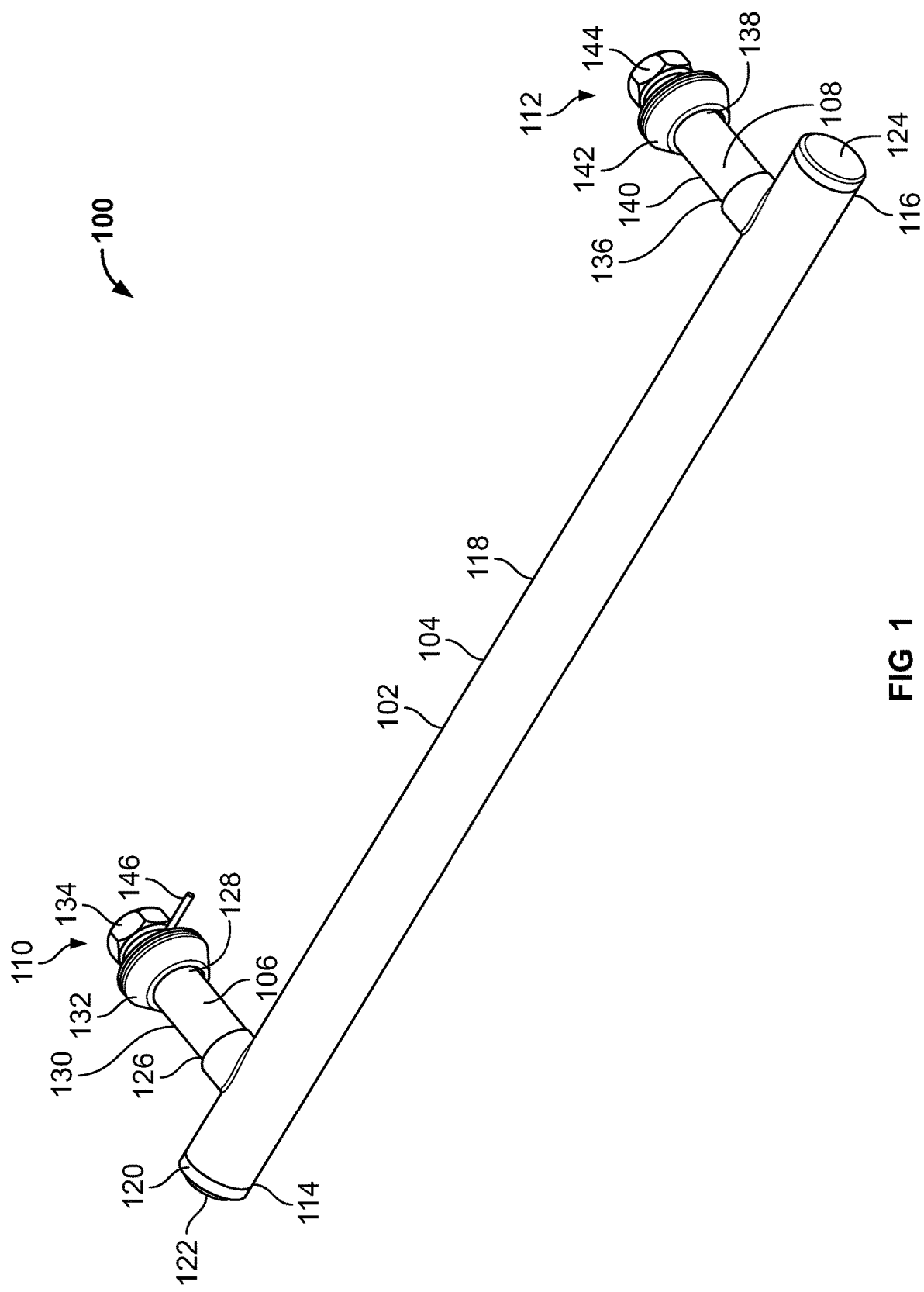
FIG. 1 is a perspective view of an example handle-integrated lighting assembly constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example handle-integrated lighting assemblies disclosed herein are configured to include one or more lighting module(s) located substantially within a handle of a lid of a grill, with the lighting module(s) being advantageously configured to emit and/or project light from one or more light source(s) of the lighting module(s) through one or more stem(s) of the handle, and from the stem(s) of the handle directly onto a cooking surface of the grill. Locating and/or positioning the lighting module(s) and/or, more specifically, the light source(s) of said lighting module(s) within the handle of the lid of the grill advantageously distances the lighting source(s) from being exposed to the high temperatures present in the cooking chamber of the grill, which in turn advantageously enables the lighting source(s) to be implemented as one or more high-brightness LED lamp(s) that offer superior brightness and lifespan relative to the surface-mounted halogen lamp(s) found in known commercial implementations of auxiliary and/or supplemental cooking surface lighting for grills. Locating and/or positioning the lighting module(s) within the handle of the lid of the grill also advantageously maintains the exterior of the handle of the grill in an unmodified and/or unencumbered state, which in turn advantageously maintains the user's ability to interact in an unimpeded manner with food item(s) being cooked on the cooking surface of the grill while at the same time obtaining the benefit of the cooking surface lighting provided by the handle-integrated lighting assembly of the grill.

Handle-integrated lighting assemblies disclosed herein accordingly provide enhanced usability and consumer experience opportunities associated with auxiliary and/or supplemental cooking surface lighting for a lid of a grill. The above-identified features as well as other advantageous features of example slidable waste management systems disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 4:
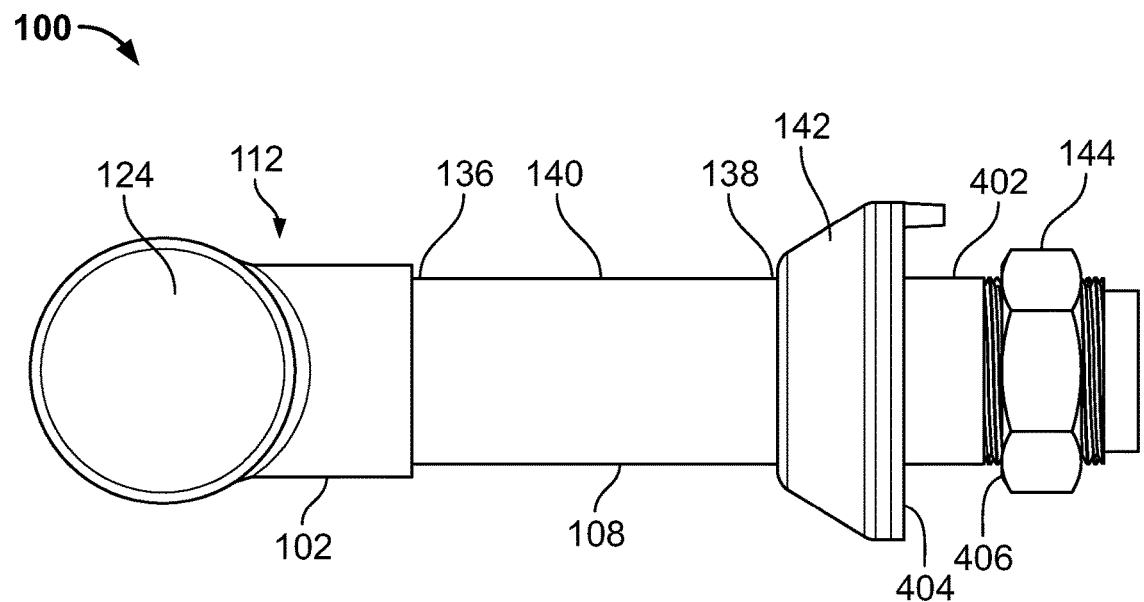
FIG. 4 is a right side view of the handle-integrated lighting assembly of FIGS. 1-3.
Figure 5:
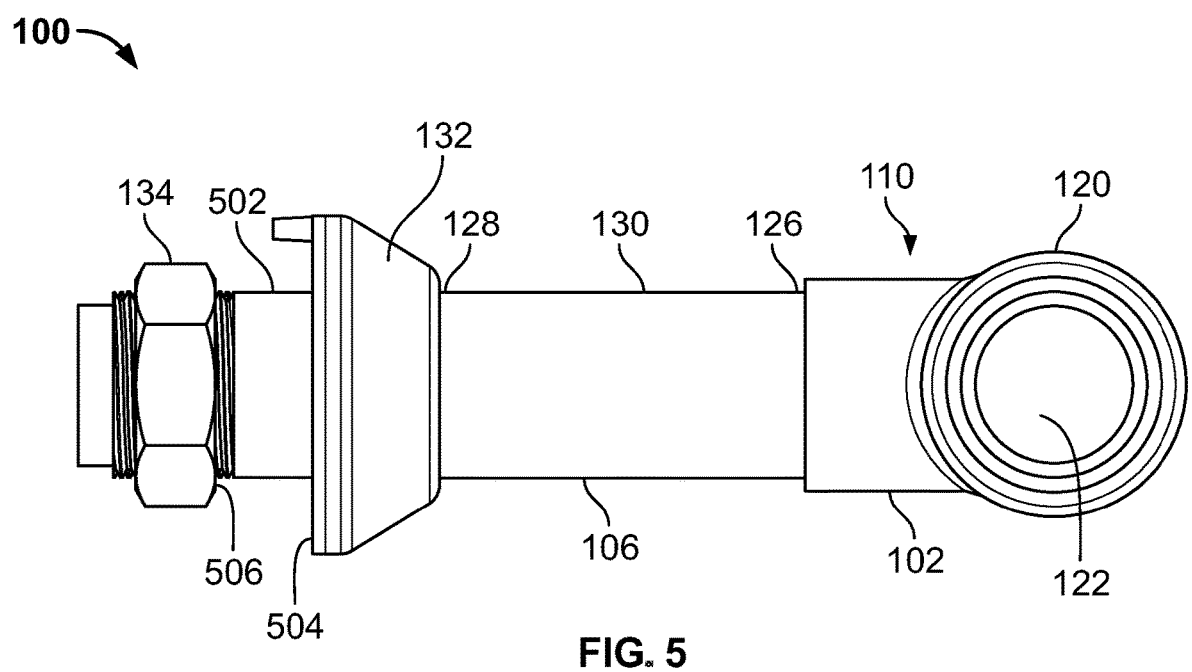
FIG. 5 is a left side view of the handle-integrated lighting assembly of FIGS. 1-4.
Figure 9:
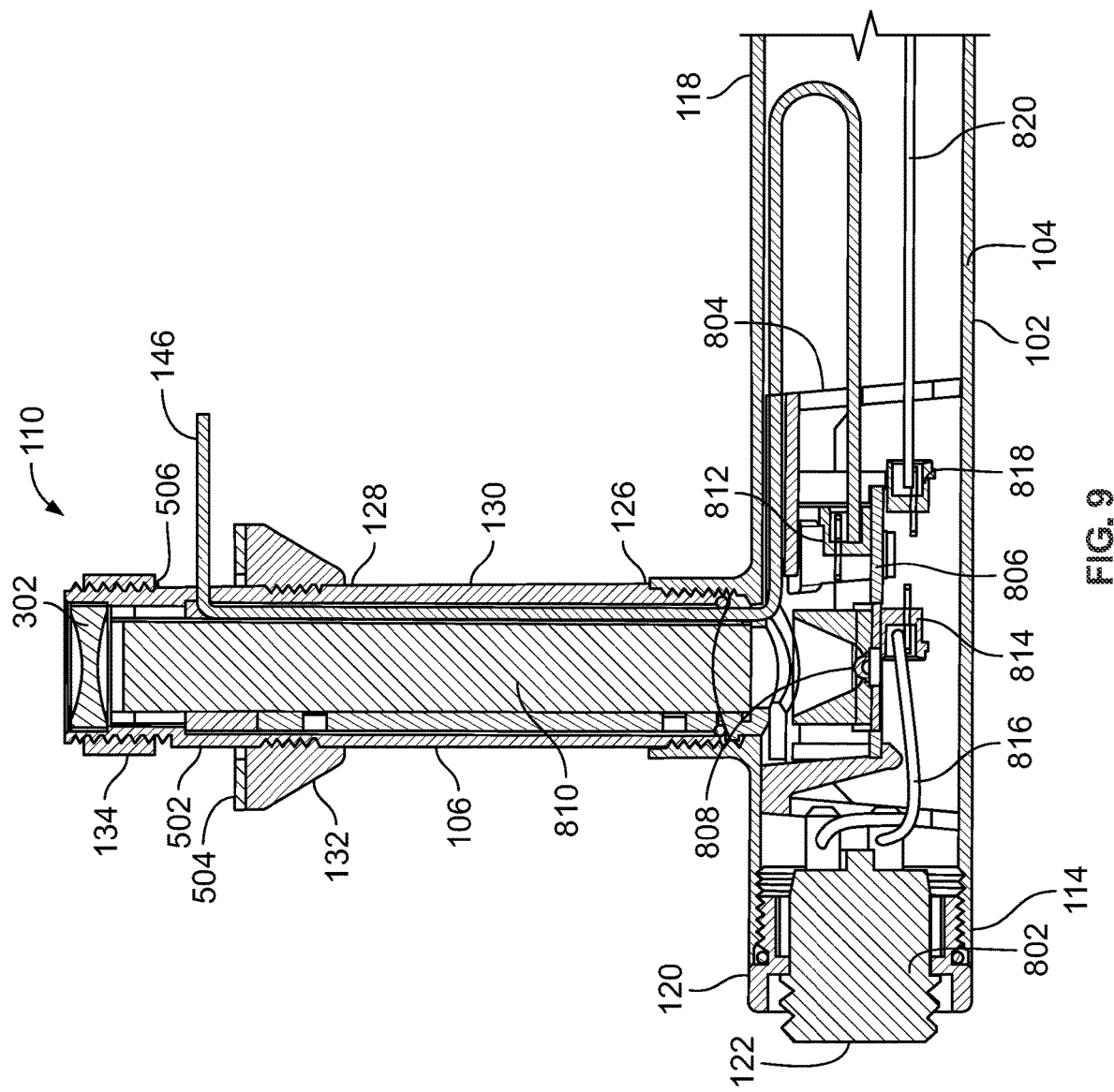
FIG. 9 is an enlarged view of a first portion of FIG. 8.
Figure 10:
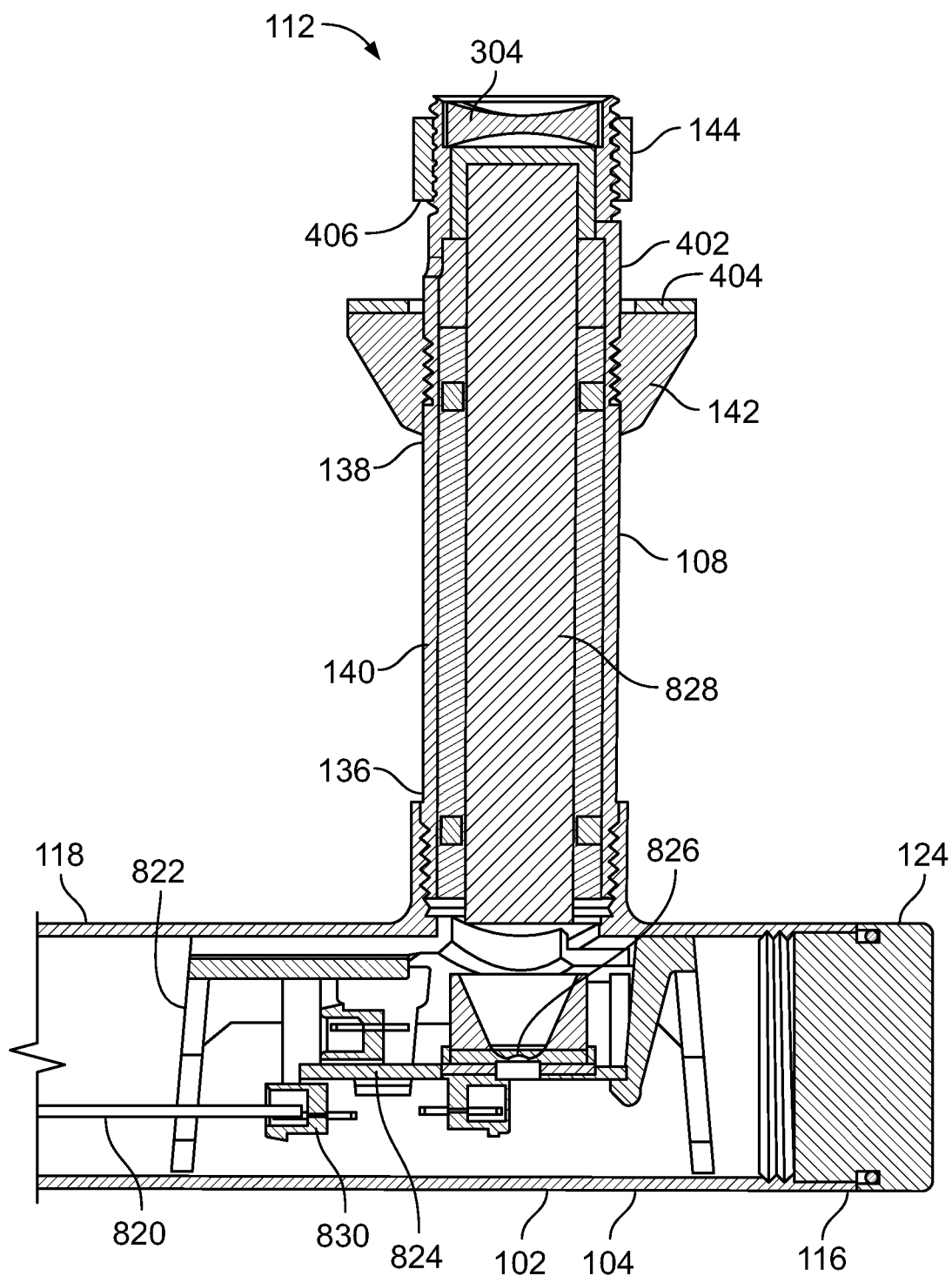
FIG. 10 is an enlarged view of a second portion of FIG. 8.
Figure 11:
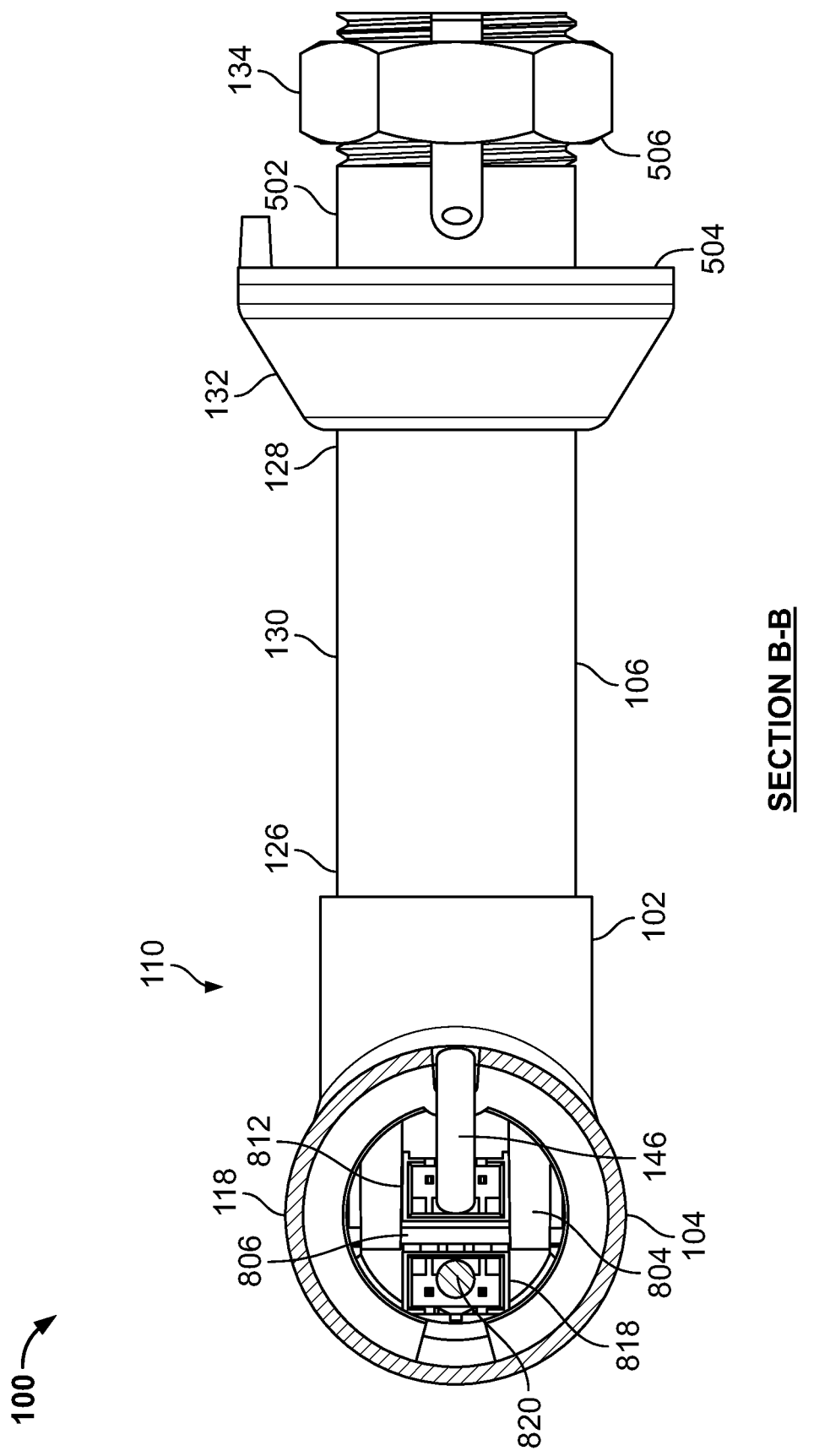
FIG. 11 is a cross-sectional view of the handle-integrated lighting assembly of FIGS. 1-10 taken along section B-B of FIG. 6.
Figure 12:
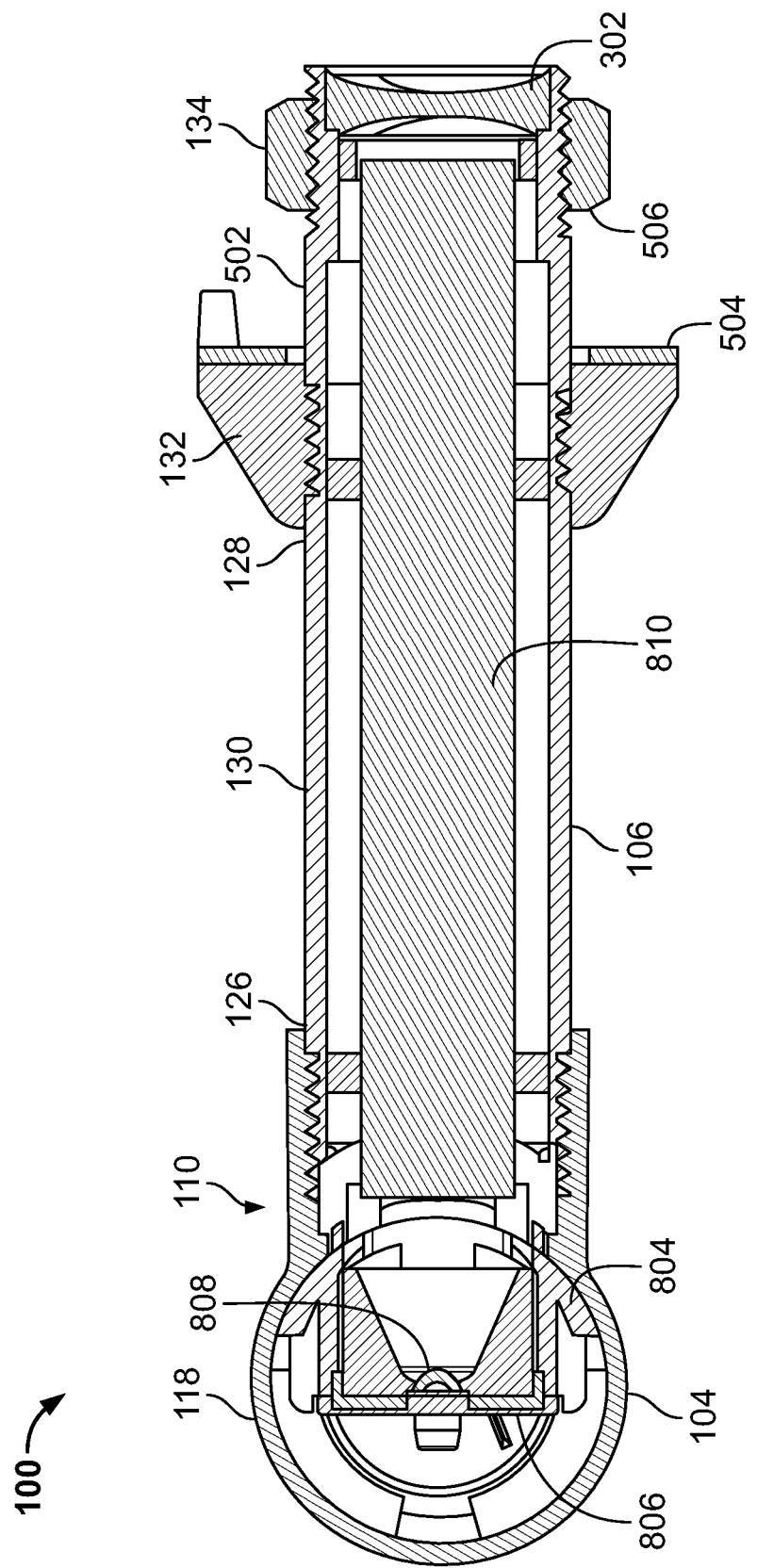
FIG. 12 is a cross-sectional view of the handle-integrated lighting assembly of FIGS. 1-11 taken along section C-C of FIG. 6.

FIG. 1 is a perspective view of an example handle-integrated lighting assembly 100 constructed in accordance with teachings of this disclosure. FIG. 2 is a front view of the handle-integrated lighting assembly 100 of FIG. 1. FIG. 3 is a rear view of the handle-integrated lighting assembly 100 of FIGS. 1 and 2. FIG. 4 is a right side view of the handle-integrated lighting assembly 100 of FIGS. 1-3. FIG. 5 is a left side view of the handle-integrated lighting assembly 100 of FIGS. 1-4. FIG. 6 is a top view of the handle-integrated lighting assembly 100 of FIGS. 1-5. FIG. 7 is a bottom view of the handle-integrated lighting assembly 100 of FIGS. 1-6. FIG. 8 is a cross-sectional view of the handle-integrated lighting assembly 100 of FIGS. 1-7 taken along section A-A of FIG. 2. FIG. 9 is an enlarged view of a first portion of FIG. 8. FIG. 10 is an enlarged view of a second portion of FIG. 8. FIG. 11 is a cross-sectional view of the handle-integrated lighting assembly 100 of FIGS. 1-10 taken along section B-B of FIG. 6. FIG. 12 is a cross-sectional view of the handle-integrated lighting assembly 100 of FIGS. 1-11 taken along section C-C of FIG. 6.

In the illustrated example of FIGS. 1-12, the handle-integrated lighting assembly 100 includes an example handle 102. The handle includes and/or is defined by an example crossbar 104, an example first stem 106 extending away from the crossbar 104, and an example second stem 108 spaced apart from the first stem 106 and extending away from the crossbar 104. The handle-integrated lighting assembly 100 of FIGS. 1-12 further includes an example first lighting module 110 located and/or positioned within (e.g., housed by) the first stem 106 and the crossbar 104 of the handle 102, and an example second lighting module 112 located and/or positioned within (e.g., housed by) the second stem 108 and the crossbar 104 of the handle 102.

The crossbar 104 of the handle 102 of FIGS. 1-12 includes an example first end 114, an example second end 116 located opposite the first end 114 of the crossbar 104, and an example sidewall 118 extending between the first end 114 and the second end 116 of the crossbar 104. The crossbar 104 of FIGS. 1-12 is a tubular structure (e.g., a hollow tube) having an internal volume and/or compartment configured to receive, house, and/or contain one or more component(s) of the first lighting module 110 and/or the second lighting module 112 of the handle-integrated lighting assembly 100. In the illustrated example of FIGS. 1-12, the sidewall 118 of the crossbar 104 has an annular (e.g., hollow circular) profile. In other examples, the sidewall 118 of the crossbar 104 can instead have a non-annular profile, such as a hollow rectangular profile, a hollow triangular profile, a hollow hexagonal profile, etc.

The handle-integrated lighting assembly 100 of FIGS. 1-12 further includes an example first end cap 120 located and/or positioned at and/or within the first end 114 of the crossbar 104 of the handle 102. In some examples, the first end cap 120 is coupled to the first end 114 of the crossbar 104 via a threaded connection. In other examples, the first end cap 120 can instead be coupled to the first end 114 of the crossbar 104 via a press fit, a fastener, an adhesive, a weld, or some other form of coupling mechanism. The first end cap 120 is configured to close off and/or seal the internal volume and/or compartment of the crossbar 104, thereby protecting one or more component(s) of the handle-integrated lighting assembly 100 located and/or positioned within said internal volume and/or compartment of the crossbar 104 from becoming exposed to moisture (e.g., from humidity, rain, snow, spilled fluids, etc.).

In the illustrated example of FIGS. 1-12, the first end cap 120 of the handle-integrated lighting assembly 100 includes an example button 122 that is actuatable (e.g., via a user) to selectively cause an example switch 802 located within and/or coupled to the first end cap 120 to close a circuit of the handle-integrated lighting assembly 100. When the switch 802 closes the circuit (e.g., in response to a user actuating the button 122), power is transmitted from a power source (e.g., a power supply, a battery, etc.) to the first lighting module 110 and/or the second lighting module 112 of the handle-integrated lighting assembly 100, thereby causing light to be generated by and/or projected from the first lighting module 110 and/or the second lighting module 112. When the switch 802 opens the circuit (e.g., in response to a user releasing the button 122, or actuating the button 122 a second time), power is no longer transmitted from the power source to the first lighting module 110 and/or the second lighting module 112 of the handle-integrated lighting assembly 100, and light is therefore no longer generated by and/or projected from the first lighting module 110 and/or the second lighting module 112.

In some examples, the switch 802 of FIGS. 1-12 is configured as an on/off switch. In such examples, a user must press and/or actuate the button 122 of the switch 802 two successive times to cycle the switch 802 and/or the circuit from an off state to an on state and back to an off state. In other examples, the switch 802 of FIGS. 1-12 can instead be configured as a momentary switch. In such examples, a user must press and hold the button 122 of the switch 802 to transition the switch 802 and/or the circuit from an off state to an on state. The user can thereafter release the button 122 of the switch 802 to transition the switch 802 and/or the circuit from the on state back to the off state. Implementing the switch 802 as a momentary switch (e.g., as opposed to an on/off switch) can be advantageous with regard to preserving the remaining amount of energy associated with the power source, and/or preventing instances in which a user might otherwise inadvertently leave the switch 802 and/or, more generally, the handle-integrated lighting assembly 100 in a powered (e.g., light generating) state.

The handle-integrated lighting assembly 100 of FIGS. 1-12 further includes an example second end cap 124 located and/or positioned at and/or within the second end 116 of the crossbar 104 of the handle 102. In some examples, the second end cap 124 is coupled to the second end 116 of the crossbar 104 via a threaded connection. In other examples, the second end cap 124 can instead be coupled to the second end 116 of the crossbar 104 via a press fit, a fastener, an adhesive, a weld, or some other form of coupling mechanism. The second end cap 124 is configured to close off and/or seal the internal volume and/or compartment of the crossbar 104, thereby protecting one or more component(s) of the handle-integrated lighting assembly 100 located and/or positioned within said internal volume and/or compartment of the crossbar 104 from becoming exposed to moisture (e.g., from humidity, rain, snow, spilled fluids, etc.).

The first stem 106 of the handle 102 of FIGS. 1-12 includes an example first end 126, an example second end 128 located opposite the first end 126 of the first stem 106, and an example sidewall 130 extending between the first end 126 and the second end 128 of the first stem 106. The first stem 106 of FIGS. 1-12 is a tubular structure (e.g., a hollow tube) having an internal volume and/or compartment configured to receive, house, and/or contain one or more component(s) of the first lighting module 110 of the handle-integrated lighting assembly 100. In the illustrated example of FIGS. 1-12, the sidewall 130 of the first stem 106 has an annular (e.g., hollow circular) profile. In other examples, the sidewall 130 of the first stem 106 can instead have a non-annular profile, such as a hollow rectangular profile, a hollow triangular profile, a hollow hexagonal profile, etc.

In some examples, the first stem 106 of the handle 102 is integrally formed with the crossbar 104 of the handle 102 such that the first stem 106 cannot be physically and/or mechanically separated from the crossbar 104 absent the use of destructive means. In other examples, the first stem 106 of the handle 102 can instead be coupled to the crossbar 104 of the handle 102 (e.g., via a threaded connection or a fastener located at the first end 126 of the first stem 106) such that the first stem 106 can be physically and/or mechanically separated from the crossbar 104 without the use of destructive means. In the illustrated example of FIGS. 1-12, the first stem 106 of the handle 102 is oriented at a perpendicular and/or orthogonal angle relative to the crossbar 104 of the handle 102. In other examples, the first stem 106 of the handle 102 can instead be oriented at a non-perpendicular and/or non-perpendicular angle relative to the crossbar 104 of the handle 102.

The handle-integrated lighting assembly 100 of FIGS. 1-12 further includes an example first fitting 132 and an example first locknut 134. In the illustrated example of FIGS. 1-12, the first fitting 132 is coupled (e.g., via a threaded connection) to the second end 128 of the first stem 106, and the first locknut 134 is coupled (e.g., via a threaded connection) to an example shaft portion 502 of the first fitting 132. The first fitting 132 and the first locknut 134 are respectively configured to couple the first stem 106 and/or, more generally, the handle 102 of the handle-integrated lighting assembly 100 of FIGS. 1-12 to a lid of a grill. In this regard, the shaft portion 502 of the first fitting 132 is configured to extend through a first handle mount opening formed in a front portion of the lid of the grill, whereby the first handle mount opening extends from an exterior wall and/or an exterior surface of the lid through to an interior wall and/or an interior surface of the lid. An example flange portion 504 of the first fitting 132 is configured to contact and/or engage the exterior wall and/or the exterior surface of the lid, and an example locking surface 506 of the first locknut 134 is configured to contact and/or engage the interior wall and/or the interior surface of the lid, thereby coupling the first stem 106 and/or, more generally, the handle 102 of the handle-integrated lighting assembly 100 of FIGS. 1-12 to the lid.

The first fitting 132 of FIGS. 1-12 is a hollow structure having an internal volume and/or compartment configured to receive, house, and/or contain one or more component(s) of the first lighting module 110 of the handle-integrated lighting assembly 100. In the illustrated example of FIGS. 1-12, first fitting 132 has an annular (e.g., hollow circular) profile including an inner diameter that complements and/or is substantially the same as a corresponding inner diameter of the annular profile of the first stem 106. In other examples, the first fitting 132 can instead have a non-annular profile (e.g., a hollow rectangular profile, a hollow triangular profile, a hollow hexagonal profile, etc.) including an inner dimension that complements and/or is substantially the same as a corresponding inner dimension of the profile of the first stem 106.

The second stem 108 of the handle 102 of FIGS. 1-12 includes an example first end 136, an example second end 138 located opposite the first end 136 of the second stem 108, and an example sidewall 140 extending between the first end 136 and the second end 138 of the second stem 108. The second stem 108 of FIGS. 1-12 is a tubular structure (e.g., a hollow tube) having an internal volume and/or compartment configured to receive, house, and/or contain one or more component(s) of the second lighting module 112 of the handle-integrated lighting assembly 100. In the illustrated example of FIGS. 1-12, the sidewall 140 of the second stem 108 has an annular (e.g., hollow circular) profile. In other examples, the sidewall 140 of the second stem 108 can instead have a non-annular profile, such as a hollow rectangular profile, a hollow triangular profile, a hollow hexagonal profile, etc.

In some examples, the second stem 108 of the handle 102 is integrally formed with the crossbar 104 of the handle 102 such that the second stem 108 cannot be physically and/or mechanically separated from the crossbar 104 absent the use of destructive means. In other examples, the second stem 108 of the handle 102 can instead be coupled to the crossbar 104 of the handle 102 (e.g., via a threaded connection or a fastener located at the first end 136 of the second stem 108) such that the second stem 108 can be physically and/or mechanically separated from the crossbar 104 without the use of destructive means. In the illustrated example of FIGS. 1-12, the second stem 108 of the handle 102 is oriented at a perpendicular and/or orthogonal angle relative to the crossbar 104 of the handle 102. In other examples, the second stem 108 of the handle 102 can instead be oriented at a non-perpendicular and/or non-perpendicular angle relative to the crossbar 104 of the handle 102.

The handle-integrated lighting assembly 100 of FIGS. 1-12 further includes an example second fitting 142 and an example second locknut 144. In the illustrated example of FIGS. 1-12, the second fitting 142 is coupled (e.g., via a threaded connection) to the second end 138 of the second stem 108, and the second locknut 144 is coupled (e.g., via a threaded connection) to an example shaft portion 402 of the second fitting 142. The second fitting 142 and the second locknut 144 are respectively configured to couple the second stem 108 and/or, more generally, the handle 102 of the handle-integrated lighting assembly 100 of FIGS. 1-12 to a lid of a grill. In this regard, the shaft portion 402 of the second fitting 142 is configured to extend through a first handle mount opening formed in a front portion of the lid of the grill, whereby the first handle mount opening extends from an exterior wall and/or an exterior surface of the lid through to an interior wall and/or an interior surface of the lid. An example flange portion 404 of the second fitting 142 is configured to contact and/or engage the exterior wall and/or the exterior surface of the lid, and an example locking surface 406 of the second locknut 144 is configured to contact and/or engage the interior wall and/or the interior surface of the lid, thereby coupling the second stem 108 and/or, more generally, the handle 102 of the handle-integrated lighting assembly 100 of FIGS. 1-12 to the lid.

The second fitting 142 of FIGS. 1-12 is a hollow structure having an internal volume and/or compartment configured to receive, house, and/or contain one or more component(s) of the second lighting module 112 of the handle-integrated lighting assembly 100. In the illustrated example of FIGS. 1-12, second fitting 142 has an annular (e.g., hollow circular) profile including an inner diameter that complements and/or is substantially the same as a corresponding inner diameter of the annular profile of the second stem 108. In other examples, the second fitting 142 can instead have a non-annular profile (e.g., a hollow rectangular profile, a hollow triangular profile, a hollow hexagonal profile, etc.) including an inner dimension that complements and/or is substantially the same as a corresponding inner dimension of the profile of the second stem 108.

The handle-integrated lighting assembly 100 of FIGS. 1-12 further includes an example power cable 146. The power cable 146 of FIGS. 1-12 includes one or more wire(s) configured to operatively couple (e.g., electrically connect) one or more electrical component(s) (e.g., one or more printed circuit board(s), one or more light source(s), one or more other wire(s) or power cable(s), the switch 802, etc.) to a power source. In the illustrated example of FIGS. 1-12, a first end of the power cable 146 is routed to and/or extends through a portion of the first stem 106 of the handle 102 and into the crossbar 104 of the handle 102. In other examples, the first end of the power cable 146 can instead be routed to and/or extend through a portion of the second stem 108 of the handle 102 and into the crossbar 104 of the handle 102.

In the illustrated example of FIGS. 1-12, a second end of the power cable 146 is configured to be routed to (e.g., via the power cable 146 itself, or via one or more intermediary cable(s) operatively coupled to the power cable 146) to a power source. In some examples, the power source is located remotely from the handle 102 and/or, more generally, the handle-implemented lighting assembly. For example, the power source can be implemented as a power supply or a power converter located within a base compartment or below a side shelf of a grill that includes a lid implementing the handle-integrated lighting assembly 100 of FIGS. 1-12. A portion of the power cable 146 (or a portion of an intermediary cable to which the second end of the power cable is operatively coupled) can be routed along an interior surface of the lid, and thereafter to the power source. In other examples, the portion of the power cable 146 (or the portion of the intermediary cable to which the second end of the power cable is operatively coupled) can instead be routed along an exterior surface of the lid, and thereafter to the power supply. In instances where the lid is a double-walled structure, the portion of the power cable 146 (or the portion of the intermediary cable to which the second end of the power cable is operatively coupled) can instead be routed between an exterior wall and an interior wall of the lid, and thereafter to the power supply.

In some examples, the handle-integrated lighting assembly 100 of FIGS. 1-12 can alternatively be configured with an integral power source, such as a battery located and/or positioned within the crossbar 104 of the handle 102. In such examples, the power cable 146 may be unnecessary, and can accordingly be omitted from alternatively-configured implementation of the handle-integrated lighting assembly.

The first lighting module 110 of the handle-integrated lighting assembly 100 of FIGS. 1-12 includes an example chassis 804, an example printed circuit board (PCB) 806, an example light source 808, an example light pipe 810, and an example lens 302. In the illustrated example of FIGS. 1-12, the chassis 804, the PCB 806 and the light source 808 of the first lighting module 110 are respectively located within the crossbar 104 of the handle 102. The light pipe 810 of the first lighting module 110 is located partially within the first stem 106 of the handle 102, and partially within the first fitting 132. The lens 302 of the first lighting module 110 is located within the first fitting 132. In other examples, the chassis 804, the PCB 806, and/or the light source 808 of the first lighting module 110 can instead be located partially or fully within the first stem 106 of the handle 102. In still other examples, the light pipe 810 of the first lighting module 110 can instead be located fully within the first stem 106 of the handle 102, and the lens 302 of the first lighting module 110 can instead be located partially or fully within the first stem 106 of the handle 102.

The chassis 804 of the first lighting module 110 of FIGS. 1-12 of is configured to support and/or carry the PCB 806 of the first lighting module 110. In some examples, the chassis 804 of the first lighting module 110 can additionally support and/or carry one or more portion(s) of the light source 808 and/or the light pipe 810 of the first lighting module 110. In some examples, the chassis 804 of the first lighting module 110 is fixedly coupled to the sidewall 118 of the crossbar 104 of the handle 102. For example, the chassis 804 of the first lighting module 110 can be fixedly coupled to the sidewall 118 of the crossbar 104 via a set screw passing through an opening formed in the sidewall 118 of the crossbar 104.

The PCB 806 of the first lighting module 110 of FIGS. 1-12 is configured to support and/or carry the light source 808 of the first lighting module 110, and to control the operation thereof. In the illustrated example of FIGS. 1-12, the PCB 806 of the first lighting module 110 includes one or more terminal(s) configured to facilitate operative couplings (e.g., electrical connections) between the PCB 806 of the first lighting module 110 and one or more other electrical component(s) of the handle-integrated lighting assembly 100. For example, as shown in FIGS. 8 and 9, the PCB 806 of the first lighting module 110 includes an example first terminal 812 configured to receive an end of the power cable 146, with such connection operatively coupling the PCB 806 of the first lighting module 110 to a power source. The PCB 806 of the first lighting module 110 further includes an example second terminal 814 configured to receive an end of an example switch cable 816 (e.g., one or more switch wire(s)) that extends to the switch 802, with such connection operatively coupling the PCB 806 of the first lighting module 110 to the switch 802. The PCB 806 of the first lighting module 110 further includes an example third terminal 818 configured to receive an end of an example interconnect cable 820 (e.g., one or more interconnect wire(s)) that extends to a PCB of the second lighting module 112 of the handle-integrated lighting assembly 100, with such connection operatively coupling the PCB 806 of the first lighting module 110 to the PCB of the second lighting module 112.

The light source 808 of the first lighting module 110 of FIGS. 1-12 is configured to emit and/or project light. In the illustrated example of FIGS. 1-12, the light source 808 of the first lighting module 110 is mounted on and operatively connected to the PCB 806 of the first lighting module 110. The light source 808 of the first lighting module 110 is located and/or positioned in alignment with the first stem 106 of the handle 102 such that light emitted and/or projected by the light source 808 of the first lighting module 110 is directed through the internal volume and/or compartment of the first stem 106. In the illustrated example of FIGS. 1-12, the light source 808 of the first lighting module 110 is implemented as an LED lamp including one or more LED(s), with the LED(s) of the LED lamp being configured to illuminate in response to power being supplied to the PCB 806 of the first lighting module 110, and/or in response to a signal, instruction or command provided to the LED lamp by the PCB 806 of the first lighting module 110. In other examples, the light source 808 of the first lighting module 110 can instead be implemented by an alternative (e.g., non-LED) light source, such as an incandescent lamp or bulb (e.g., a halogen lamp or bulb), a fluorescent lamp or bulb, etc., with such alternative lighting source similarly being configured to illuminate in response to power being supplied to the PCB 806 of the first lighting module 110, and/or in response to a signal, instruction or command provided to the alternative lighting source by the PCB 806 of the first lighting module 110.

The light pipe 810 of the first lighting module 110 of FIGS. 1-12 is configured to direct, guide, and or transfer light emitted and/or projected by the light source 808 of the first lighting module 110 to and/or towards the lens 302 of the first lighting module 110. In the illustrated example of FIGS. 1-12, the light pipe 810 of the first lighting module 110 is located and/or positioned in alignment with the light source 808 and the lens 302 of the first lighting module 110 such that light emitted and/or projected by the light source 808 of the first lighting module 110 is directed along a generally linear pathway extending from the light source 808 of the first lighting module 110, through the light pipe 810 of the first lighting module 110, and to the lens 302 of the first lighting module 110. In some examples, the light pipe 810 of the first lighting module 110 can be implemented as a hollow structure configured to contain the directed, guided, and/or transferred light via reflective surfaces. In other examples, the light pipe 810 of the first lighting module 110 can instead be implemented as a transparent solid configured to contain the directed, guided, and/or transferred light via total internal reflection.

The lens 302 of the first lighting module 110 of FIGS. 1-12 is configured to direct and/or focuses light received from the light pipe 810 and/or projected by the light source 808 of the first lighting module 110. Focused light emitted from the lens 302 of the first lighting module 110 is directed outwardly from the first fitting 132 in a direction away from the handle 102 of the handle-integrated lighting assembly 100. In some examples, such focused light is projected into a cooking chamber defined in part by a lid of a grill, and/or onto a cooking surface of a cookbox of the grill to which the lid of the grill is movably coupled. The lens 302 of the first lighting module 110 of FIGS. 1-12 can be configured to have any geometry, including any thickness, any curvature, any focal length, and/or any refractive index. In the illustrated example of FIGS. 1-12, the lens 302 of the first lighting module 110 is implemented as a double concave lens. In other examples, the lens 302 of the first lighting module 110 can instead be implemented as a double convex lens, a single concave lens, or a single convex lens.

The second lighting module 112 of the handle-integrated lighting assembly 100 of FIGS. 1-12 includes an example chassis 822, an example PCB 824, an example light source 826, an example light pipe 828, and an example lens 304. In the illustrated example of FIGS. 1-12, the chassis 822, the PCB 824 and the light source 826 of the second lighting module 112 are respectively located within the crossbar 104 of the handle 102. The light pipe 828 of the second lighting module 112 is located partially within the second stem 108 of the handle 102, and partially within the second fitting 142. The lens 304 of the second lighting module 112 is located within the second fitting 142. In other examples, the chassis 822, the PCB 824, and/or the light source 826 of the second lighting module 112 can instead be located partially or fully within the second stem 108 of the handle 102. In still other examples, the light pipe 828 of the second lighting module 112 can instead be located fully within the second stem 108 of the handle 102, and the lens 304 of the second lighting module 112 can instead be located partially or fully within the second stem 108 of the handle 102.

The chassis 822 of the second lighting module 112 of FIGS. 1-12 of is configured to support and/or carry the PCB 824 of the second lighting module 112. In some examples, the chassis 822 of the second lighting module 112 can additionally support and/or carry one or more portion(s) of the light source 826 and/or the light pipe 828 of the second lighting module 112. In some examples, the chassis 822 of the second lighting module 112 is fixedly coupled to the sidewall 118 of the crossbar 104 of the handle 102. For example, the chassis 822 of the second lighting module 112 can be fixedly coupled to the sidewall 118 of the crossbar 104 via a set screw passing through an opening formed in the sidewall 118 of the crossbar 104.

The PCB 824 of the second lighting module 112 of FIGS. 1-12 is configured to support and/or carry the light source 826 of the second lighting module 112, and to control the operation thereof. In the illustrated example of FIGS. 1-12, the PCB 824 of the second lighting module 112 includes one or more terminal(s) configured to facilitate operative couplings (e.g., electrical connections) between the PCB 824 of the second lighting module 112 and one or more other electrical component(s) of the handle-integrated lighting assembly 100. For example, as shown in FIGS. 8 and 10, the PCB 824 of the second lighting module 112 includes an example first terminal 830 configured to receive an end of the above-described interconnect cable 820 (e.g., one or more interconnect wire(s)), whereby the other end of the interconnect cable 820 is connected to the PCB 806 of the first lighting module 110. In such an example, the connection formed via the interconnect cable 820 operatively couples the PCB 824 of the second lighting module 112 to the PCB 806 of the first lighting module 110, and further operatively couples the PCB 824 of the second lighting module 112 to the switch 802 and the power cable 146 of the handle-integrated lighting assembly 100.

The light source 826 of the second lighting module 112 of FIGS. 1-12 is configured to emit and/or project light. In the illustrated example of FIGS. 1-12, the light source 826 of the second lighting module 112 is mounted on and operatively connected to the PCB 824 of the second lighting module 112. The light source 826 of the second lighting module 112 is located and/or positioned in alignment with the second stem 108 of the handle 102 such that light emitted and/or projected by the light source 826 of the second lighting module 112 is directed through the internal volume and/or compartment of the second stem 108. In the illustrated example of FIGS. 1-12, the light source 826 of the second lighting module 112 is implemented as an LED lamp including one or more LED(s), with the LED(s) of the LED lamp being configured to illuminate in response to power being supplied to the PCB 824 of the second lighting module 112, and/or in response to a signal, instruction or command provided to the LED lamp by the PCB 824 of the second lighting module 112. In other examples, the light source 826 of the second lighting module 112 can instead be implemented by an alternative (e.g., non-LED) light source, such as an incandescent lamp or bulb (e.g., a halogen lamp or bulb), a fluorescent lamp or bulb, etc., with such alternative lighting source similarly being configured to illuminate in response to power being supplied to the PCB 824 of the second lighting module 112, and/or in response to a signal, instruction or command provided to the alternative lighting source by the PCB 824 of the second lighting module 112.

The light pipe 828 of the second lighting module 112 of FIGS. 1-12 is configured to direct, guide, and or transfer light emitted and/or projected by the light source 826 of the second lighting module 112 to and/or towards the lens 304 of the second lighting module 112. In the illustrated example of FIGS. 1-12, the light pipe 828 of the second lighting module 112 is located and/or positioned in alignment with the light source 826 and the lens 304 of the second lighting module 112 such that light emitted and/or projected by the light source 826 of the second lighting module 112 is directed along a generally linear pathway extending from the light source 826 of the second lighting module 112, through the light pipe 828 of the second lighting module 112, and to the lens 304 of the second lighting module 112. In some examples, the light pipe 828 of the second lighting module 112 can be implemented as a hollow structure configured to contain the directed, guided, and/or transferred light via reflective surfaces. In other examples, the light pipe 828 of the second lighting module 112 can instead be implemented as a transparent solid configured to contain the directed, guided, and/or transferred light via total internal reflection.

The lens 304 of the second lighting module 112 of FIGS. 1-12 is configured to direct and/or focuses light received from the light pipe 828 and/or projected by the light source 826 of the second lighting module 112. Focused light emitted from the lens 304 of the second lighting module 112 is directed outwardly from the second fitting 142 in a direction away from the handle 102 of the handle-integrated lighting assembly 100. In some examples, such focused light is projected into a cooking chamber defined in part by a lid of a grill, and/or onto a cooking surface of a cookbox of the grill to which the lid of the grill is movably coupled. The lens 302 of the second lighting module 112 of FIGS. 1-12 can be configured to have any geometry, including any thickness, any curvature, any focal length, and/or any refractive index. In the illustrated example of FIGS. 1-12, the lens 304 of the second lighting module 112 is implemented as a double concave lens. In other examples, the lens 304 of the second lighting module 112 can instead be implemented as a double convex lens, a single concave lens, or a single convex lens.

A user of the handle-integrated lighting assembly 100 of FIGS. 1-12 can activate (e.g., power on) the handle-integrated lighting assembly 100 by actuating (e.g., pressing or holding) the button 122 of the switch 802. In response to the user actuating the button 122 of the switch 802, an electrical circuit of the handle-integrated lighting assembly 100 transitions from an open state to a closed state. When the electrical circuit of the handle-integrated lighting assembly 100 is placed in the closed state, the PCB 806 of the first lighting module 110 signals, instructs, commands, and/or otherwise causes the light source 808 of the first lighting module 110 to illuminate, and the PCB 824 of the second lighting module 112 signals, instructs, commands, and/or otherwise causes the light source 826 of the second lighting module 112 to illuminate.

In response to such illumination, light emitted and/or projected by the light source 808 of the first lighting module 110 is directed, guided, and/or transferred by the light pipe 810 of the first lighting module 110 to the lens 302 of the first lighting module 110, and light emitted and/or projected by the light source 826 of the second lighting module 112 is directed, guided, and/or transferred by the light pipe 828 of the second lighting module 112 to the lens 304 of the second lighting module 112. The emitted and/or projected light is thereafter focused by the lens 302 of the first lighting module 110 and/or the lens 304 of the second lighting module 112, with the resultant focused light being directed and/or projected into a cooking chamber defined in part by a lid of a grill, and/or onto a cooking surface of a cookbox of the grill to which the lid of the grill is movably coupled.

The user of the handle-integrated lighting assembly 100 of FIGS. 1-12 can thereafter deactivate (e.g., power off) the handle-integrated lighting assembly 100 by once again actuating (e.g., pressing again, or releasing) the button 122 of the switch 802. In response to the user once again actuating the button 122 of the switch 802, the electrical circuit of the handle-integrated lighting assembly 100 transitions from the closed state back to the open state, thereby causing the operation(s) of the PCB 806 and/or the light source 808 of the first lighting module 110 to cease, and/or causing the operation(s) of the PCB 824 and/or the light source 826 of the second lighting module 112 to cease.

Figure 13:
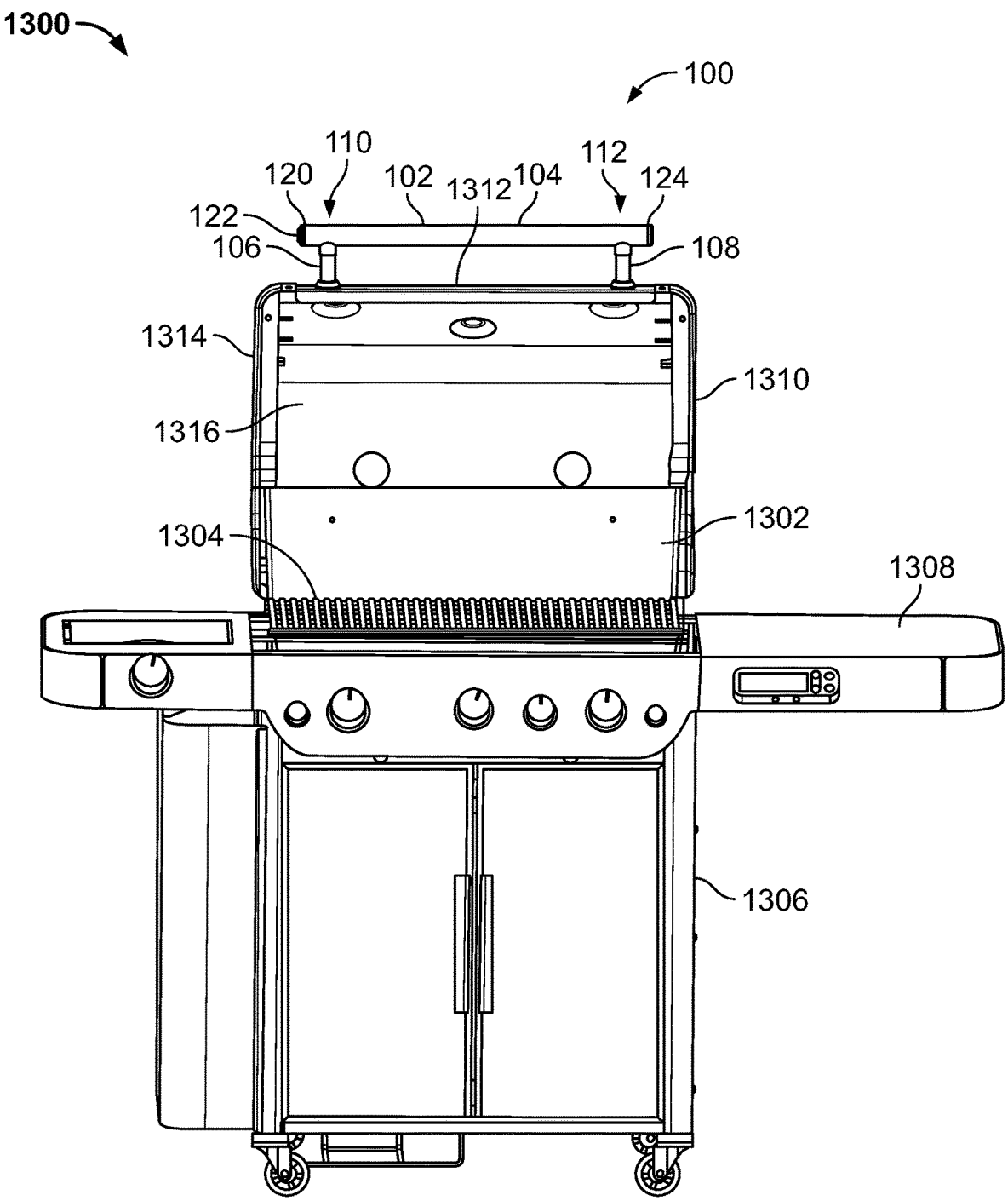
FIG. 13 is a perspective view of an example grill including the handle-integrated lighting assembly of FIGS. 1-12.

FIG. 13 is a perspective view of an example grill 1300 including the handle-integrated lighting assembly 100 of FIGS. 1-12. The grill 1300 of FIG. 13 further includes an example cookbox 1302, one or more example cooking grate(s) 1304, an example base 1306, an example side shelf 1308, and an example lid 1310. The cookbox 1302 of the grill 1300 can house, carry, and/or otherwise include a heat-generating and/or heat-emitting structure positioned within the cookbox 1302. For example, in instances where the grill 1300 is a gas grill, the cookbox 1302 of the grill 1300 can house, carry, and/or otherwise include one or more burner tube(s) configured to generate and/or emit a heat-producing gas flame. As another example, in instances where the grill 1300 is a solid-fuel grill (e.g., a charcoal grill, a pellet grill, etc.), the cookbox 1302 of the grill 1300 can house, carry, and/or otherwise include a burn pot and/or a burn pit configured to generate and/or emit heat from charcoal and/or wood pellets being combusted thereon or therein. In some examples, the cookbox 1302 of the grill 1300 can further include one or more grease deflection bar(s) located and/or positioned within the cookbox 1302 above the aforementioned heat-generating and/or heat-emitting structure(s) of the cookbox 1302.

The cookbox 1302 of the grill 1300 further includes the cooking grate(s) 1304, with the cooking grate(s) 1304 being located and/or positioned within the cookbox 1302 above the aforementioned heat-generating and/or heat-emitting structure(s) of the cookbox 1302, and/or above the aforementioned grease deflection bars of the cookbox 1302. The cooking grate(s) 1304 is/are configured to form and/or define a substantially flat, planar cooking surface for cooking one or more food item(s) placed thereon. As shown in FIG. 13, the cooking grate(s) 1304 is/are configured to fill, cover, and/or occupy the substantial entirety of the horizontal form factor and/or footprint of the cookbox 1302 (e.g., as defined by the width and the depth of the cookbox 1302). In other examples, the cooking grate(s) 1304 can instead be configured to fill, cover, and/or occupy a relatively smaller portion and/or percentage (e.g., less than the substantial entirety) of the horizontal form factor and/or footprint of the cookbox 1302. Light emitted and/or projected by and/or from the handle-integrated lighting assembly 100 of the grill 1300 is directed and/or projected into a cooking chamber defined in part by the cookbox 1302 of the grill 1300, and/or onto the cooking surface formed and/or defined by the cooking grate(s) 1304 of the grill 1300.

The cookbox 1302 of the grill 1300 is coupled to, positioned on, and/or supported by the base 1306 of the grill 1300. The base 1306 can be structured as a cart, a storage compartment, a frame, and/or any number of legs that may be suitable to support the cookbox 1302. In some examples, a power source (e.g., a power supply, a power converter, a battery, etc.) that powers the handle-integrated lighting assembly 100 can be coupled to and/or located within the base 1306 of the grill 1300. The side shelf 1308 of the grill 1300 is coupled to and/or supported by the cookbox 1302 and/or the base 1306 of the grill 1300. In some examples, the power source (e.g., a power supply, a power converter, a battery, etc.) that powers the handle-integrated lighting assembly 100 can alternatively be coupled to and/or located beneath the side shelf 1308 of the grill 1300, as opposed to being coupled to and/or located within the base 1306 of the grill 1300. In still other examples, the power source (e.g., a power supply, a power converter, a battery, etc.) that powers the handle-integrated lighting assembly 100 can alternatively be coupled to and/or located within the lid 1310 of the grill 1300 or the handle 102 of the handle-integrated lighting assembly 100.

The lid 1310 of the grill 1300 is movably coupled (e.g., via one or more hinge(s) or pin(s)) to the cookbox 1302 of the grill 1300 in a manner that enables the lid 1310 to be moved (e.g., pivoted and/or rotated) relative to the cookbox 1302 between a closed position and an open position (e.g., as shown in FIG. 13). The cookbox 1302 and the lid 1310 collectively define a cooking chamber of the grill 1300, with said cooking chamber being fully formed when the lid 1310 is in the closed position. Placement of the lid 1310 in the open position enables a user to access the cookbox 1302, the cooking grate(s) 1304, and/or the cooking chamber of the grill 1300, as may be required to load, unload, and/or otherwise access a food item located therein or thereon. Movement of the lid 1310 between the closed position and the open position can be performed by a user of the grill 1300 via the handle 102 of the handle-integrated lighting assembly 100, with said handle 102 being coupled and/or mounted to the lid 1310.

Figure 14:
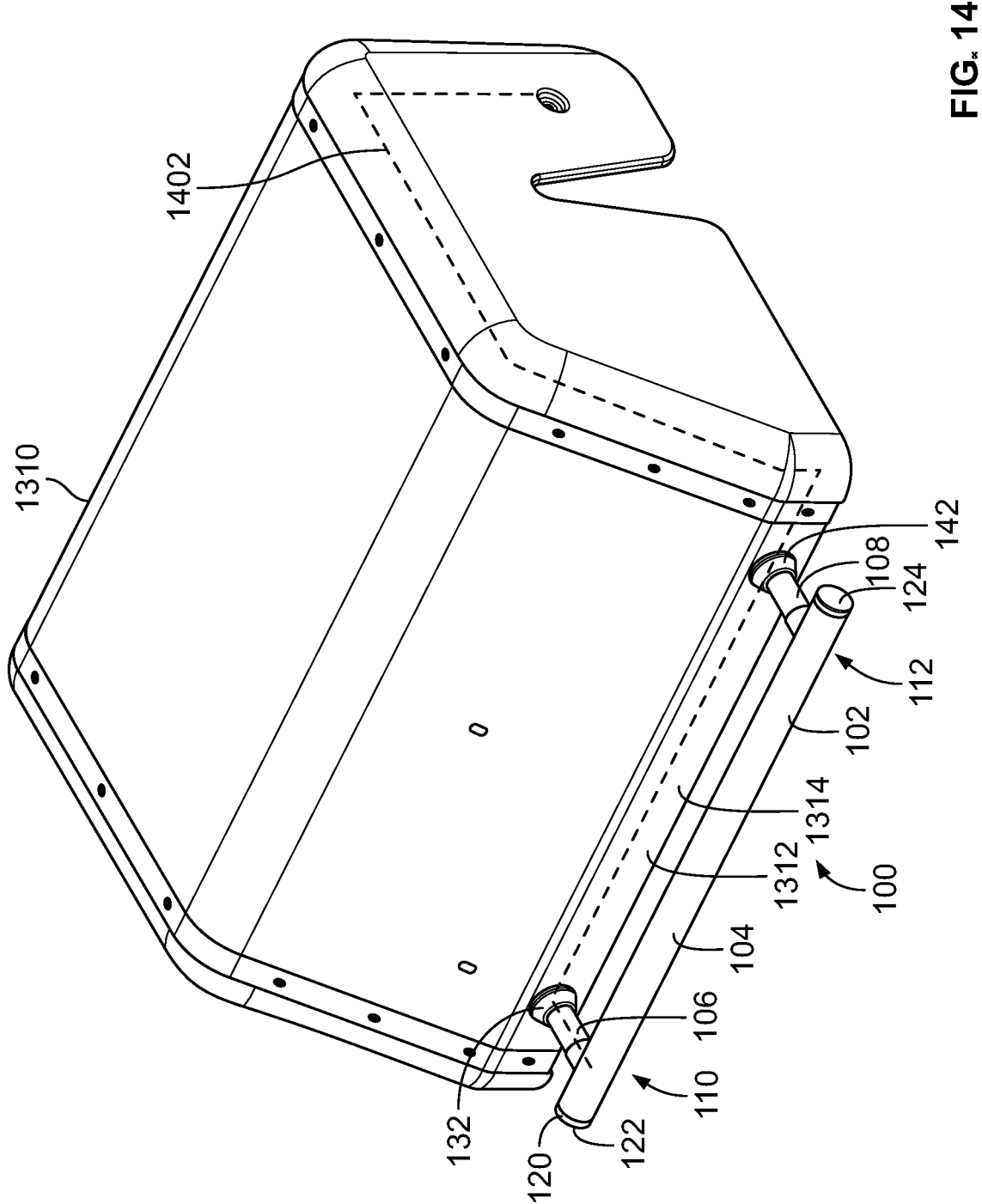
FIG. 14 is a perspective view of the handle-integrated lighting assembly of FIGS. 1-13 coupled to the lid of FIG. 13.
Figure 15:
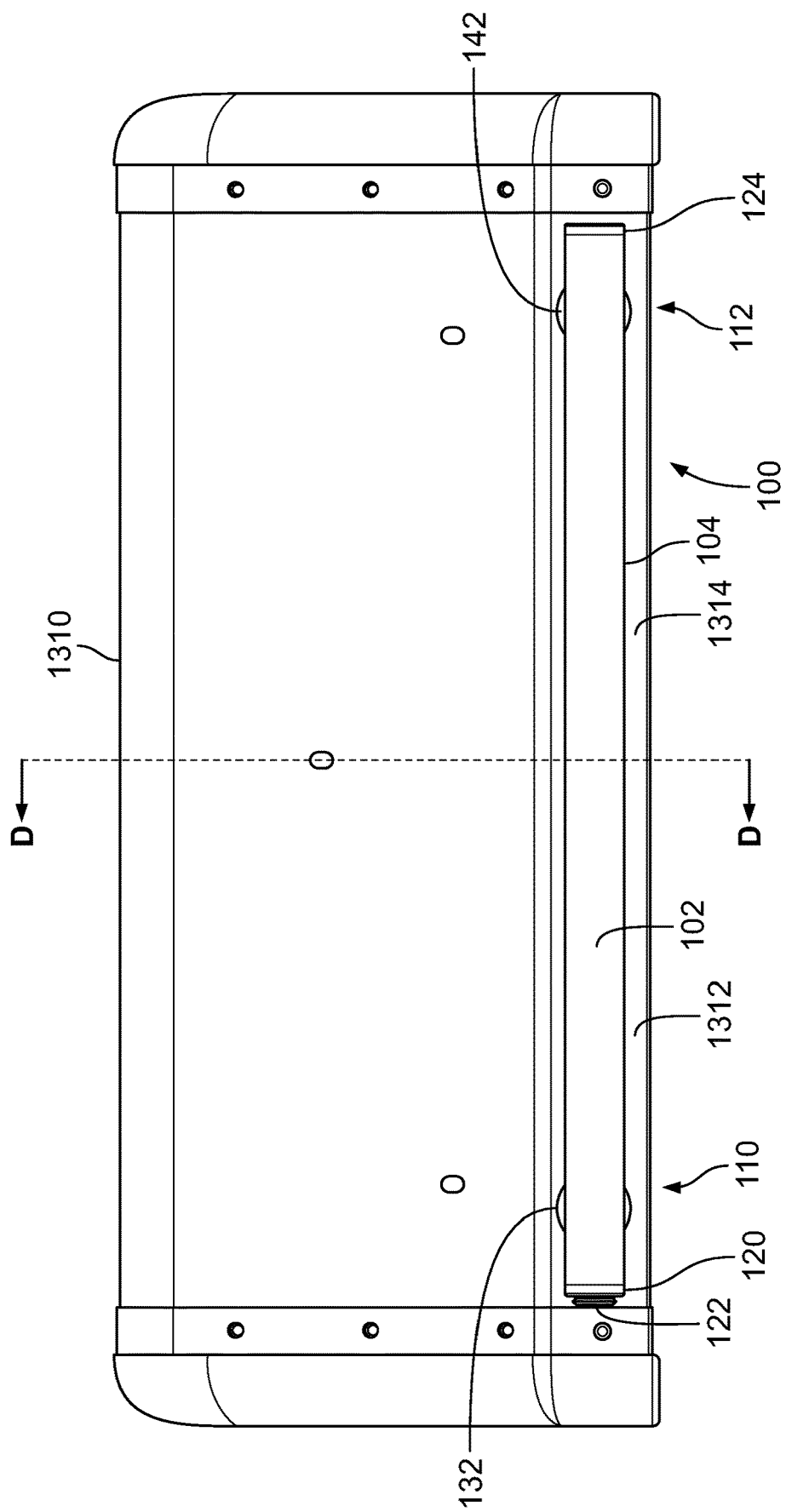
FIG. 15 is a front view of the handle-integrated lighting assembly of FIGS. 1-14 coupled to the lid of FIGS. 13 and 14.
Figure 16:
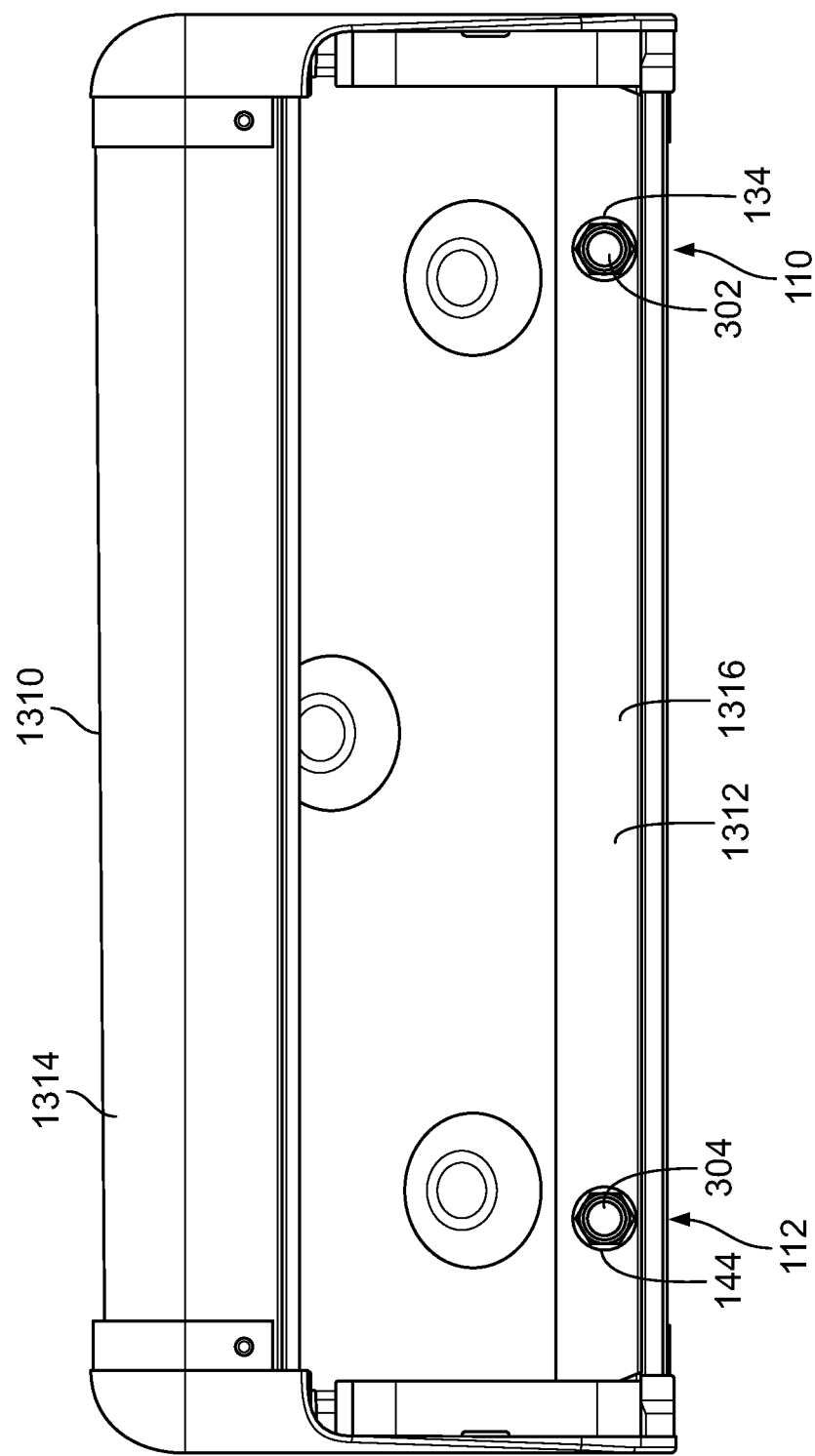
FIG. 16 is a rear view of the handle-integrated lighting assembly of FIGS. 1-15 coupled to the lid of FIGS. 13-15.
Figure 17:
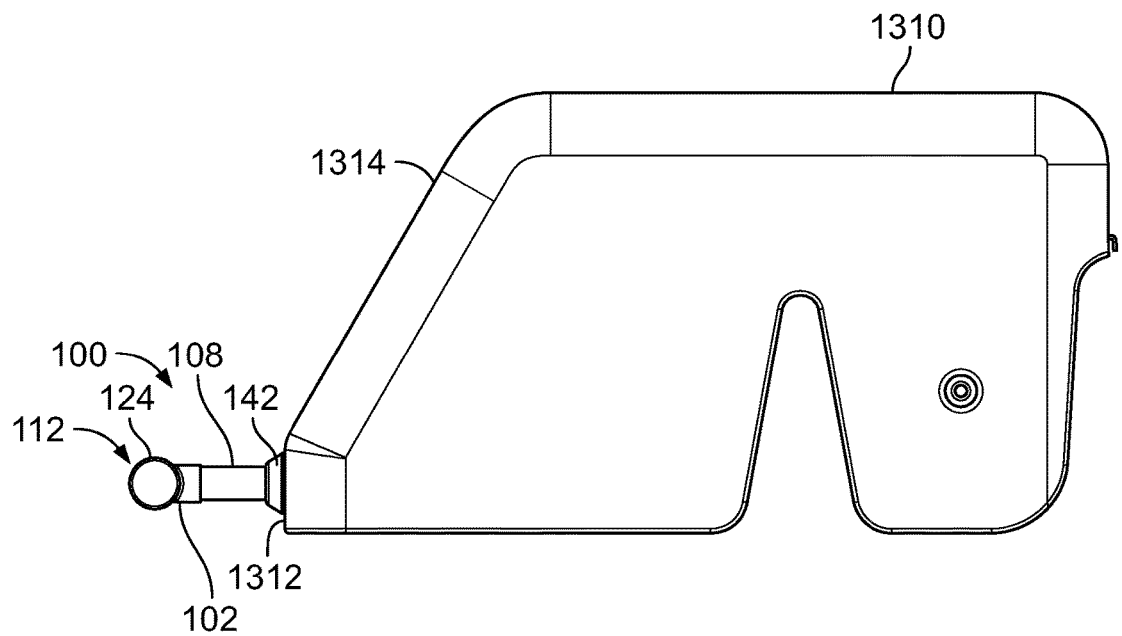
FIG. 17 is a right side view of the handle-integrated lighting assembly of FIGS. 1-16 coupled to the lid of FIGS. 13-16.
Figure 18:
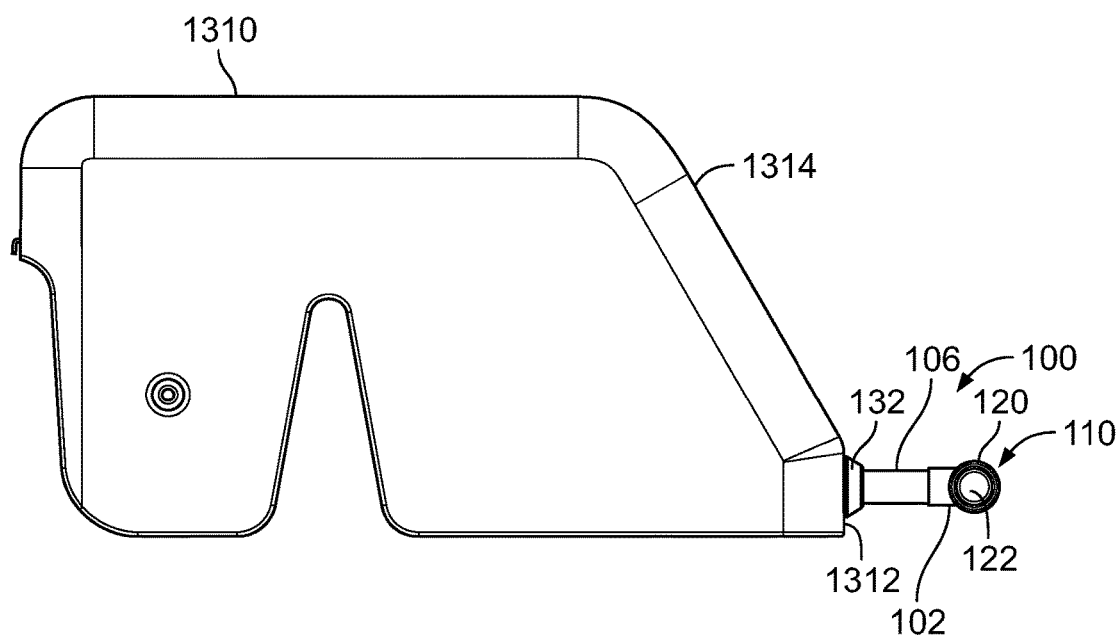
FIG. 18 is a left side view of the handle-integrated lighting assembly of FIGS. 1-17 coupled to the lid of FIGS. 13-17.
Figure 19:
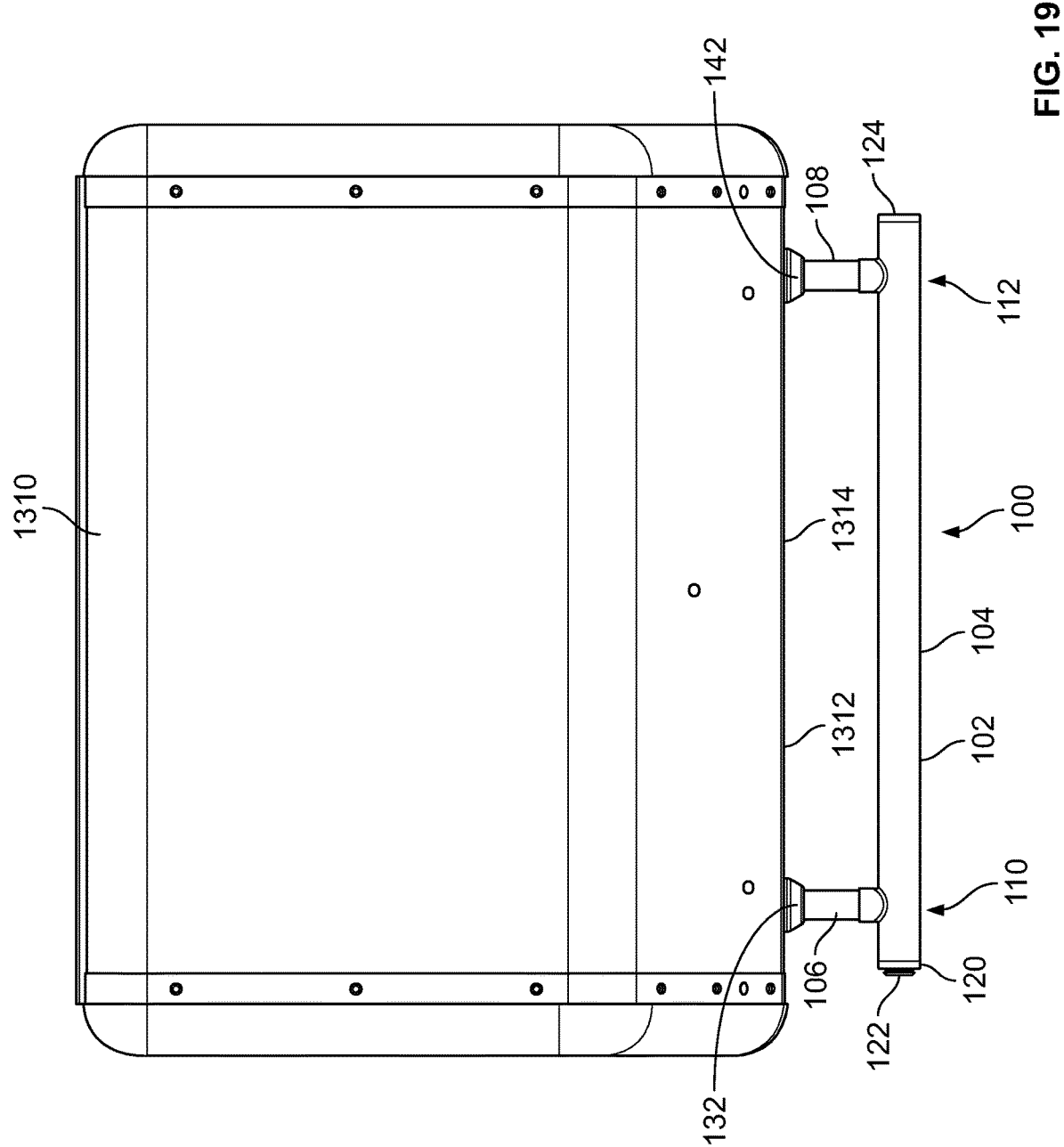
FIG. 19 is a top view of the handle-integrated lighting assembly of FIGS. 1-18 coupled to the lid of FIG. 13-18.
Figure 20:
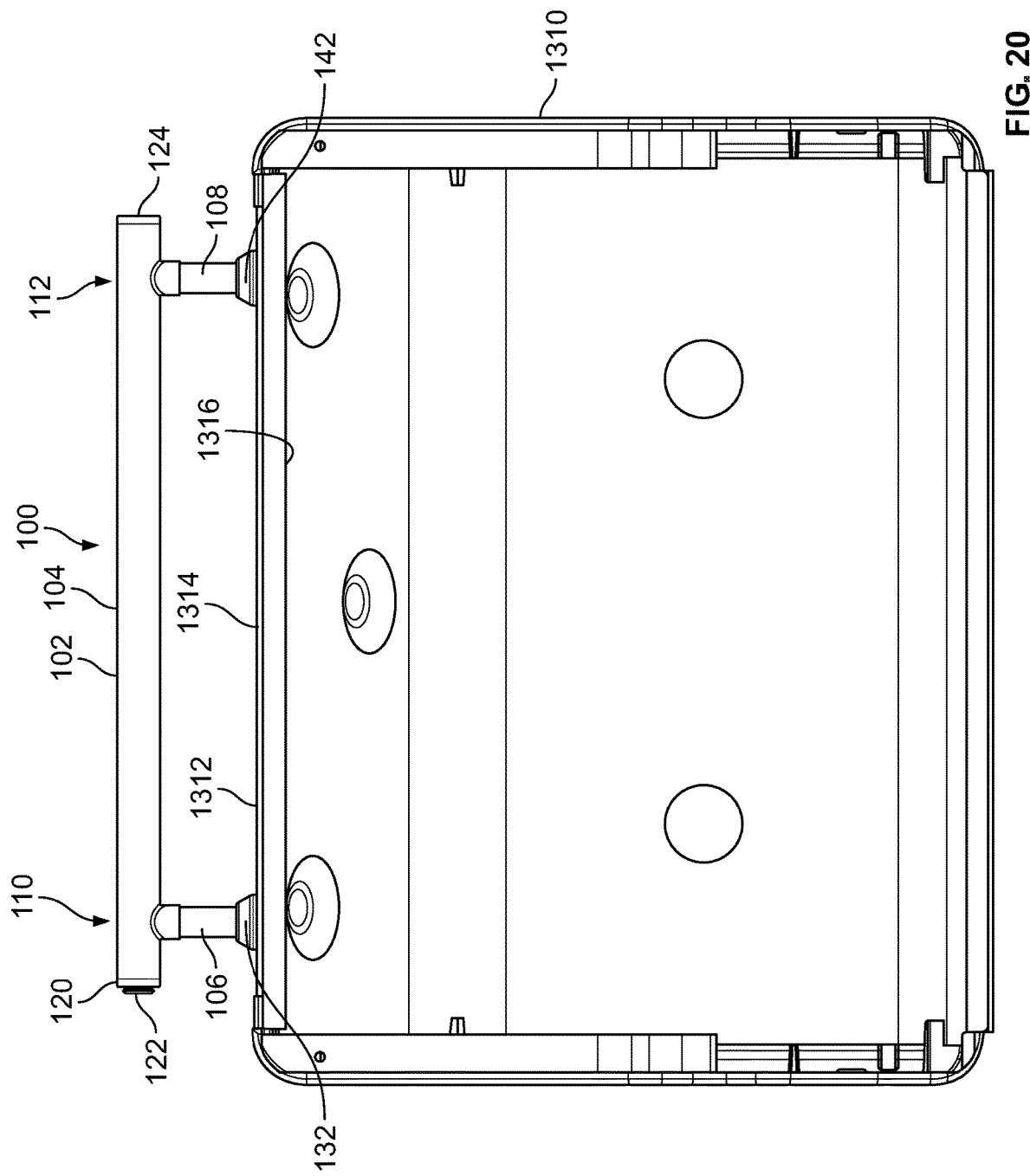
FIG. 20 is a bottom view of the handle-integrated lighting assembly of FIGS. 1-19 coupled to the lid of FIGS. 13-19.
Figure 21:
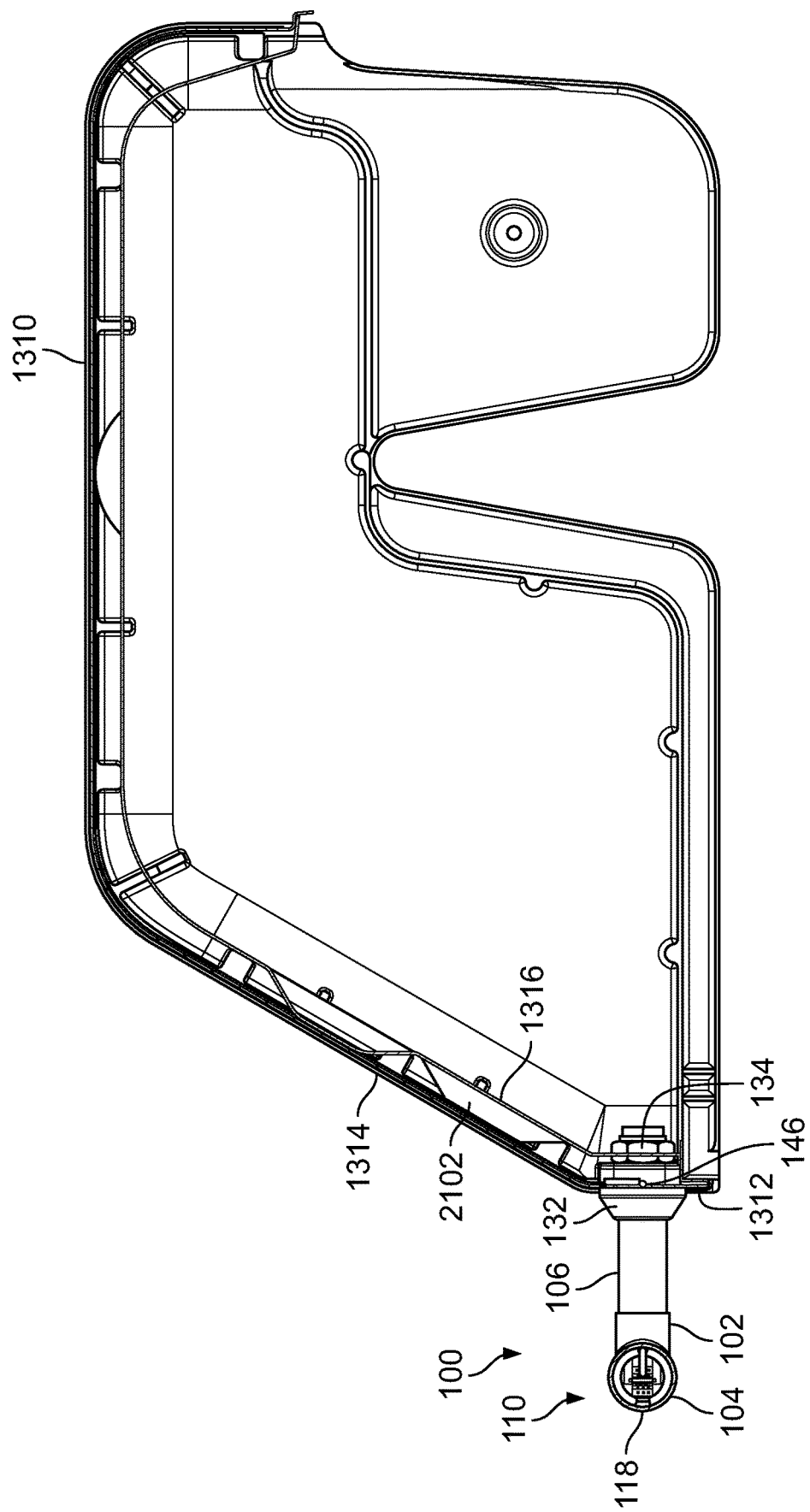
FIG. 21 is a cross-sectional view taken along section D-D of FIG. 15 showing the handle-integrated lighting assembly of FIGS. 1-20 coupled to the lid of FIGS. 13-20.

FIG. 14 is a perspective view of the handle-integrated lighting assembly 100 of FIGS. 1-13 coupled to the lid 1310 of FIG. 13. FIG. 15 is a front view of the handle-integrated lighting assembly 100 of FIGS. 1-14 coupled to the lid 1310 of FIGS. 13 and 14. FIG. 16 is a rear view of the handle-integrated lighting assembly 100 of FIGS. 1-15 coupled to the lid 1310 of FIGS. 13-15. FIG. 17 is a right side view of the handle-integrated lighting assembly 100 of FIGS. 1-16 coupled to the lid 1310 of FIGS. 13-16. FIG. 18 is a left side view of the handle-integrated lighting assembly 100 of FIGS. 1-17 coupled to the lid 1310 of FIGS. 13-17. FIG. 19 is a top view of the handle-integrated lighting assembly 100 of FIGS. 1-18 coupled to the lid 1310 of FIG. 13-18. FIG. 20 is a bottom view of the handle-integrated lighting assembly 100 of FIGS. 1-19 coupled to the lid 1310 of FIGS. 13-19. FIG. 21 is a cross-sectional view taken along section D-D of FIG. 15 showing the handle-integrated lighting assembly 100 of FIGS. 1-20 coupled to the lid 1310 of FIGS. 13-20.

In the illustrated example of FIGS. 13-21, the handle-integrated lighting assembly 100 is coupled and/or mounted to an example front section 1312 of the lid 1310 of the grill 1300. The front section 1312 and/or, more generally, the lid 1310 is a double-walled structure having an example exterior wall 1314, an example interior wall 1316, and an example gap 2102 located between the exterior wall 1314 and the interior wall 1316 of the lid 1310. The shaft portion 502 of the first fitting 132 extends through the exterior wall 1314 and the interior wall 1316 of the lid 1310. The flange portion 504 of the first fitting 132 contacts and/or engages the exterior wall 1314 of the lid 1310, and the locking surface 506 of the first locknut 134 contacts and/or engages the interior wall 1316 of the lid 1310, thereby coupling the first stem 106 and/or, more generally, the handle 102 of the handle-integrated lighting assembly 100 of FIGS. 1-12 to the lid 1310. Similarly, the shaft portion 402 of the second fitting 142 extends through the exterior wall 1314 and the interior wall 1316 of the lid 1310. The flange portion 404 of the second fitting 142 contacts and/or engages the exterior wall 1314 of the lid 1310, and the locking surface 406 of the second locknut 144 contacts and/or engages the interior wall 1316 of the lid 1310, thereby coupling the second stem 108 and/or, more generally, the handle 102 of the handle-integrated lighting assembly 100 of FIGS. 1-12 to the lid 1310.

In examples wherein the power source of the handle-integrated lighting assembly 100 is not located and/or positioned within or mounted to the handle 102, the power cable 146 (and/or one or more intermediary cable(s) operatively coupled to the power cable 146) is routed to a remotely-located power source (e.g., coupled to and/or located within the base 1306 of the grill 1300, or coupled to and/or located below the side shelf 1308 of the grill 1300), with at least a portion of the power cable 146 (and/or a portion of the intermediary cable(s)) passing through the gap 2102 of the lid 1310 of the grill 1300. In some examples, such portion(s) of the power cable 146 (and/or the intermediary cable(s)) can be routed along an example wiring route 1402, as shown in FIG. 14. In other examples, the lid 1310 can instead be configured as a single-walled structure. In such other examples, the power cable 146 (and/or the portion of the intermediary cable(s)) can instead be routed to the remotely-located power source along either an exterior surface or an interior surface of the lid 1310 of the grill 1300.

A user of the grill 1300 of FIG. 13 can activate (e.g., power on) the handle-integrated lighting assembly 100 by actuating (e.g., pressing or holding) the button 122 of the switch 802. In response to the user actuating the button 122 of the switch 802, an electrical circuit of the handle-integrated lighting assembly 100 transitions from an open state to a closed state. When the electrical circuit of the handle-integrated lighting assembly 100 is placed in the closed state, the PCB 806 of the first lighting module 110 signals, instructs, commands, and/or otherwise causes the light source 808 of the first lighting module 110 to illuminate, and the PCB 824 of the second lighting module 112 signals, instructs, commands, and/or otherwise causes the light source 826 of the second lighting module 112 to illuminate.

In response to such illumination, light emitted and/or projected by the light source 808 of the first lighting module 110 is directed, guided, and/or transferred by the light pipe 810 of the first lighting module 110 to the lens 302 of the first lighting module 110, and light emitted and/or projected by the light source 826 of the second lighting module 112 is directed, guided, and/or transferred by the light pipe 828 of the second lighting module 112 to the lens 304 of the second lighting module 112. The emitted and/or projected light is thereafter focused by the lens 302 of the first lighting module 110 and/or the lens 304 of the second lighting module 112, with the resultant focused light being directed and/or projected into the cooking chamber defined by the cookbox 1302 and the lid 1310 of the grill 1300, and/or onto the cooking surface formed by the cooking grate(s) 1304 of the grill 1300.

The user of the grill 1300 of FIG. 13 can thereafter deactivate (e.g., power off) the handle-integrated lighting assembly 100 by once again actuating (e.g., pressing again, or releasing) the button 122 of the switch 802. In response to the user once again actuating the button 122 of the switch 802, the electrical circuit of the handle-integrated lighting assembly 100 transitions from the closed state back to the open state, thereby causing the operation(s) of the PCB 806 and/or the light source 808 of the first lighting module 110 to cease, and/or causing the operation(s) of the PCB 824 and/or the light source 826 of the second lighting module 112 to cease.

Figure 22:
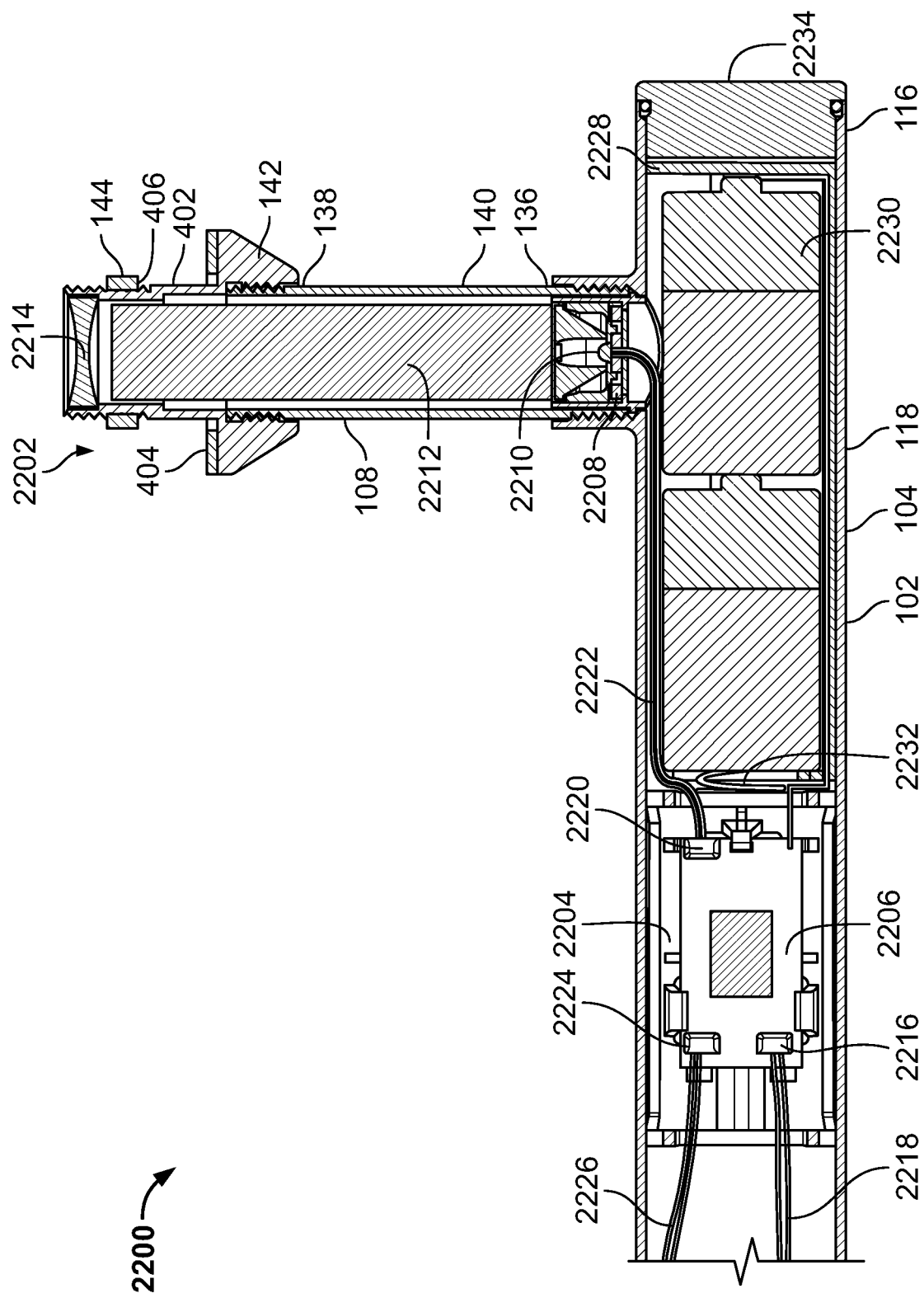
FIG. 22 is a cross-sectional view of an example modified handle-integrated lighting assembly.

FIG. 22 is a cross-sectional view of an example modified handle-integrated lighting assembly 2200. The handle-integrated lighting assembly 2200 of FIG. 22 can include the handle 102 (e.g., including the crossbar 104, the first stem 106, and the second stem 108), the first lighting module 110 (e.g., including the chassis 804, the PCB 806, the light source 808, the light pipe 810, and the lens 302), the switch 802 (e.g., including the button 122), the first fitting 132, the first locknut 134, the second fitting 142, and the second locknut 144 of the handle-integrated lighting assembly 100 of FIGS. 1-21 described above. The handle-integrated lighting assembly 2200 of FIG. 22 further includes an example second lighting module 2202 having an example chassis 2204, an example first PCB 2206, an example second PCB 2208, an example light source 2210, an example light pipe 2212, and an example lens 2214.

In the illustrated example of FIG. 22, the chassis 2204 and the first PCB 2206 of the second lighting module 2202 are respectively located within the crossbar 104 of the handle 102. The second PCB 2208, the light source 2210, and the light pipe 2212 of the second lighting module 2202 are respectively located within the second stem 108 of the handle 102, with a portion of the light pipe 2212 of the second lighting module 2202 being located partially within the second fitting 142. The lens 2214 of the second lighting module 2202 is located within the second fitting 142.

The chassis 2204 of the second lighting module 2202 of FIG. 22 is configured to support and/or carry the first PCB 2206 of the second lighting module 2202. In some examples, the chassis 2204 of the second lighting module 2202 is fixedly coupled to the sidewall 118 of the crossbar 104 of the handle 102. For example, the chassis 2204 of the second lighting module 2202 can be fixedly coupled to the sidewall 118 of the crossbar 104 via a set screw passing through an opening formed in the sidewall 118 of the crossbar 104.

The first PCB 2206 of the second lighting module 2202 of FIG. 22 is configured to control the operation of the second PCB 2208 of the second lighting module 2202. In the illustrated example of FIG. 22, the first PCB 2206 of the second lighting module 2202 includes one or more terminal(s) configured to facilitate operative couplings (e.g., electrical connections) between the first PCB 2206 of the second lighting module 2202 and one or more other electrical component(s) of the handle-integrated lighting assembly 2200. For example, as shown in FIG. 22, the first PCB 2206 of the second lighting module 2202 includes an example first terminal 2216 configured to receive an end of an example switch cable 2218 (e.g., one or more switch wire(s)) that extends to the switch 802, with such connection operatively coupling the first PCB 2206 of the second lighting module 2202 to the switch 802. The first PCB 2206 of the second lighting module 2202 further includes an example second terminal 2220 configured to receive an example lamp board cable 2222 (e.g., one or more lamp board wire(s)) that extends to the second PCB 2208 of the second lighting module 2202, with such connection operatively coupling the first PCB 2206 of the second lighting module 2202 to the second PCB 2208 of the second lighting module 2202. The first PCB 2206 of the second lighting module 2202 further includes an example third terminal 2224 configured to receive an end of an example interconnect cable 2226 (e.g., one or more interconnect wire(s)) that extends to the PCB 806 of the first lighting module 110 of the handle-integrated lighting assembly 2200, with such connection operatively coupling the first PCB 2206 of the second lighting module 2202 to the PCB of the first lighting module 110.

The second PCB 2208 of the second lighting module 2202 of FIG. 22 is configured to support and/or carry the light source 2210 of the second lighting module 2202, and to control the operation thereof. The light source 2210 of the second lighting module 2202 of FIG. 22 is configured to emit and/or project light. In the illustrated example of FIG. 22, the light source 2210 of the second lighting module 2202 is mounted on and operatively connected to the second PCB 2208 of the second lighting module 2202. The light source 2210 of the second lighting module 2202 is located and/or positioned in alignment with the second stem 108 of the handle 102 such that light emitted and/or projected by the light source 2210 of the second lighting module 2202 is directed through the internal volume and/or compartment of the second stem 108. In the illustrated example of FIG. 22, the light source 2210 of the second lighting module 2202 is implemented as an LED lamp including one or more LED(s), with the LED(s) of the LED lamp being configured to illuminate in response to power being supplied to the first PCB 2206 and/or the second PCB 2208 of the second lighting module 2202, and/or in response to a signal, instruction or command provided to the LED lamp by the first PCB 2206 and/or the second PCB 2208 of the second lighting module 2202. In other examples, the light source 2210 of the second lighting module 2202 can instead be implemented by an alternative (e.g., non-LED) light source, such as an incandescent lamp or bulb (e.g., a halogen lamp or bulb), a fluorescent lamp or bulb, etc., with such alternative lighting source similarly being configured to illuminate in response to power being supplied to the first PCB 2206 and/or the second PCB 2208 of the second lighting module 2202, and/or in response to a signal, instruction or command provided to the alternative lighting source by the first PCB 2206 and/or the second PCB 2208 of the second lighting module 2202.

The light pipe 2212 of the second lighting module 2202 of FIG. 22 is configured to direct, guide, and or transfer light emitted and/or projected by the light source 2210 of the second lighting module 2202 to and/or towards the lens 2214 of the second lighting module 2202. In the illustrated example of FIG. 22, the light pipe 2212 of the second lighting module 2202 is located and/or positioned in alignment with the light source 2210 and the lens 2214 of the second lighting module 2202 such that light emitted and/or projected by the light source 2210 of the second lighting module 2202 is directed along a generally linear pathway extending from the light source 2210 of the second lighting module 2202, through the light pipe 2212 of the second lighting module 2202, and to the lens 2214 of the second lighting module 2202. In some examples, the light pipe 2212 of the second lighting module 2202 can be implemented as a hollow structure configured to contain the directed, guided, and/or transferred light via reflective surfaces. In other examples, the light pipe 2212 of the second lighting module 2202 can instead be implemented as a transparent solid configured to contain the directed, guided, and/or transferred light via total internal reflection.

The lens 2214 of the second lighting module 2202 of FIG. 22 is configured to direct and/or focuses light received from the light pipe 2212 and/or projected by the light source 2210 of the second lighting module 2202. Focused light emitted from the lens 2214 of the second lighting module 2202 is directed outwardly from the second fitting 142 in a direction away from the handle 102 of the handle-integrated lighting assembly 2200. In some examples, such focused light is projected into a cooking chamber defined in part by a lid of a grill (e.g., the lid 1310 of the grill 1300 of FIG. 13), and/or onto a cooking surface of a cookbox of the grill (e.g., the cookbox 1302 of the grill 1300 of FIG. 13) to which the lid of the grill is movably coupled. The lens 2214 of the second lighting module 2202 of FIG. 22 can be configured to have any geometry, including any thickness, any curvature, any focal length, and/or any refractive index. In the illustrated example of FIG. 22, the lens 2214 of the second lighting module 2202 is implemented as a double concave lens. In other examples, the lens 2214 of the second lighting module 2202 can instead be implemented as a double convex lens, a single concave lens, or a single convex lens.

The handle-integrated lighting assembly 2200 of FIG. 22 further includes an example power chassis 2228, an example power source 2230, an example spring 2232, and an example end cap 2234. In the illustrated example of FIG. 22, the power chassis 2228, the power source 2230, and the spring 2232 are respectively located within the crossbar 104 of the handle 102. The power chassis 2228 is movable (e.g., slidable) within the crossbar 104 of the handle 102, with the power chassis 2228 being biased in a direction toward the second end 116 of the crossbar 104 via a biasing force generated by the spring 2232. The power chassis 2228 is configured to carry and/or contain the power source 2230. In the illustrated example of FIG. 22, the power source 2230 is implemented by one or more batteries configured to be loaded into and subsequently removed from the power chassis 2228. Placing the power chassis 2228 in contact with the spring 2232 (e.g., as shown in FIG. 22) operatively couples (e.g., electrically connects) the power source 2230 to the first PCB 2206 of the second lighting module 2202.

The end cap 2234 of FIG. 22 is located and/or positioned at and/or within the second end 116 of the crossbar 104 of the handle 102, with the end cap 2234 being coupled to the second end 116 of the crossbar 104 via a threaded connection. The end cap 2234 is configured to close off and/or seal the internal volume and/or compartment of the crossbar 104, thereby protecting one or more component(s) of the handle-integrated lighting assembly 2200 located and/or positioned within said internal volume and/or compartment of the crossbar 104 from becoming exposed to moisture (e.g., from humidity, rain, snow, spilled fluids, etc.).

The end cap 2234 of FIG. 22 is further configured to retain the power chassis 2228 and/or the power source 2230 within the crossbar 104 of the handle 102 against the biasing force generated by the spring 2232. When the end cap 2234 of FIG. 22 is removed from the second end 116 of the crossbar 104, the biasing force generated by the spring 2232 causes the power chassis 2228 and/or the power source 2230 of FIG. 22 to be partially or fully ejected from the crossbar 104 through the second end 116 of the crossbar 104. Such ejection can facilitate the removal and replacement of the power source 2230 from the power chassis 2228, which may be desirable in instances where the remaining energy of the power source 2230 of FIG. 22 has been drained below a level that enables the power source 2230 to adequately power the electrical components of the handle-integrated lighting assembly 2200 of FIG. 22.

A user of the handle-integrated lighting assembly 2200 of FIG. 22 can activate (e.g., power on) the handle-integrated lighting assembly 2200 by actuating (e.g., pressing or holding) the button 122 of the switch 802. In response to the user actuating the button 122 of the switch 802, an electrical circuit of the handle-integrated lighting assembly 2200 transitions from an open state to a closed state. When the electrical circuit of the handle-integrated lighting assembly 2200 is placed in the closed state, the PCB 806 of the first lighting module 110 signals, instructs, commands, and/or otherwise causes the light source 808 of the first lighting module 110 to illuminate, and the first PCB 2206 and/or the second PCB 2208 of the second lighting module 2202 signal(s), instruct(s), command(s), and/or otherwise cause(s) the light source 2210 of the second lighting module 2202 to illuminate.

In response to such illumination, light emitted and/or projected by the light source 808 of the first lighting module 110 is directed, guided, and/or transferred by the light pipe 810 of the first lighting module 110 to the lens 302 of the first lighting module 110, and light emitted and/or projected by the light source 2210 of the second lighting module 2202 is directed, guided, and/or transferred by the light pipe 2212 of the second lighting module 2202 to the lens 2214 of the second lighting module 2202. The emitted and/or projected light is thereafter focused by the lens 302 of the first lighting module 110 and/or the lens 2214 of the second lighting module 2202, with the resultant focused light being directed and/or projected into a cooking chamber defined in part by a lid of a grill (e.g., the cooking chamber defined in part by the lid 1310 of the grill 1300 of FIG. 13), and/or onto a cooking surface of a cookbox of the grill (e.g., the cooking grate(s) 1304 of the cookbox 1302 of the grill 1300 of FIG. 13) to which the lid of the grill is movably coupled.

The user of the handle-integrated lighting assembly 2200 of FIG. 22 can thereafter deactivate (e.g., power off) the handle-integrated lighting assembly 2200 by once again actuating (e.g., pressing again, or releasing) the button 122 of the switch 802. In response to the user once again actuating the button 122 of the switch 802, the electrical circuit of the handle-integrated lighting assembly 2200 transitions from the closed state back to the open state, thereby causing the operation(s) of the PCB 806 and/or the light source 808 of the first lighting module 110 to cease, and/or causing the operation(s) of the first PCB 2206, the second PCB 2208, and/or the light source 2210 of the second lighting module 2202 to cease.

Figure 23:
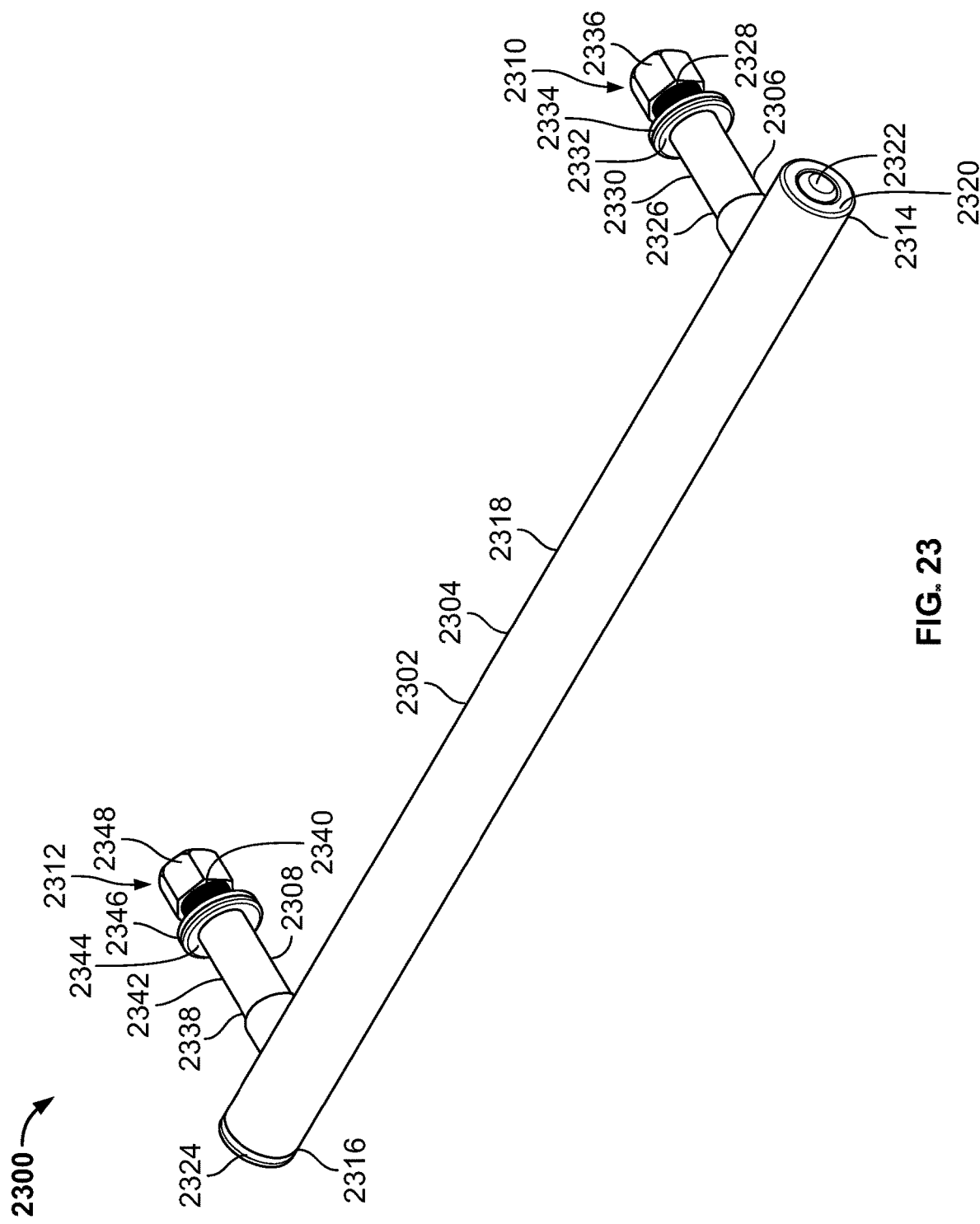
FIG. 23 is a perspective view of another example handle-integrated lighting assembly constructed in accordance with teachings of this disclosure.
Figure 24:
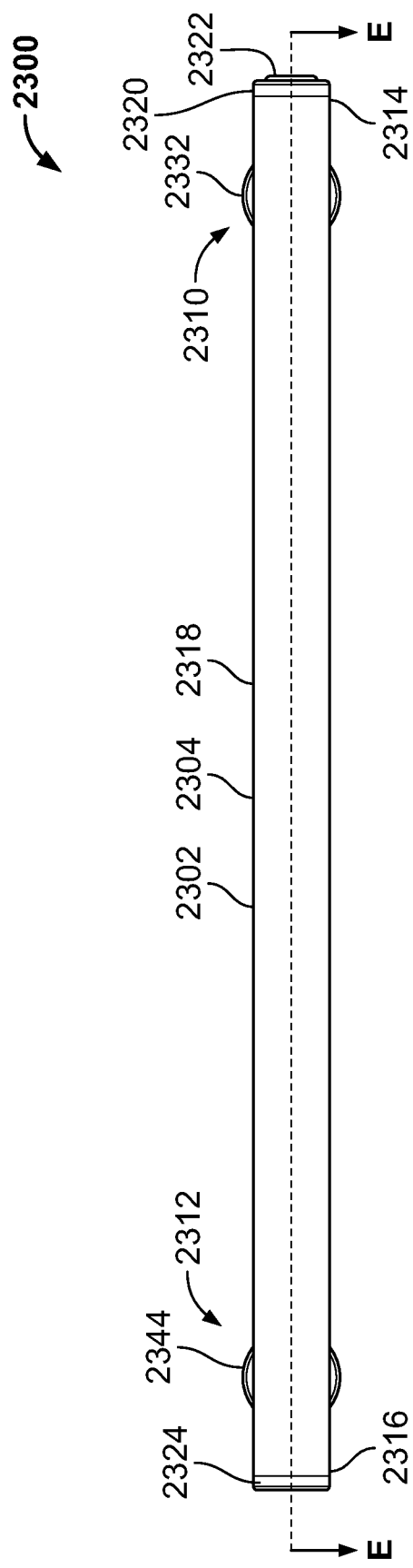
FIG. 24 is a front view of the handle-integrated lighting assembly of FIG. 23.
Figure 25:
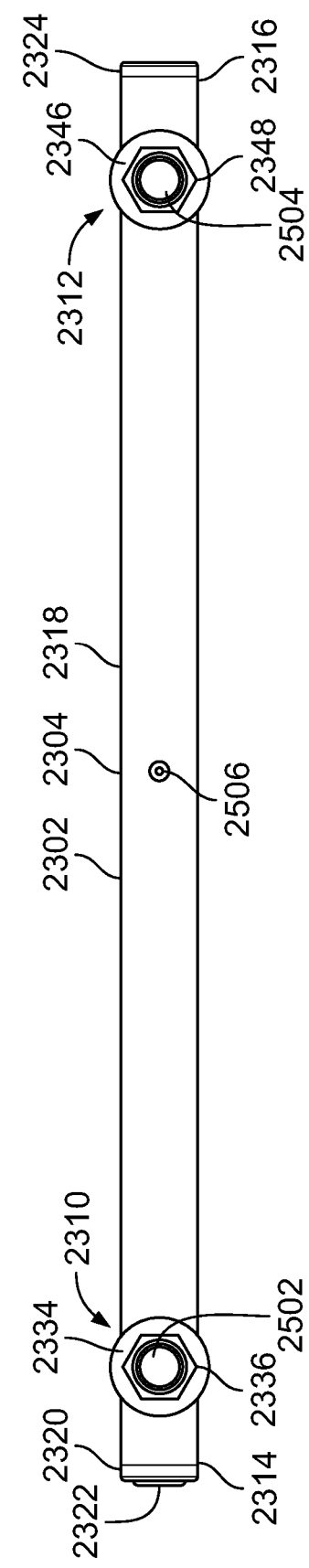
FIG. 25 is a rear view of the handle-integrated lighting assembly of FIGS. 23 and 24.
Figure 26:
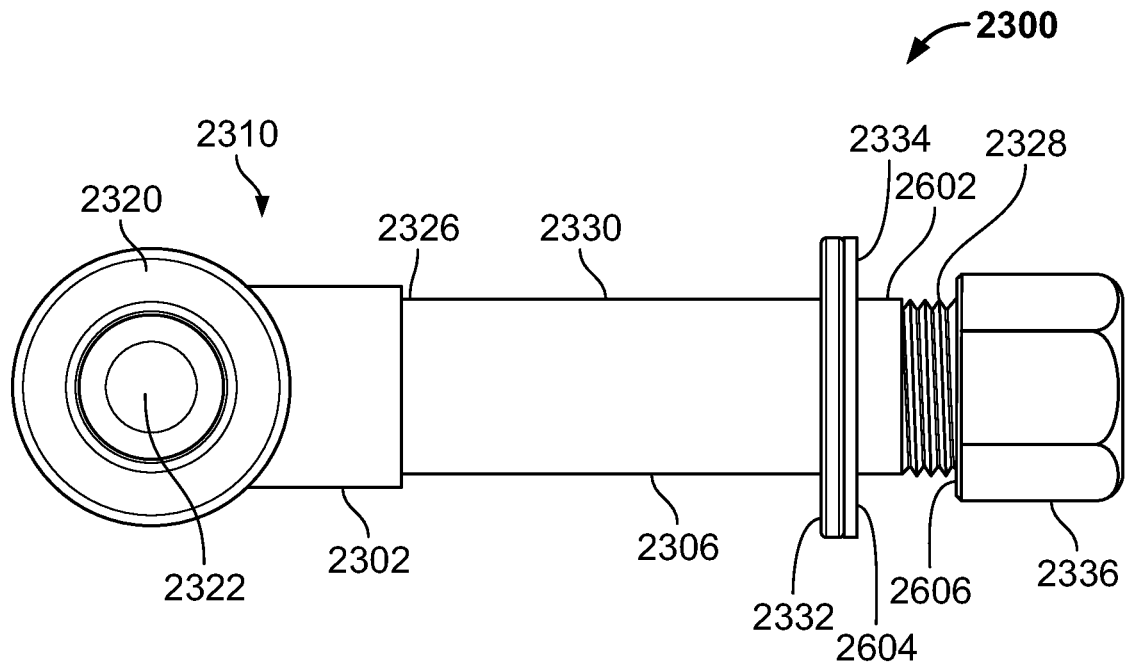
FIG. 26 is a right side view of the handle-integrated lighting assembly of FIGS. 23-25.
Figure 27:
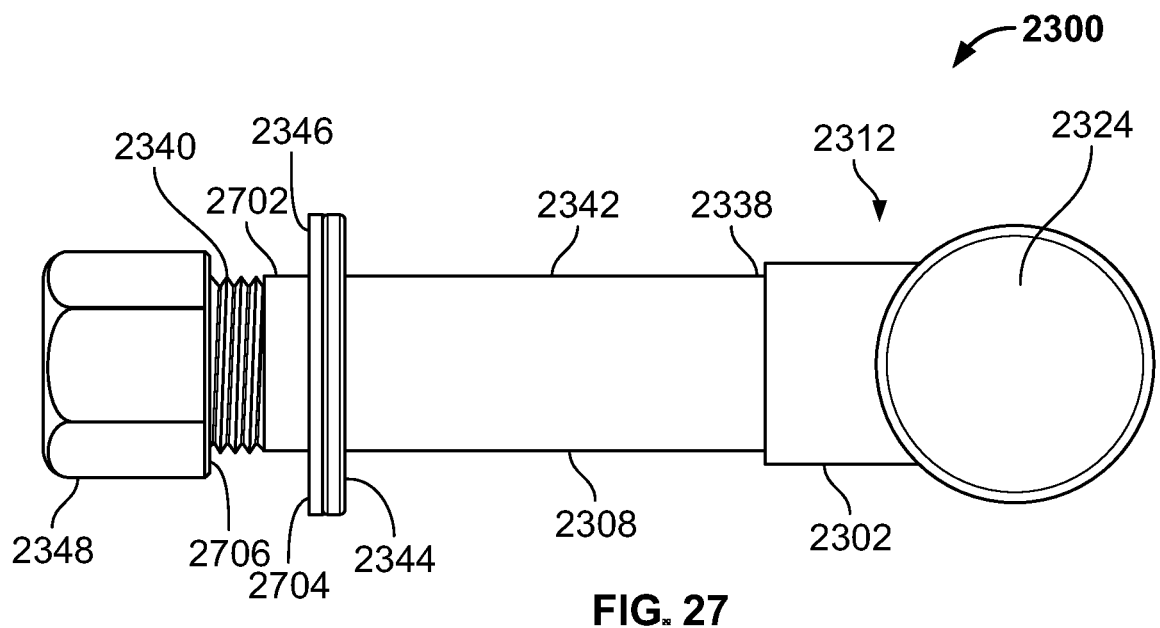
FIG. 27 is a left side view of the handle-integrated lighting assembly of FIGS. 23-26.
Figure 31:
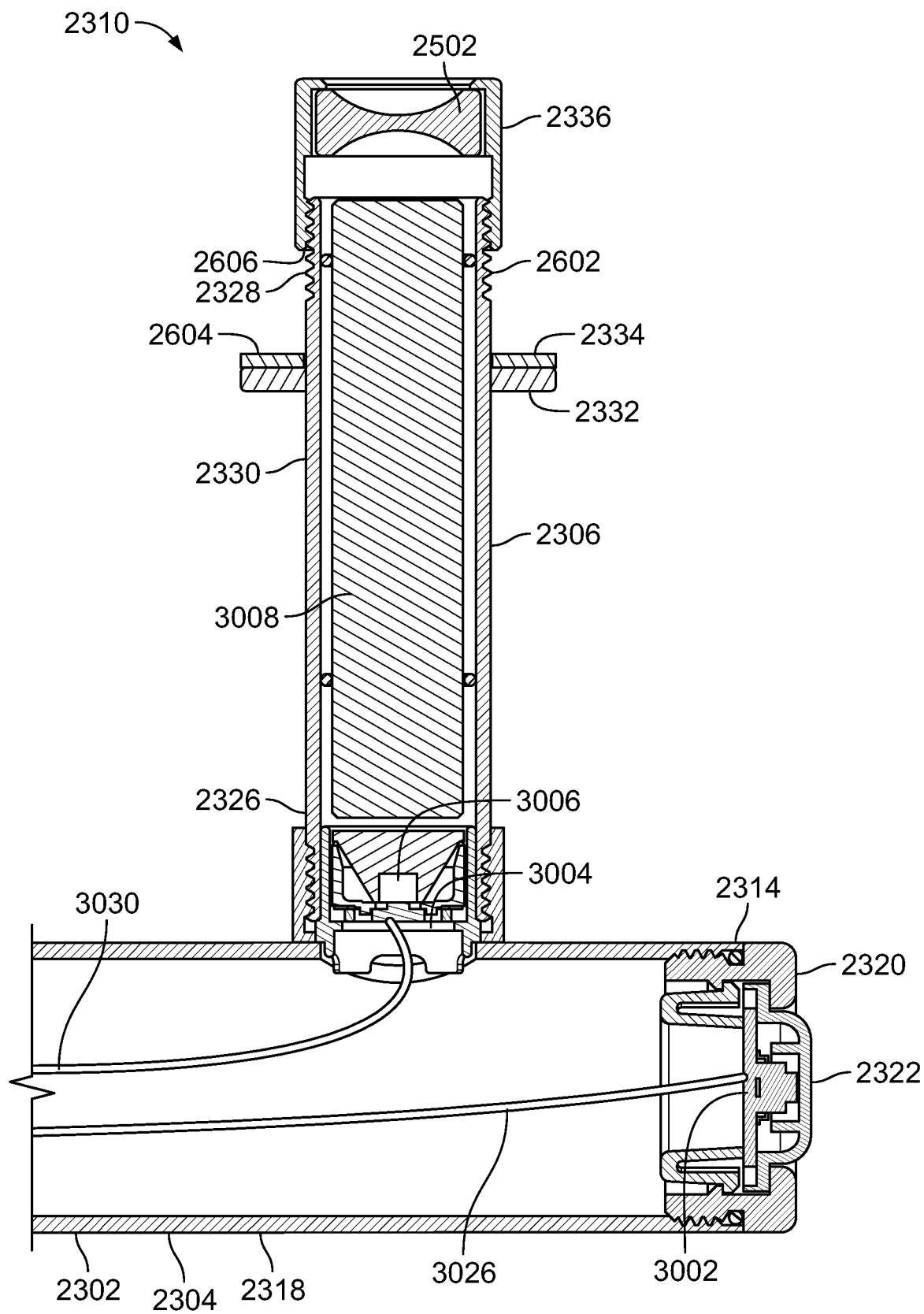
FIG. 31 is an enlarged view of a first portion of FIG. 30.
Figure 32:
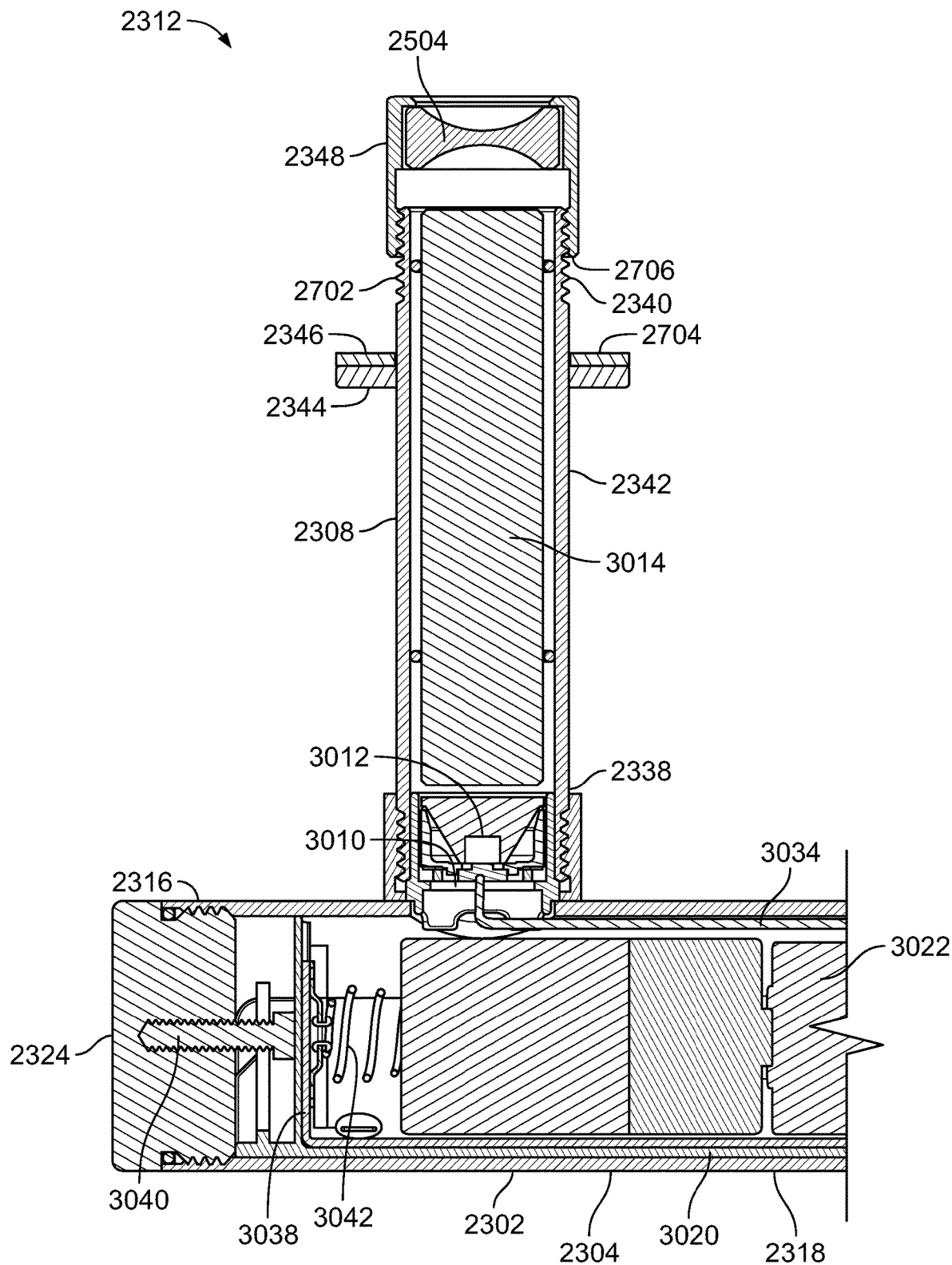
FIG. 32 is an enlarged view of a second portion of FIG. 30.
Figure 33:
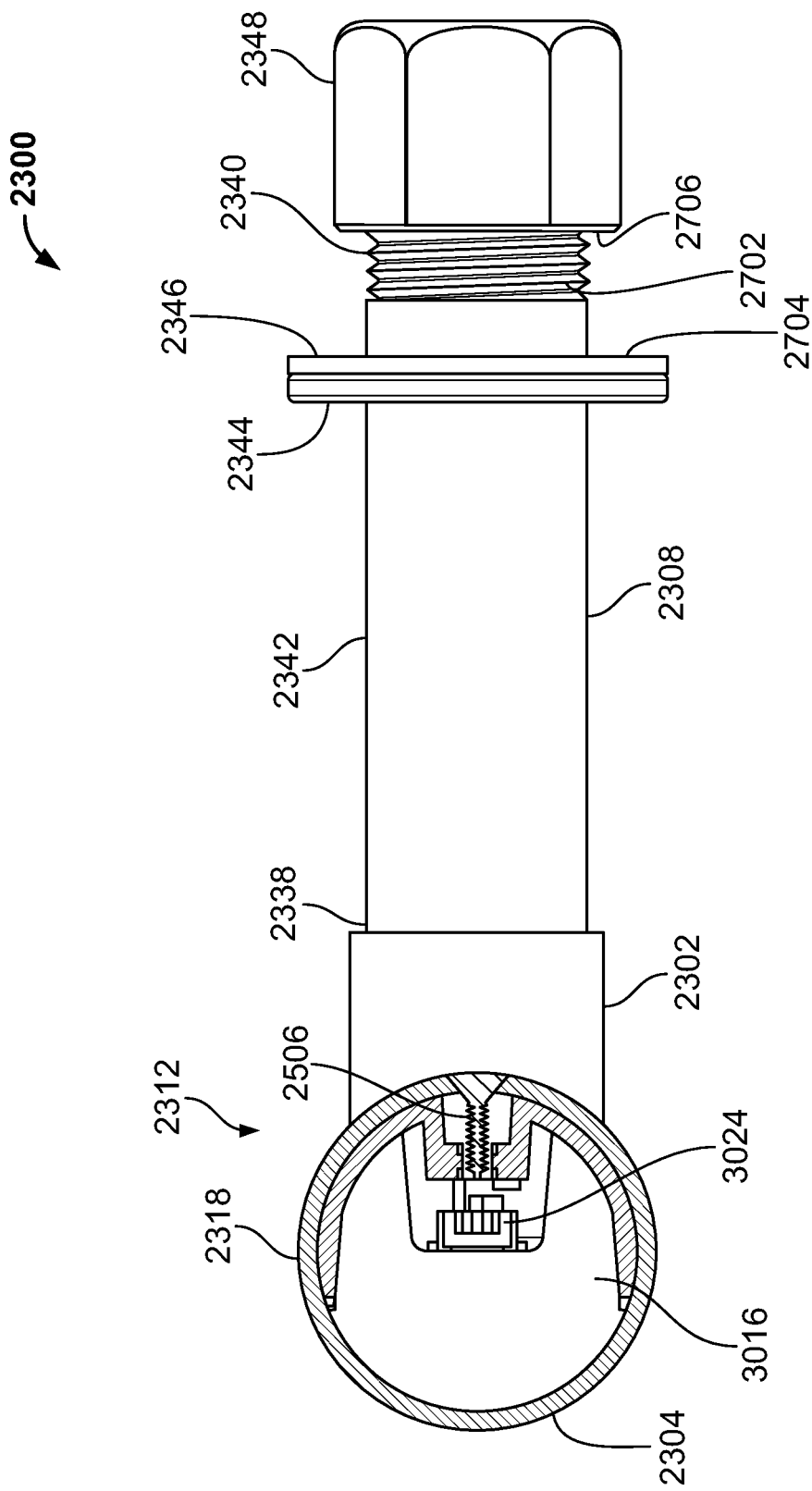
FIG. 33 is a cross-sectional view of the handle-integrated lighting assembly of FIGS. 23-32 taken along section F-F of FIG. 28.
Figure 34:
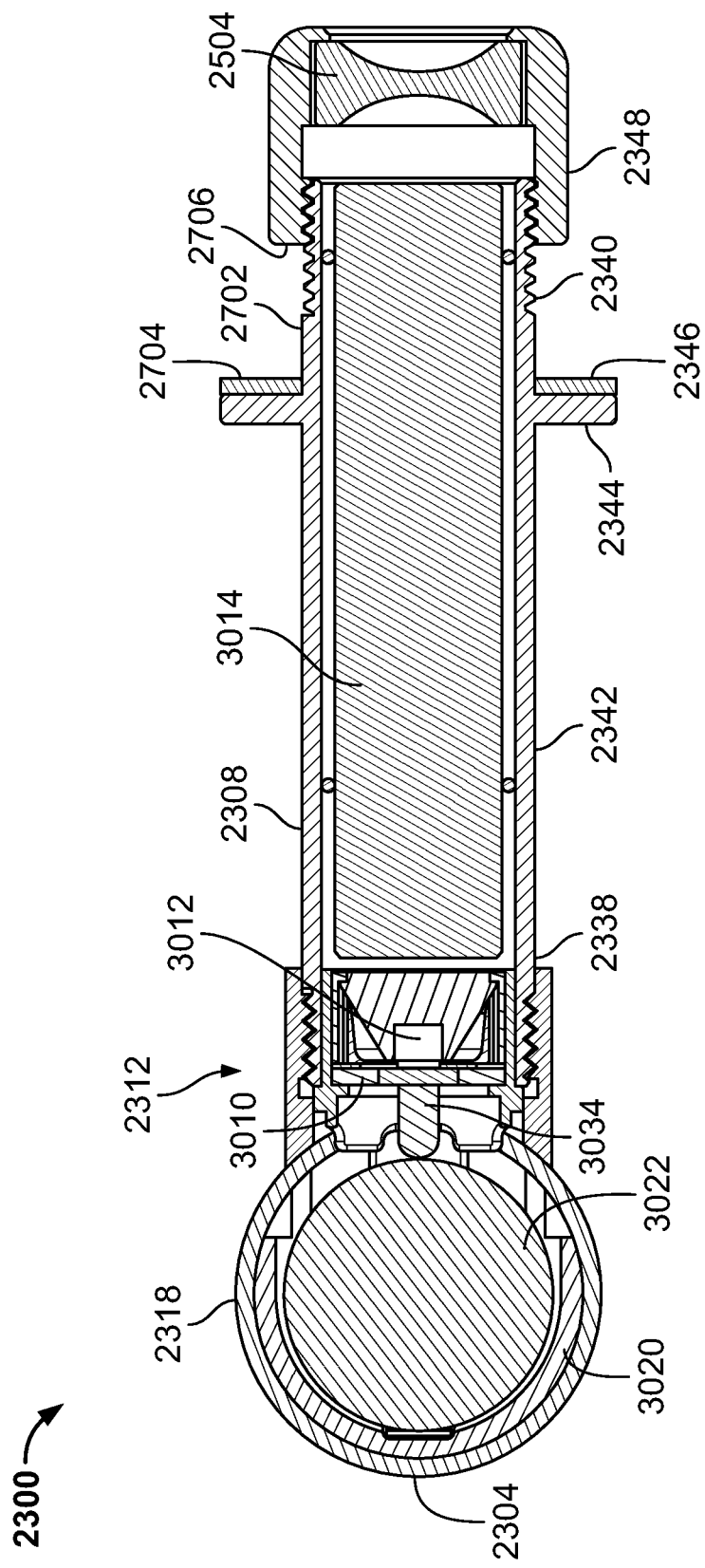
FIG. 34 is a cross-sectional view of the handle-integrated lighting assembly of FIGS. 23-33 taken along section G-G of FIG. 28.

FIG. 23 is a perspective view of another example handle-integrated lighting assembly 2300 constructed in accordance with teachings of this disclosure. FIG. 24 is a front view of the handle-integrated lighting assembly 2300 of FIG. 23. FIG. 25 is a rear view of the handle-integrated lighting assembly 2300 of FIGS. 23 and 24. FIG. 26 is a right side view of the handle-integrated lighting assembly 2300 of FIGS. 23-25. FIG. 27 is a left side view of the handle-integrated lighting assembly 2300 of FIGS. 23-26. FIG. 28 is a top view of the handle-integrated lighting assembly 2300 of FIGS. 23-27. FIG. 29 is a bottom view of the handle-integrated lighting assembly 2300 of FIGS. 23-28. FIG. 30 is a cross-sectional view of the handle-integrated lighting assembly 2300 of FIGS. 23-29 taken along section E-E of FIG. 24. FIG. 31 is an enlarged view of a first portion of FIG. 30. FIG. 32 is an enlarged view of a second portion of FIG. 30. FIG. 33 is a cross-sectional view of the handle-integrated lighting assembly 2300 of FIGS. 23-32 taken along section F-F of FIG. 28. FIG. 34 is a cross-sectional view of the handle-integrated lighting assembly 2300 of FIGS. 23-33 taken along section G-G of FIG. 28.

In the illustrated example of FIGS. 23-34, the handle-integrated lighting assembly 2300 includes an example handle 2302. The handle includes and/or is defined by an example crossbar 2304, an example first stem 2306 extending away from the crossbar 2304, and an example second stem 2308 spaced apart from the first stem 2306 and extending away from the crossbar 2304. The handle-integrated lighting assembly 2300 of FIGS. 23-34 further includes an example first lighting module 2310 located and/or positioned within (e.g., housed by) the first stem 2306 of the handle 2302, and an example second lighting module 2312 located and/or positioned within (e.g., housed by) the second stem 2308 of the handle 2302.

The crossbar 2304 of the handle 2302 of FIGS. 23-34 includes an example first end 2314, an example second end 2316 located opposite the first end 2314 of the crossbar 2304, and an example sidewall 2318 extending between the first end 2314 and the second end 2316 of the crossbar 2304. The crossbar 2304 of FIGS. 23-34 is a tubular structure (e.g., a hollow tube) having an internal volume and/or compartment configured to receive, house, and/or contain one or more component(s) of the of the handle-integrated lighting assembly 2300. In the illustrated example of FIGS. 23-34, the sidewall 2318 of the crossbar 2304 has an annular (e.g., hollow circular) profile. In other examples, the sidewall 2318 of the crossbar 2304 can instead have a non-annular profile, such as a hollow rectangular profile, a hollow triangular profile, a hollow hexagonal profile, etc.

The handle-integrated lighting assembly 2300 of FIGS. 23-34 further includes an example first end cap 2320 located and/or positioned at and/or within the first end 2314 of the crossbar 2304 of the handle 2302. In some examples, the first end cap 2320 is coupled to the first end 2314 of the crossbar 2304 via a threaded connection. In other examples, the first end cap 2320 can instead be coupled to the first end 2314 of the crossbar 2304 via a press fit, a fastener, an adhesive, a weld, or some other form of coupling mechanism. The first end cap 2320 is configured to close off and/or seal the internal volume and/or compartment of the crossbar 2304, thereby protecting one or more component(s) of the handle-integrated lighting assembly 2300 located and/or positioned within said internal volume and/or compartment of the crossbar 2304 from becoming exposed to moisture (e.g., from humidity, rain, snow, spilled fluids, etc.).

In the illustrated example of FIGS. 23-34, the first end cap 2320 of the handle-integrated lighting assembly 2300 includes an example button 2322 that is actuatable (e.g., via a user) to selectively cause an example switch 3002 located within and/or coupled to the first end cap 2320 to close a circuit of the handle-integrated lighting assembly 2300. When the switch 3002 closes the circuit (e.g., in response to a user actuating the button 2322), power is transmitted from a power source (e.g., a battery, a power supply, etc.) to the first lighting module 2310 and/or the second lighting module 2312 of the handle-integrated lighting assembly 2300, thereby causing light to be generated by and/or projected from the first lighting module 2310 and/or the second lighting module 2312. When the switch 3002 opens the circuit (e.g., in response to a user releasing the button 2322, or actuating the button 2322 a second time), power is no longer transmitted from the power source to the first lighting module 2310 and/or the second lighting module 2312 of the handle-integrated lighting assembly 2300, and light is therefore no longer generated by and/or projected from the first lighting module 2310 and/or the second lighting module 2312.

In some examples, the switch 3002 of FIGS. 23-34 is configured as an on/off switch. In such examples, a user must press and/or actuate the button 2322 of the switch 3002 two successive times to cycle the switch 3002 and/or the circuit from an off state to an on state and back to an off state. In other examples, the switch 3002 of FIGS. 23-34 can instead be configured as a momentary switch. In such examples, a user must press and hold the button 2322 of the switch 3002 to transition the switch 3002 and/or the circuit from an off state to an on state. The user can thereafter release the button 2322 of the switch 3002 to transition the switch 3002 and/or the circuit from the on state back to the off state. Implementing the switch 3002 as a momentary switch (e.g., as opposed to an on/off switch) can be advantageous with regard to preserving the remaining amount of energy associated with the power source, and/or preventing instances in which a user might otherwise inadvertently leave the switch 3002 and/or, more generally, the handle-integrated lighting assembly 2300 in a powered (e.g., light generating) state.

The handle-integrated lighting assembly 2300 of FIGS. 23-34 further includes an example second end cap 2324 located and/or positioned at and/or within the second end 2316 of the crossbar 2304 of the handle 2302. In the illustrated example of FIGS. 23-34, the second end cap 2324 is coupled to the second end 2316 of the crossbar 2304 via a threaded connection. In other examples, the second end cap 2324 can instead be coupled to the second end 2316 of the crossbar 2304 via a press fit, a fastener, an adhesive, or some other form of coupling mechanism. The second end cap 2324 is configured to close off and/or seal the internal volume and/or compartment of the crossbar 2304, thereby protecting one or more component(s) of the handle-integrated lighting assembly 2300 located and/or positioned within said internal volume and/or compartment of the crossbar 2304 from becoming exposed to moisture (e.g., from humidity, rain, snow, spilled fluids, etc.). In the illustrated example of FIGS. 23-34, the second end cap 2324 is configured to be removed (e.g., unthreaded) from the second end 2316 of the crossbar 2304 to enable a user to access, install, and/or replace a power source (e.g., one or more batteries) and/or a power chassis located within the crossbar 2304 of the handle-integrated lighting assembly 2300, as further described below.

The first stem 2306 of the handle 2302 of FIGS. 23-34 includes an example first end 2326, an example second end 2328 located opposite the first end 2326 of the first stem 2306, and an example sidewall 2330 extending between the first end 2326 and the second end 2328 of the first stem 2306. The first stem 2306 of FIGS. 23-34 is a tubular structure (e.g., a hollow tube) having an internal volume and/or compartment configured to receive, house, and/or contain one or more component(s) of the first lighting module 2310 of the handle-integrated lighting assembly 2300. In the illustrated example of FIGS. 23-34, the sidewall 2330 of the first stem 2306 has an annular (e.g., hollow circular) profile. In other examples, the sidewall 2330 of the first stem 2306 can instead have a non-annular profile, such as a hollow rectangular profile, a hollow triangular profile, a hollow hexagonal profile, etc.

In the illustrated example of FIGS. 23-34, the first stem 2306 of the handle 2302 is coupled to the crossbar 2304 of the handle 2302 via a threaded connection located at the first end 2326 of the first stem 2306, thereby enabling the first stem 2306 to be physically and/or mechanically separated from the crossbar 2304 without the use of destructive means. In other examples, the first stem 2306 of the handle 2302 can instead be integrally formed with the crossbar 2304 of the handle 2302 such that the first stem 2306 cannot be physically and/or mechanically separated from the crossbar 2304 absent the use of destructive means. In the illustrated example of FIGS. 23-34, the first stem 2306 of the handle 2302 is oriented at a perpendicular and/or orthogonal angle relative to the crossbar 2304 of the handle 2302. In other examples, the first stem 2306 of the handle 2302 can instead be oriented at a non-perpendicular and/or non-perpendicular angle relative to the crossbar 2304 of the handle 2302.

The handle-integrated lighting assembly 2300 of FIGS. 23-34 further includes an example first flange 2332, an example first bushing 2334, and an example first locknut 2336. The first flange 2332 extends outwardly (e.g., radially outwardly) from the sidewall 2330 of the first stem 2306 at a location between the first end 2326 and the second end 2328 of the first stem 2306. In the illustrated example of FIGS. 23-34, the first flange 2332 is integrally formed with the sidewall 2330 of the first stem 2306 such that the first flange 2332 cannot be physically and/or mechanically separated from the sidewall 2330 of the first stem 2306 absent the use of destructive means. In other examples, the first flange 2332 can instead be coupled to the sidewall 2330 of the first stem 2306 via a threaded connection, thereby enabling the first flange 2332 to be physically and/or mechanically separated from the sidewall 2330 of the first stem 2306 without the use of destructive means. The first bushing 2334 circumscribes the sidewall 2330 of the first stem 2306 and is located adjacent (e.g., in contact with) the first flange 2332. The first locknut 2336 is threadedly coupled (e.g., via a threaded connection) to the second end 2328 of the first stem 2306, with the first locknut 2336 being spaced apart from the first bushing 2334 and/or the first flange 2332.

In the illustrated example of FIGS. 23-34, the first flange 2332, the first bushing 2334, and the first locknut 2336 are respectively configured to couple the first stem 2306 and/or, more generally, the handle 2302 of the handle-integrated lighting assembly 2300 of FIGS. 23-34 to a lid of a grill. In this regard, an example shaft portion 2602 of the sidewall 2330 of the first stem 2306 located between the first flange 2332 and the second end 2328 of the first stem 2306 is configured to extend through a first handle mount opening formed in a front portion of the lid of the grill, whereby the first handle mount opening extends from an exterior wall and/or an exterior surface of the lid through to an interior wall and/or an interior surface of the lid. An example engagement surface 2604 of the first bushing 2334 is configured to contact and/or engage the exterior wall and/or the exterior surface of the lid, and an example locking surface 2606 of the first locknut 2336 is configured to contact and/or engage the interior wall and/or the interior surface of the lid, thereby coupling the first stem 2306 and/or, more generally, the handle 2302 of the handle-integrated lighting assembly 2300 of FIGS. 23-34 to the lid. In other examples, the first bushing 2334 can be omitted from the handle-integrated lighting assembly 2300. In such other examples, an engagement surface of the first flange 2332 (as opposed to the engagement surface 2604 of the first bushing 2334) is configured to contact and/or engage the exterior wall and/or the exterior surface of the lid to facilitate coupling the first stem 2306 and/or, more generally, the handle 2302 of the handle-integrated lighting assembly 2300 of FIGS. 23-34 to the lid.

The second stem 2308 of the handle 2302 of FIGS. 23-34 includes an example first end 2338, an example second end 2340 located opposite the first end 2338 of the second stem 2308, and an example sidewall 2342 extending between the first end 2338 and the second end 2340 of the second stem 2308. The second stem 2308 of FIGS. 23-34 is a tubular structure (e.g., a hollow tube) having an internal volume and/or compartment configured to receive, house, and/or contain one or more component(s) of the second lighting module 2312 of the handle-integrated lighting assembly 2300. In the illustrated example of FIGS. 23-34, the sidewall 2342 of the second stem 2308 has an annular (e.g., hollow circular) profile. In other examples, the sidewall 2342 of the second stem 2308 can instead have a non-annular profile, such as a hollow rectangular profile, a hollow triangular profile, a hollow hexagonal profile, etc.

In the illustrated example of FIGS. 23-34, the second stem 2308 of the handle 2302 is coupled to the crossbar 2304 of the handle 2302 via a threaded connection located at the first end 2338 of the second stem 2308, thereby enabling the second stem 2308 to be physically and/or mechanically separated from the crossbar 2304 without the use of destructive means. In other examples, the second stem 2308 of the handle 2302 can instead be integrally formed with the crossbar 2304 of the handle 2302 such that the second stem 2308 cannot be physically and/or mechanically separated from the crossbar 2304 absent the use of destructive means.

In the illustrated example of FIGS. 23-34, the second stem 2308 of the handle 2302 is oriented at a perpendicular and/or orthogonal angle relative to the crossbar 2304 of the handle 2302. In other examples, the second stem 2308 of the handle 2302 can instead be oriented at a non-perpendicular and/or non-perpendicular angle relative to the crossbar 2304 of the handle 2302.

The handle-integrated lighting assembly 2300 of FIGS. 23-34 further includes an example second flange 2344, an example second bushing 2346, and an example second locknut 2348. The second flange 2344 extends outwardly (e.g., radially outwardly) from the sidewall 2342 of the second stem 2308 at a location between the first end 2338 and the second end 2340 of the second stem 2308. In the illustrated example of FIGS. 23-34, the second flange 2344 is integrally formed with the sidewall 2342 of the second stem 2308 such that the second flange 2344 cannot be physically and/or mechanically separated from the sidewall 2342 of the second stem 2308 absent the use of destructive means. In other examples, the second flange 2344 can instead be coupled to the sidewall 2342 of the second stem 2308 via a threaded connection, thereby enabling the second flange 2344 to be physically and/or mechanically separated from the sidewall 2342 of the second stem 2308 without the use of destructive means. The second bushing 2346 circumscribes the sidewall 2342 of the second stem 2308 and is located adjacent (e.g., in contact with) the second flange 2344. The second locknut 2348 is threadedly coupled (e.g., via a threaded connection) to the second end 2340 of the second stem 2308, with the second locknut 2348 being spaced apart from the second bushing 2346 and/or the second flange 2344.

In the illustrated example of FIGS. 23-34, the second flange 2344, the second bushing 2346, and the second locknut 2348 are respectively configured to couple the second stem 2308 and/or, more generally, the handle 2302 of the handle-integrated lighting assembly 2300 of FIGS. 23-34 to a lid of a grill. In this regard, an example shaft portion 2702 of the sidewall 2342 of the second stem 2308 located between the second flange 2344 and the second end 2340 of the second stem 2308 is configured to extend through a second handle mount opening formed in a front portion of the lid of the grill, whereby the second handle mount opening extends from an exterior wall and/or an exterior surface of the lid through to an interior wall and/or an interior surface of the lid. An example engagement surface 2704 of the second bushing 2346 is configured to contact and/or engage the exterior wall and/or the exterior surface of the lid, and an example locking surface 2706 of the second locknut 2348 is configured to contact and/or engage the interior wall and/or the interior surface of the lid, thereby coupling the second stem 2308 and/or, more generally, the handle 2302 of the handle-integrated lighting assembly 2300 of FIGS. 23-34 to the lid. In other examples, the second bushing 2346 can be omitted from the handle-integrated lighting assembly 2300. In such other examples, an engagement surface of the second flange 2344 (as opposed to the engagement surface 2704 of the second bushing 2346) is configured to contact and/or engage the exterior wall and/or the exterior surface of the lid to facilitate coupling the second stem 2308 and/or, more generally, the handle 2302 of the handle-integrated lighting assembly 2300 of FIGS. 23-34 to the lid.

The first lighting module 2310 of the handle-integrated lighting assembly 2300 of FIGS. 23-34 includes an example printed circuit board (PCB) 3004, an example light source 3006, an example light pipe 3008, and an example lens 2502. In the illustrated example of FIGS. 23-34, the PCB 3004 and the light source 3006 of the first lighting module 2310 are respectively located within the first stem 2306 of the handle 2302. In other examples, the PCB 3004 and/or the light source 3006 of the first lighting module 2310 can instead be located partially or fully within the crossbar 2304 of the handle 2302. In the illustrated example of FIGS. 23-34, the light pipe 3008 of the first lighting module 2310 is located within the first stem 2306 of the handle 2302. In other examples, the light pipe 3008 of the first lighting module 2310 can instead be located partially within the crossbar 2304 of the handle 2302 and/or partially within the first locknut 2336. In the illustrated example of FIGS. 23-34, the lens 2502 of the first lighting module 2310 is located within the first locknut 2336. In other examples, the lens 2502 of the first lighting module 2310 can instead be located partially or fully within the first stem 2306 of the handle 2302.

The PCB 3004 of the first lighting module 2310 of FIGS. 23-34 is configured to support and/or carry the light source 3006 of the first lighting module 2310. The light source 3006 of the first lighting module 2310 of FIGS. 23-34 is configured to emit and/or project light. In the illustrated example of FIGS. 23-34, the light source 3006 of the first lighting module 2310 is mounted on and operatively connected to the PCB 3004 of the first lighting module 2310. The light source 3006 of the first lighting module 2310 is located and/or positioned in alignment with the first stem 2306 of the handle 2302 such that light emitted and/or projected by the light source 3006 of the first lighting module 2310 is directed through the internal volume and/or compartment of the first stem 2306. In the illustrated example of FIGS. 23-34, the light source 3006 of the first lighting module 2310 is implemented as an LED lamp including one or more LED(s), with the LED(s) of the LED lamp being configured to illuminate in response to power being supplied to the PCB 3004 of the first lighting module 2310, and/or in response to a signal, an instruction, or a command being provided to the PCB 3004 of the first lighting module 2310. In other examples, the light source 3006 of the first lighting module 2310 can instead be implemented by an alternative (e.g., non-LED) light source, such as an incandescent lamp or bulb (e.g., a halogen lamp or bulb), a fluorescent lamp or bulb, etc., with such alternative lighting source similarly being configured to illuminate in response to power being supplied to the PCB 3004 of the first lighting module 2310, and/or in response to a signal, an instruction, or a command being provided to the PCB 3004 of the first lighting module 2310.

The light pipe 3008 of the first lighting module 2310 of FIGS. 23-34 is configured to direct, guide, and or transfer light emitted and/or projected by the light source 3006 of the first lighting module 2310 to and/or towards the lens 2502 of the first lighting module 2310. In the illustrated example of FIGS. 23-34, the light pipe 3008 of the first lighting module 2310 is located and/or positioned in alignment with the light source 3006 and the lens 2502 of the first lighting module 2310 such that light emitted and/or projected by the light source 3006 of the first lighting module 2310 is directed along a generally linear pathway extending from the light source 3006 of the first lighting module 2310, through the light pipe 3008 of the first lighting module 2310, and to the lens 2502 of the first lighting module 2310. In some examples, the light pipe 3008 of the first lighting module 2310 can be implemented as a hollow structure configured to contain the directed, guided, and/or transferred light via reflective surfaces. In other examples, the light pipe 3008 of the first lighting module 2310 can instead be implemented as a transparent solid configured to contain the directed, guided, and/or transferred light via total internal reflection.

The lens 2502 of the first lighting module 2310 of FIGS. 23-34 is configured to direct and/or focuses light received from the light pipe 3008 and/or projected by the light source 3006 of the first lighting module 2310. Focused light emitted from the lens 2502 of the first lighting module 2310 is directed outwardly from the first locknut 2336 in a direction away from the handle 2302 of the handle-integrated lighting assembly 2300. In some examples, such focused light is projected into a cooking chamber defined in part by a lid of a grill, and/or onto a cooking surface of a cookbox of the grill to which the lid of the grill is movably coupled. The lens 2502 of the first lighting module 2310 of FIGS. 23-34 can be configured to have any geometry, including any thickness, any curvature, any focal length, and/or any refractive index. In the illustrated example of FIGS. 23-34, the lens 2502 of the first lighting module 2310 is implemented as a double concave lens. In other examples, the lens 2502 of the first lighting module 2310 can instead be implemented as a double convex lens, a single concave lens, or a single convex lens.

The second lighting module 2312 of the handle-integrated lighting assembly 2300 of FIGS. 23-34 includes an example printed circuit board (PCB) 3010, an example light source 3012, an example light pipe 3014, and an example lens 2504. In the illustrated example of FIGS. 23-34, the PCB 3010 and the light source 3012 of the second lighting module 2312 are respectively located within the second stem 2308 of the handle 2302. In other examples, the PCB 3010 and/or the light source 3012 of the second lighting module 2312 can instead be located partially or fully within the crossbar 2304 of the handle 2302. In the illustrated example of FIGS. 23-34, the light pipe 3014 of the second lighting module 2312 is located within the second stem 2308 of the handle 2302. In other examples, the light pipe 3014 of the second lighting module 2312 can instead be located partially within the crossbar 2304 of the handle 2302 and/or partially within the second locknut 2348. In the illustrated example of FIGS. 23-34, the lens 2504 of the second lighting module 2312 is located within the second locknut 2348. In other examples, the lens 2504 of the second lighting module 2312 can instead be located partially or fully within the second stem 2308 of the handle 2302.

The PCB 3010 of the second lighting module 2312 of FIGS. 23-34 is configured to support and/or carry the light source 3012 of the second lighting module 2312. The light source 3012 of the second lighting module 2312 of FIGS. 23-34 is configured to emit and/or project light. In the illustrated example of FIGS. 23-34, the light source 3012 of the second lighting module 2312 is mounted on and operatively connected to the PCB 3010 of the second lighting module 2312. The light source 3012 of the second lighting module 2312 is located and/or positioned in alignment with the second stem 2308 of the handle 2302 such that light emitted and/or projected by the light source 3012 of the second lighting module 2312 is directed through the internal volume and/or compartment of the second stem 2308. In the illustrated example of FIGS. 23-34, the light source 3012 of the second lighting module 2312 is implemented as an LED lamp including one or more LED(s), with the LED(s) of the LED lamp being configured to illuminate in response to power being supplied to the PCB 3010 of the second lighting module 2312, and/or in response to a signal, an instruction, or a command being provided to the PCB 3010 of the second lighting module 2312. In other examples, the light source 3012 of the second lighting module 2312 can instead be implemented by an alternative (e.g., non-LED) light source, such as an incandescent lamp or bulb (e.g., a halogen lamp or bulb), a fluorescent lamp or bulb, etc., with such alternative lighting source similarly being configured to illuminate in response to power being supplied to the PCB 3010 of the second lighting module 2312, and/or in response to a signal, an instruction, or a command being provided to the PCB 3010 of the second lighting module 2312.

The light pipe 3014 of the second lighting module 2312 of FIGS. 23-34 is configured to direct, guide, and or transfer light emitted and/or projected by the light source 3012 of the second lighting module 2312 to and/or towards the lens 2504 of the second lighting module 2312. In the illustrated example of FIGS. 23-34, the light pipe 3014 of the second lighting module 2312 is located and/or positioned in alignment with the light source 3012 and the lens 2504 of the second lighting module 2312 such that light emitted and/or projected by the light source 3012 of the second lighting module 2312 is directed along a generally linear pathway extending from the light source 3012 of the second lighting module 2312, through the light pipe 3014 of the second lighting module 2312, and to the lens 2504 of the second lighting module 2312. In some examples, the light pipe 3014 of the second lighting module 2312 can be implemented as a hollow structure configured to contain the directed, guided, and/or transferred light via reflective surfaces. In other examples, the light pipe 3014 of the second lighting module 2312 can instead be implemented as a transparent solid configured to contain the directed, guided, and/or transferred light via total internal reflection.

The lens 2504 of the second lighting module 2312 of FIGS. 23-34 is configured to direct and/or focuses light received from the light pipe 3014 and/or projected by the light source 3012 of the second lighting module 2312. Focused light emitted from the lens 2504 of the second lighting module 2312 is directed outwardly from the second locknut 2348 in a direction away from the handle 2302 of the handle-integrated lighting assembly 2300. In some examples, such focused light is projected into a cooking chamber defined in part by a lid of a grill, and/or onto a cooking surface of a cookbox of the grill to which the lid of the grill is movably coupled. The lens 2504 of the second lighting module 2312 of FIGS. 23-34 can be configured to have any geometry, including any thickness, any curvature, any focal length, and/or any refractive index. In the illustrated example of FIGS. 23-34, the lens 2504 of the second lighting module 2312 is implemented as a double concave lens. In other examples, the lens 2504 of the second lighting module 2312 can instead be implemented as a double convex lens, a single concave lens, or a single convex lens.

The handle-integrated lighting assembly 2300 of FIGS. 23-34 further includes an example control board chassis 3016, an example control board 3018, an example power chassis 3020, and an example power source 3022, each of which is configured to be located and/or positioned within the internal volume and/or compartment of the crossbar 104 of the handle 2302. The control board chassis 3016 of the handle-integrated lighting assembly 2300 is configured to support and/or carry the control board 3018 of the handle-integrated lighting assembly 2300. In the illustrated example of FIGS. 23-34, the control board 3018 is coupled to the control board chassis 3016 via one or more fastener(s) (e.g., one or more screw(s)). In other examples, the control board 3018 can instead be coupled to the control board chassis 3016 via an adhesive, a weld, or some other form of coupling mechanism. The control board chassis 3016 is configured to be positioned at a fixed location within the internal volume and/or compartment of the crossbar 2304 of the handle 2302 such that the control board chassis 3016 and the control board 3018 coupled thereto are not movable (e.g., not slidable) within the internal volume and/or compartment of the crossbar 2304. In the illustrated example of FIGS. 23-34, the control board chassis 3016 is fixedly coupled to the sidewall 2318 of the crossbar 2304 via an example set screw 2506 passing through an opening formed in the sidewall 2318 of the crossbar 2304. In other examples, the control board chassis 3016 can instead be coupled to the sidewall 2318 of the crossbar 2304 via an adhesive, a weld, or some other form of coupling mechanism.

Figure 35:
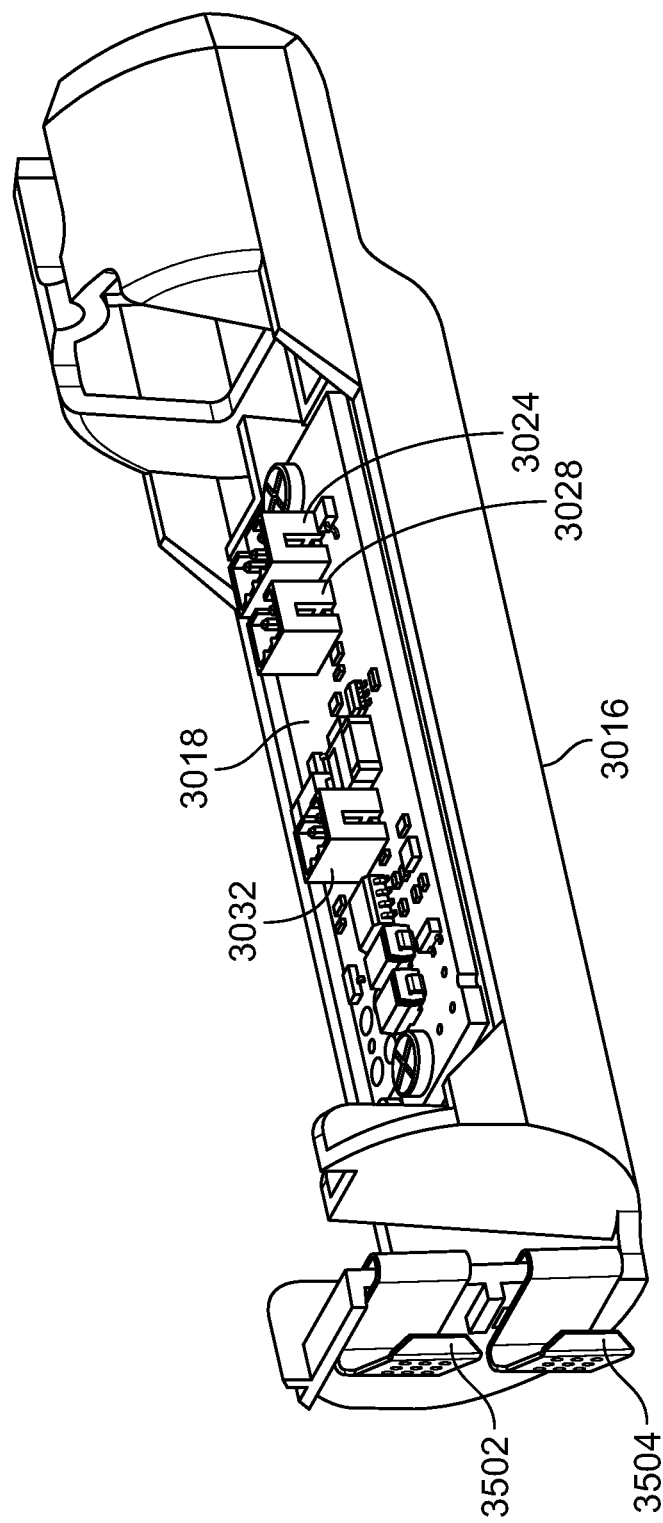
FIG. 35 is an isolated perspective view of the control board chassis and the control board of the handle-integrated lighting assembly of FIGS. 23-34.

In addition to being carried and/or supported by the control board chassis 3016, the control board 3018 of the handle-integrated lighting assembly 2300 is also operatively coupled to the control board chassis 3016. In this regard, the control board 3018 is configured to be actively powered via electric power conveyed to the control board 3018 via the control board chassis 3016. FIG. 35 is an isolated perspective view of the control board chassis 3016 and the control board 3018 of the handle-integrated lighting assembly 2300 of FIGS. 23-34. As best shown in FIG. 35, the control board chassis 3016 includes an example first leaf spring 3502 and an example second leaf spring 3504 spaced apart from the first leaf spring 3502. The first leaf spring 3502 and the second leaf spring 3504 of the control board chassis 3016 are collectively configured to convey electric power (e.g., as supplied via the power source 3022 located within the power chassis 3020) to the control board 3018 when the first leaf spring 3502 and the second leaf spring 3504 are operatively coupled to the power chassis 3020, as further described below.

The control board 3018 of the handle-integrated lighting assembly 2300 is also operatively coupled to the switch 3002, to the PCB 3004 of the first lighting module 2310, and to the PCB 3010 of the second lighting module 2312. The control board 3018 includes one or more controller(s), microcontroller(s), processor(s), microprocessor(s), electrical circuit(s), and/or electrical component(s) that are individually or collectively configured to control the operation of (1) the light source 3006 coupled to the PCB 3004 of the first lighting module 2310 and (2) the light source 3012 coupled to the PCB 3010 of the second lighting module 2312. In some examples, the controlled operations being carried out and/or performed by the control board 3018 of the handle-integrated lighting assembly 2300 occur in response to the actuation state of the switch 3002 of the handle-integrated lighting assembly 2300 (e.g., the opening or closing of an electrical circuit associated with the switch 3002) as detected at the control board 3018.

In the illustrated example of FIGS. 23-35, the control board 3018 includes one or more terminal(s) configured to facilitate operative couplings (e.g., electrical connections) between the control board 3018 on the one hand, and respective ones of the switch 3002, the PCB 3004 of the first lighting module 2310, and the PCB 3010 of the second lighting module 2312 on the other hand. For example, as shown in FIGS. 30-32 and 35, the control board 3018 includes an example first terminal 3024 configured to receive an end of an example switch cable 3026 (e.g., one or more switch wire(s)) that extends to the switch 3002, with such connection operatively coupling the control board 3018 to the switch 3002. The control board 3018 is configured to receive signals, instructions, and/or commands from the switch 3002 via the switch cable 3026 that enable the control board 2016 to detect an actuation state of the switch 3002 (e.g., the opening or closing of an electrical circuit associated with the switch 3002). The control board 3018 further includes an example second terminal 3028 configured to receive an end of an example first lighting module cable 3030 (e.g., one or more lighting module wire(s)) that extends to the PCB 3004 of the first lighting module 2310, with such connection operatively coupling the control board 3018 to the PCB 3004 and/or the light source 3006 of the first lighting module 2310. The control board 3018 is configured to transmit signals, instructions, commands, and/or power to the PCB 3004 of the first lighting module 2310 via the first lighting module cable 3030 to control the illumination of the light source 3006 of the first lighting module 2310. The control board 3018 further includes an example third terminal 3032 configured to receive an end of an example second lighting module cable 3034 (e.g., one or more lighting module wire(s)) that extends to the PCB 3010 of the second lighting module 2312, with such connection operatively coupling the control board 3018 to the PCB 3010 and/or the light source 3012 of the second lighting module 2312. The control board 3018 is configured to transmit signals, instructions, commands, and/or power to the PCB 3010 of the second lighting module 2312 via the second lighting module cable 3034 to control the illumination of the light source 3012 of the second lighting module 2312.

In some examples, the control board 3018 includes an accelerometer configured to function as an inclinometer. In such examples, the control board 3018 determines, based on signals and/or data obtained from the accelerometer, whether the handle-integrated lighting assembly 2300 and/or the lid of a grill to which the handle-integrated lighting assembly 2300 is coupled is in a raised position (e.g., an open position of the lid) or a lowered position (e.g., a closed position of the lid). In some such examples, the control board 3018 is configured (1) to cause the PCB 3004 of the first lighting module 2310 to illuminate the light source 3006 of the first lighting module 2310 and cause the PCB 3010 of the second lighting module 2312 to illuminate the light source 3012 of the second lighting module 2312 when the raised position of the handle-integrated lighting assembly 2300 (e.g., the open position of the lid) is detected, and/or (2) to cause the PCB 3004 of the first lighting module 2310 to cease illuminating the light source 3006 of the first lighting module 2310 and cause the PCB 3010 of the second lighting module 2312 to cease illuminating the light source 3012 of the second lighting module 2312 when the lowered position of the handle-integrated lighting assembly 2300 (e.g., the closed position of the lid) is detected. In some examples, such accelerometer-based operations can be carried out by the control board 3018 in conjunction with the above-described switch-based operations of the control board 3018. In other examples, such accelerometer-based operations can be carried out by the control board 3018 as an alternative to (e.g., in lieu of) the above-described switch-based operations of the control board 3018.

In some examples, the control board 3018 includes a time-out circuit configured to prevent the power source 3022 of the handle-integrated lighting assembly 2300 from draining for a prolonged, continuous period of time. For example, the power source 3022 may drain for a prolonged, continuous period of time (e.g., five minutes) when the electrical circuit associated with the switch 3002 of the handle-integrated lighting assembly 2300 remains in the closed state over the prolonged, continuous period of time without returning back to the open state. As another example, the power source 3022 may drain for a prolonged, continuous period of time (e.g., five minutes) when the lid of the grill carrying the handle-integrated lighting assembly 2300 remains in the open position (e.g., the raised position of the handle-integrated lighting assembly 2300) over the prolonged, continuous period of time without returning back to the closed position (e.g., the lowered position of the handle-integrated lighting assembly 2300). In either such example, the time-out circuit is configured to detect an occurrence of the prolonged, continuous period of time associated with the drainage and/or usage of the power source 3022. In response to the time-out circuit detecting the occurrence of the prolonged, continuous period of time, the control board 3018 causes the PCB 3004 of the first lighting module 2310 to cease illuminating the light source 3006 of the first lighting module 2310 and causes the PCB 3010 of the second lighting module 2312 to cease illuminating the light source 3012 of the second lighting module 2312.

In some examples, the control board 3018 includes a constant-current LED driver configured to regulate the brightness of the light emitted by the light source 3006 of the first lighting module 2310 and/or the light emitted by the light source 3012 of the second lighting module 2312. In this regard, the constant-current LED driver of the control board 3018 causes the light source 3006 of the first lighting module 2310 and/or the light source 3012 of the second lighting module 2312 to emit light having a constant (e.g., non-variable) brightness over the life span of the power source 3022 of the handle-integrated lighting assembly 2300 even as a battery voltage associated with the power source 3022 decreases over the life span of the power source 3022.

As described above, the control board 3018 is configured to control the operation of the light source 3006 coupled to the PCB 3004 of the first lighting module 2310 and to control the operation of the light source 3012 coupled to the PCB 3010 of the second lighting module 2312. Such controlled operations are only possible, however, when the control board 3018 of the handle-integrated lighting assembly 2300 is itself being actively powered. In the illustrated example of FIGS. 23-34, the control board 3018 is configured to be actively powered when: (1) the power source 3022 of the handle-integrated lighting assembly 2300 contains stored energy; (2) the power source 3022 is located within the power chassis 3020 of the handle-integrated lighting assembly 2300; and (3) the power chassis 3020 is operatively coupled to the control board chassis 3016 of the handle-integrated lighting assembly 2300. When the aforementioned conditions are satisfied, the control board chassis 3016 conveys electric power received from the operatively coupled power chassis 3020 (e.g., as supplied via the power source 3022 located within the power chassis 3020) to the control board 3018. Conversely, the control board 3018 will not be actively powered if: (1) the power source 3022 does not contain stored energy; (2) the power source 3022 is not located within the power chassis 3020; or (3) the power chassis 3020 is not operatively coupled to the control board chassis 3016.

The power chassis 3020 of the handle-integrated lighting assembly 2300 is movable (e.g., slidable) within the internal volume and/or compartment of the crossbar 2304 of the handle 2302 such that the power chassis 3020 can be removed from the second end 2316 of the crossbar 2304 in response to the second end cap 2324 of the handle 2302 being removed (e.g., unthreaded) from the second end 2316 of the crossbar 2304. The power chassis 3020 includes an example first end 3036 oriented toward the control board chassis 3016 and/or toward the first end 2314 of the crossbar 2304, and an example second end 3038 located opposite the first end 3036 and oriented toward the second end 2316 of the crossbar 2304. The first end 3036 of the power chassis 3020 is configured to contact and/or to be operatively coupled to the control board chassis 3016 when the power chassis 3020 is fully (e.g., maximally) loaded into the internal volume and/or compartment of the crossbar 2304 and the second end cap 2324 is secured (e.g., threadedly coupled) to the second end 2316 of the crossbar 2304. In the illustrated example of FIGS. 23-34, the second end 3038 of the power chassis 3020 is coupled to the second end cap 2324 via an example fastener 3040 such that the power chassis 3020 is movable (e.g., slidable) along with the second end cap 2324. The power chassis 3020 can accordingly be removed from within the internal volume and/or compartment of the crossbar 2304 in response to a user removing (e.g., unthreading) the second end cap 2324 from the second end 2316 of the crossbar 2304 and then pulling (e.g., in an axial direction) the second end cap 2324 in an axial direction away from the second end 2316 of the crossbar 2304.

The power chassis 3020 is configured to carry and/or contain the power source 3022 of the handle-integrated lighting assembly 2300. In this regard, the power chassis 3020 has a hollowed, hemispherical-shaped interior spanning between the first end 3036 and the second end 3038 of the power chassis 3020. In the illustrated example of FIGS. 23-34, the power source 3022 is implemented by three batteries (e.g., three C-size batteries) configured to be loaded into, and subsequently removed from, the hollowed, hemispherical-shaped interior of the power chassis 3020. In other examples, the power source 3022 can instead be implemented via a different number (e.g., 1, 2, 4, etc.) and/or a different size (e.g., AAA-size, AA-size, D-size, etc.) of batteries, as dictated based on the configuration of the hollowed, hemispherical-shaped interior of the power chassis 3020.

Figure 36:
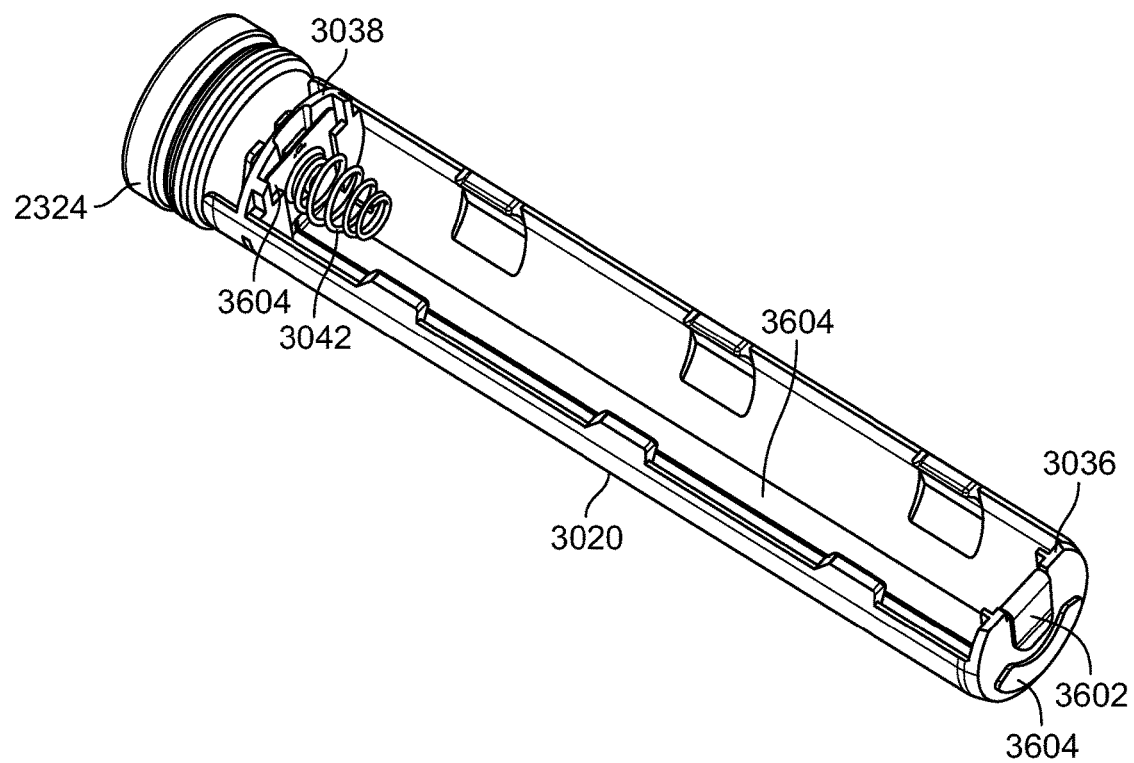
FIG. 36 is an isolated perspective view of the power chassis and the second end cap of the handle-integrated lighting assembly of FIGS. 23-34.
Figure 37:
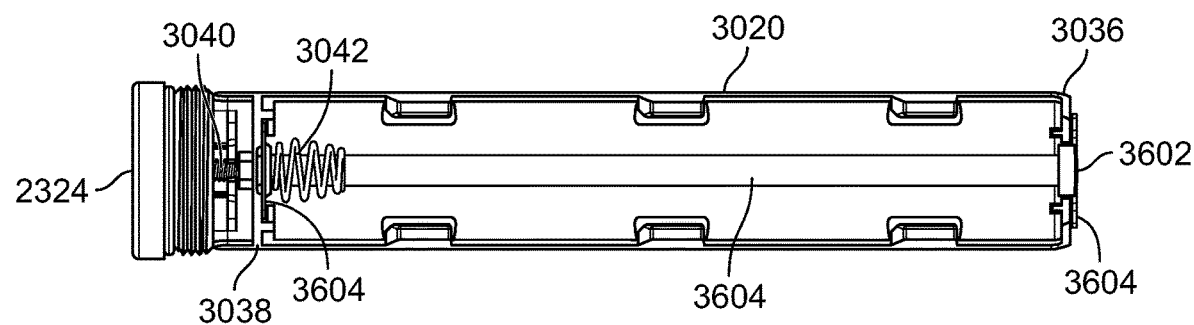
FIG. 37 an isolated rear view of the power chassis and the second end cap of the handle-integrated lighting assembly of FIGS. 23-34.

In the illustrated example of FIGS. 23-34, the power chassis 3020 further includes an example spring 3042 located at the second end 3038 of the power chassis 3020. The spring 3042 is configured to contact a negative end of the power source 3022 contained within the power chassis 3020, so as to bias a positive end of the power source 3022 toward the first end 3036 of the power chassis 3020. FIG. 36 is an isolated perspective view of the power chassis 3020 and the second end cap 2324 of the handle-integrated lighting assembly 2300 of FIGS. 23-34. FIG. 37 an isolated rear view of the power chassis 3020 and the second end cap 2324 of the handle-integrated lighting assembly 2300 of FIGS. 23-34. As best shown in FIGS. 36 and 37, the power chassis 3020 includes an example positive terminal 3602 and an example negative terminal 3604 spaced apart from the positive terminal 3602. The positive terminal 3602 of the power chassis 3020 is located at the first end 3036 of the power chassis 3020. The negative terminal 3604 of the power chassis 3020 is operatively coupled to the spring 3042 of the power chassis 3020, and extends from the second end 3038 of the power chassis 3020 to the first end 3036 of the power chassis 3020.

The positive terminal 3602 and the negative terminal 3604 of the power chassis 3020 are collectively configured to convey electric power (e.g., as supplied via the power source 3022 located within the power chassis 3020) to the control board chassis 3016 when the positive terminal 3602 and the negative terminal 3604 are operatively coupled to the control board chassis 3016. In this regard, when the power chassis 3020 is fully (e.g., maximally) loaded into the internal volume and/or compartment of the crossbar 2304 and the second end cap 2324 is secured (e.g., threadedly coupled) to the second end 2316 of the crossbar 2304, the first leaf spring 3502 contacts and/or creates an electrical connection with the positive terminal 3602 of the power chassis 3020, and the second leaf spring 3504 contacts and/or creates an electrical connection with the negative terminal 3604 of the power chassis 3020. The electrical connections formed between the positive terminal 3602 and the negative terminal 3604 of the power chassis 3020 on the one hand and the first leaf spring 3502 and the second leaf spring 3504 of the control board chassis 3016 on the other hand facilitates the conveyance and/or transmission of electric power from the power chassis 3020 (e.g., as supplied via the power source 3022 located within the power chassis 3020) to the control board chassis 3016.

A user of the handle-integrated lighting assembly 2300 of FIGS. 23-34 can activate (e.g., power on) the handle-integrated lighting assembly 2300 by actuating (e.g., pressing or holding) the button 2322 of the switch 3002. In response to the user actuating the button 2322 of the switch 3002, an electrical circuit of the handle-integrated lighting assembly 2300 transitions from an open state to a closed state. When the electrical circuit of the handle-integrated lighting assembly 2300 is placed in the closed state, the control board 3018 (1) signals, instructs, commands, and/or otherwise causes the PCB 3004 of the first lighting module 2310 to illuminate the light source 3006 of the first lighting module 2310, and (2) signals, instructs, commands, and/or otherwise causes the PCB 3010 of the second lighting module 2312 to illuminate the light source 3012 of the second lighting module 2312.

In response to such illumination, light emitted and/or projected by the light source 3006 of the first lighting module 2310 is directed, guided, and/or transferred by the light pipe 3008 of the first lighting module 2310 to the lens 2502 of the first lighting module 2310, and light emitted and/or projected by the light source 3012 of the second lighting module 2312 is directed, guided, and/or transferred by the light pipe 3014 of the second lighting module 2312 to the lens 2504 of the second lighting module 2312. The emitted and/or projected light is thereafter focused by the lens 2502 of the first lighting module 2310 and the lens 2504 of the second lighting module 2312, with the resultant focused light being directed and/or projected into a cooking chamber defined in part by a lid of a grill, and/or onto a cooking surface of a cookbox of the grill to which the lid of the grill is movably coupled.

The user of the handle-integrated lighting assembly 2300 of FIGS. 23-34 can thereafter deactivate (e.g., power off) the handle-integrated lighting assembly 2300 by once again actuating (e.g., pressing again, or releasing) the button 2322 of the switch 3002. In response to the user once again actuating the button 2322 of the switch 3002, the electrical circuit of the handle-integrated lighting assembly 2300 transitions from the closed state back to the open state. When the electrical circuit of the handle-integrated lighting assembly 2300 is transitioned back to the open state, the control board 3018 (1) signals, instructs, commands, and/or otherwise causes the PCB 3004 of the first lighting module 2310 to cease illuminating the light source 3006 of the first lighting module 2310, and (2) signals, instructs, commands, and/or otherwise causes the PCB 3010 of the second lighting module 2312 to cease illuminating the light source 3012 of the second lighting module 2312.

Alternatively, a user of the handle-integrated lighting assembly 2300 of FIGS. 23-34 can activate (e.g., power on) the handle-integrated lighting assembly 2300 by moving the handle-integrated lighting assembly 2300 from a lowered position to a raised position. Such movement may occur, for example, upon the user moving a lid of a grill to which the handle-integrated lighting assembly 2300 is coupled from a closed position to an open position. In response to the user moving the handle-integrated lighting assembly 2300 from the lowered position to the raised position, the control board 3018 detects (e.g., based on signals and/or data obtained from an accelerometer of the control board 3018) that the handle-integrated lighting assembly 2300 is in the raised position. When the raised position is detected, the control board 3018 (1) signals, instructs, commands, and/or otherwise causes the PCB 3004 of the first lighting module 2310 to illuminate the light source 3006 of the first lighting module 2310, and (2) signals, instructs, commands, and/or otherwise causes the PCB 3010 of the second lighting module 2312 to illuminate the light source 3012 of the second lighting module 2312.

In response to such illumination, light emitted and/or projected by the light source 3006 of the first lighting module 2310 is directed, guided, and/or transferred by the light pipe 3008 of the first lighting module 2310 to the lens 2502 of the first lighting module 2310, and light emitted and/or projected by the light source 3012 of the second lighting module 2312 is directed, guided, and/or transferred by the light pipe 3014 of the second lighting module 2312 to the lens 2504 of the second lighting module 2312. The emitted and/or projected light is thereafter focused by the lens 2502 of the first lighting module 2310 and the lens 2504 of the second lighting module 2312, with the resultant focused light being directed and/or projected into a cooking chamber defined in part by a lid of a grill, and/or onto a cooking surface of a cookbox of the grill to which the lid of the grill is movably coupled.

The user of the handle-integrated lighting assembly 2300 of FIGS. 23-34 can thereafter deactivate (e.g., power off) the handle-integrated lighting assembly 2300 by returning the handle-integrated lighting assembly 2300 from the raised position to the lowered position. Such movement may occur, for example, upon the user moving the lid of the grill to which the handle-integrated lighting assembly 2300 is coupled from the open position back to the closed position. In response to the user returning the handle-integrated lighting assembly 2300 from the raised position to the lowered position, the control board 3018 detects (e.g., based on signals and/or data obtained from an accelerometer of the control board 3018) that the handle-integrated lighting assembly 2300 is in the lowered position. When the lowered position is detected, the control board 3018 (1) signals, instructs, commands, and/or otherwise causes the PCB 3004 of the first lighting module 2310 to cease illuminating the light source 3006 of the first lighting module 2310, and (2) signals, instructs, commands, and/or otherwise causes the PCB 3010 of the second lighting module 2312 to cease illuminating the light source 3012 of the second lighting module 2312.

Figure 38:
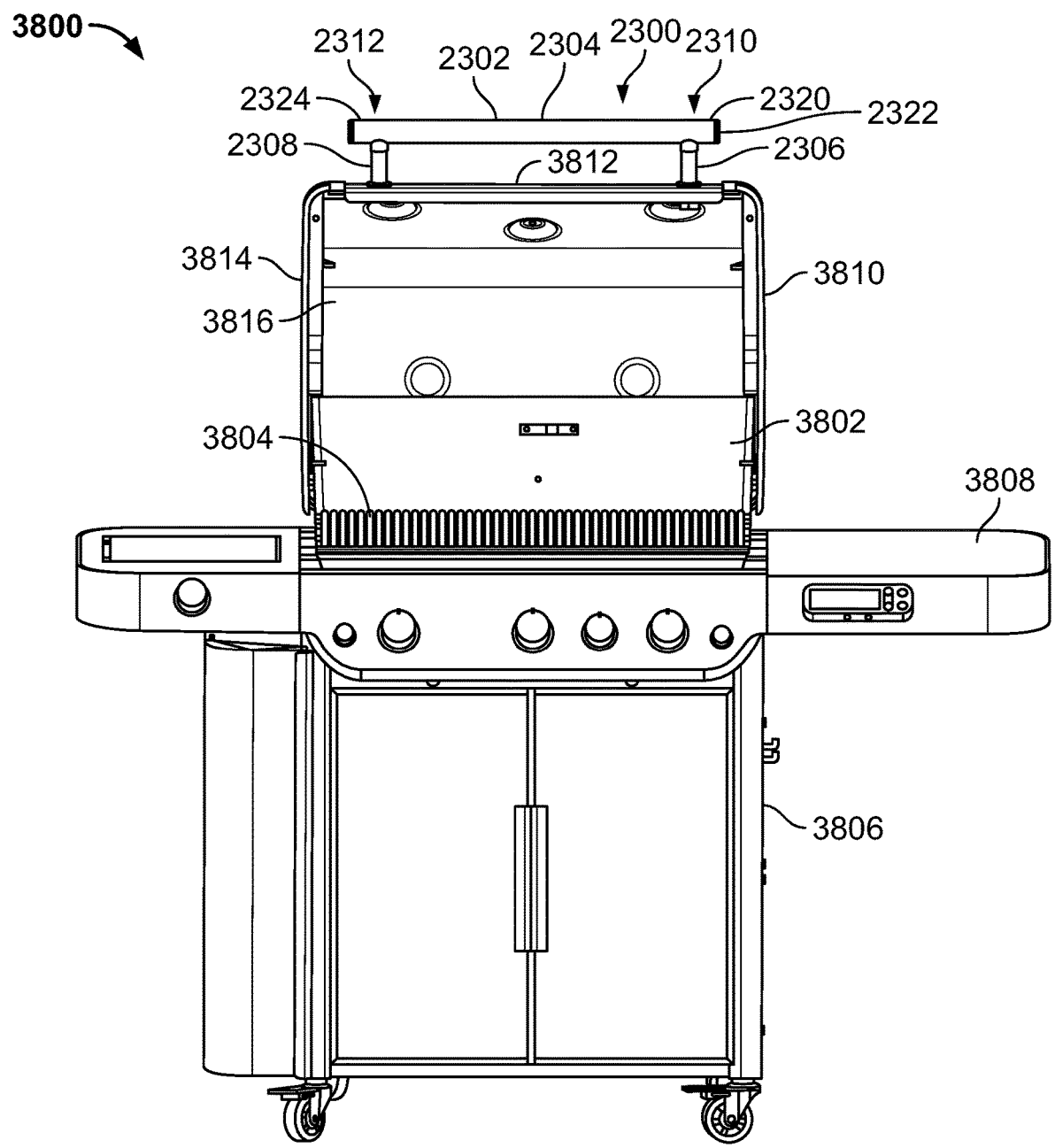
FIG. 38 is a perspective view of an example grill including the handle-integrated lighting assembly of FIGS. 23-37.

FIG. 38 is a perspective view of an example grill 3800 including the handle-integrated lighting assembly 2300 of FIGS. 23-37. The grill 3800 of FIG. 38 further includes an example cookbox 3804, one or more example cooking grate(s) 3806, an example base 3808, an example side shelf 3810, and an example lid 3812. The cookbox 3804 of the grill 3800 can house, carry, and/or otherwise include a heat-generating and/or heat-emitting structure positioned within the cookbox 3804. For example, in instances where the grill 3800 is a gas grill, the cookbox 3804 of the grill 3800 can house, carry, and/or otherwise include one or more burner tube(s) configured to generate and/or emit a heat-producing gas flame. As another example, in instances where the grill 3800 is a solid-fuel grill (e.g., a charcoal grill, a pellet grill, etc.), the cookbox 3804 of the grill 3800 can house, carry, and/or otherwise include a burn pot and/or a burn pit configured to generate and/or emit heat from charcoal and/or wood pellets being combusted thereon or therein. In some examples, the cookbox 3804 of the grill 3800 can further include one or more grease deflection bar(s) located and/or positioned within the cookbox 3804 above the aforementioned heat-generating and/or heat-emitting structure(s) of the cookbox 3804.

The cookbox 3804 of the grill 3800 further includes the cooking grate(s) 3806, with the cooking grate(s) 3806 being located and/or positioned within the cookbox 3804 above the aforementioned heat-generating and/or heat-emitting structure(s) of the cookbox 3804, and/or above the aforementioned grease deflection bars of the cookbox 3804. The cooking grate(s) 3806 is/are configured to form and/or define a substantially flat, planar cooking surface for cooking one or more food item(s) placed thereon. As shown in FIG. 38, the cooking grate(s) 3806 is/are configured to fill, cover, and/or occupy the substantial entirety of the horizontal form factor and/or footprint of the cookbox 3804 (e.g., as defined by the width and the depth of the cookbox 3804). In other examples, the cooking grate(s) 3806 can instead be configured to fill, cover, and/or occupy a relatively smaller portion and/or percentage (e.g., less than the substantial entirety) of the horizontal form factor and/or footprint of the cookbox 3804. Light emitted and/or projected by and/or from the handle-integrated lighting assembly 2300 of the grill 3800 is directed and/or projected into a cooking chamber defined in part by the cookbox 3804 of the grill 3800, and/or onto the cooking surface formed and/or defined by the cooking grate(s) 3806 of the grill 3800.

The cookbox 3804 of the grill 3800 is coupled to, positioned on, and/or supported by the base 3808 of the grill 3800. The base 3808 can be structured as a cart, a storage compartment, a frame, and/or any number of legs that may be suitable to support the cookbox 3804. In some examples, a power source (e.g., a power supply, a power converter, a battery, etc.) that powers the handle-integrated lighting assembly 230 can be coupled to and/or located within the base 3808 of the grill 3800. The side shelf 3810 of the grill 3800 is coupled to and/or supported by the cookbox 3804 and/or the base 3808 of the grill 3800. In some examples, the power source (e.g., a power supply, a power converter, a battery, etc.) that powers the handle-integrated lighting assembly 2300 can alternatively be coupled to and/or located beneath the side shelf 3810 of the grill 3800, as opposed to being coupled to and/or located within the base 3808 of the grill 3800. In still other examples, the power source (e.g., a power supply, a power converter, a battery, etc.) that powers the handle-integrated lighting assembly 2300 can alternatively be coupled to and/or located within the lid 3812 of the grill 3800 or the handle 2302 of the handle-integrated lighting assembly 2300.

The lid 3812 of the grill 3800 is movably coupled (e.g., via one or more hinge(s) or pin(s)) to the cookbox 3804 of the grill 3800 in a manner that enables the lid 3812 to be moved (e.g., pivoted and/or rotated) relative to the cookbox 3804 between a closed position and an open position (e.g., as shown in FIG. 38). The cookbox 3804 and the lid 3812 collectively define a cooking chamber of the grill 3800, with said cooking chamber being fully formed when the lid 3812 is in the closed position. Placement of the lid 3812 in the open position enables a user to access the cookbox 3804, the cooking grate(s) 3806, and/or the cooking chamber of the grill 3800, as may be required to load, unload, and/or otherwise access a food item located therein or thereon. Movement of the lid 3812 between the closed position and the open position can be performed by a user of the grill 3800 via the handle 2302 of the handle-integrated lighting assembly 2300, with said handle 2302 being coupled and/or mounted to the lid 3812.

Figure 39:
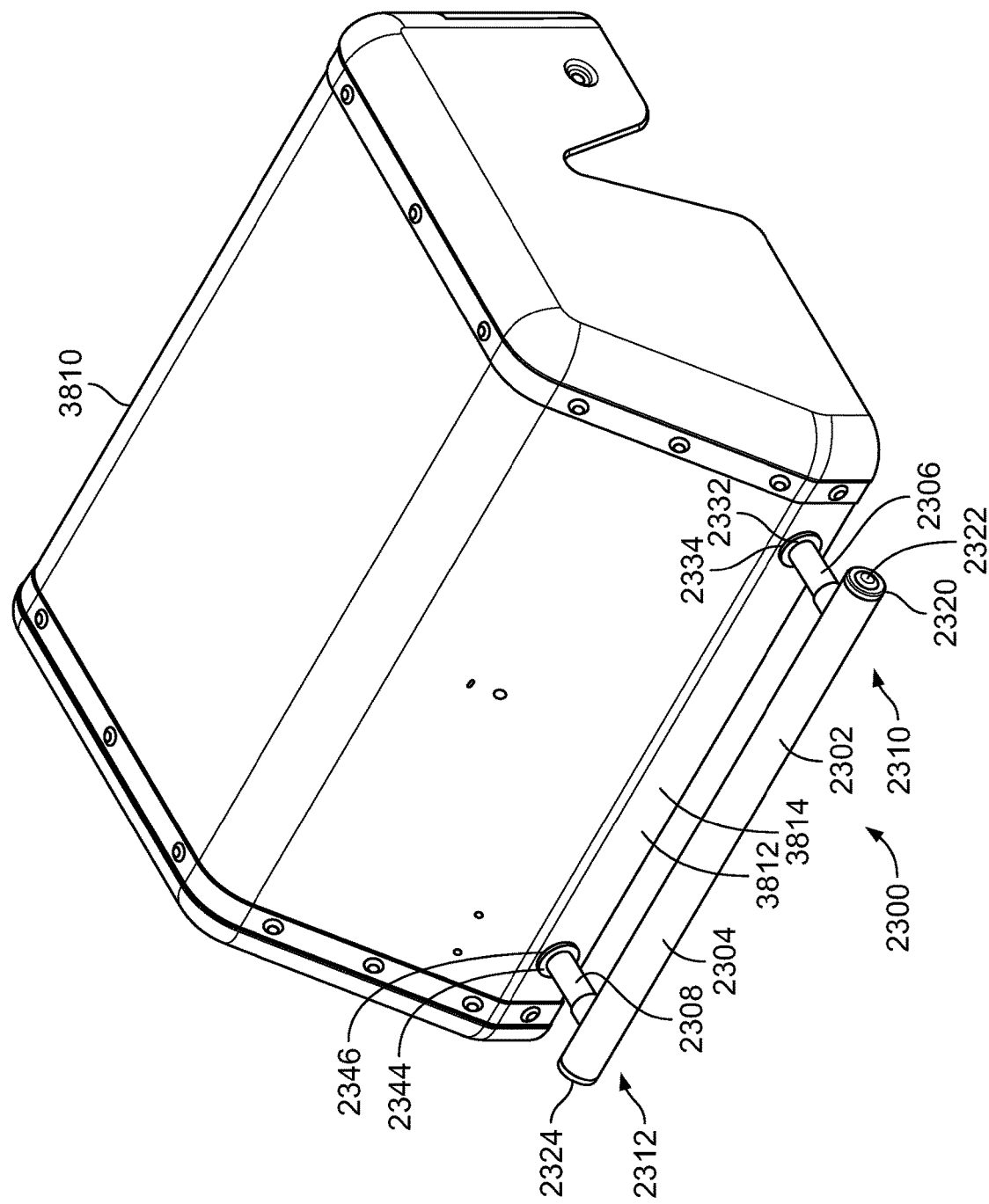
FIG. 39 is a perspective view of the handle-integrated lighting assembly of FIGS. 23-38 coupled to the lid of FIG. 38.
Figure 40:
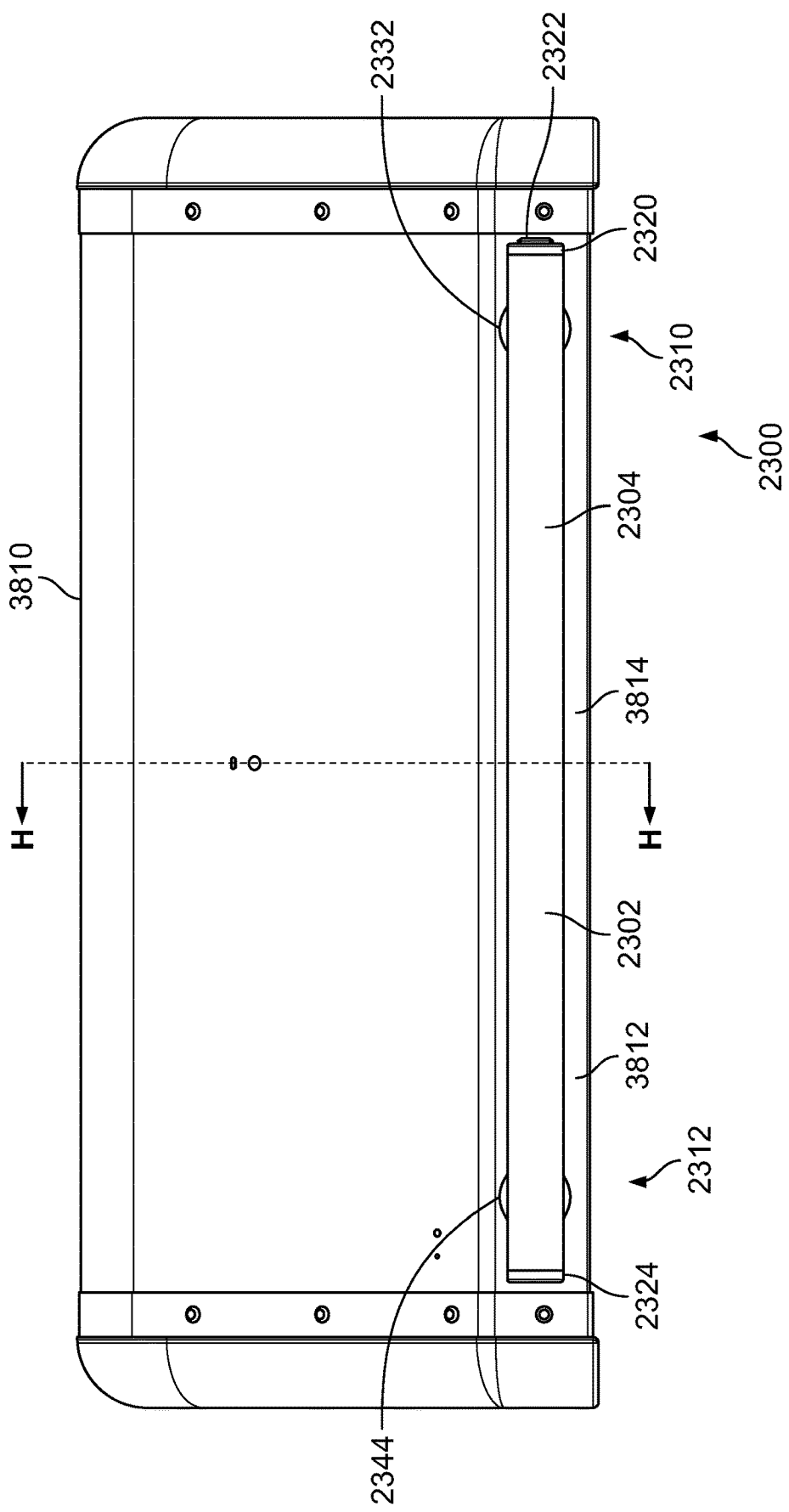
FIG. 40 is a front view of the handle-integrated lighting assembly of FIGS. 23-39 coupled to the lid of FIGS. 38 and 39.
Figure 41:
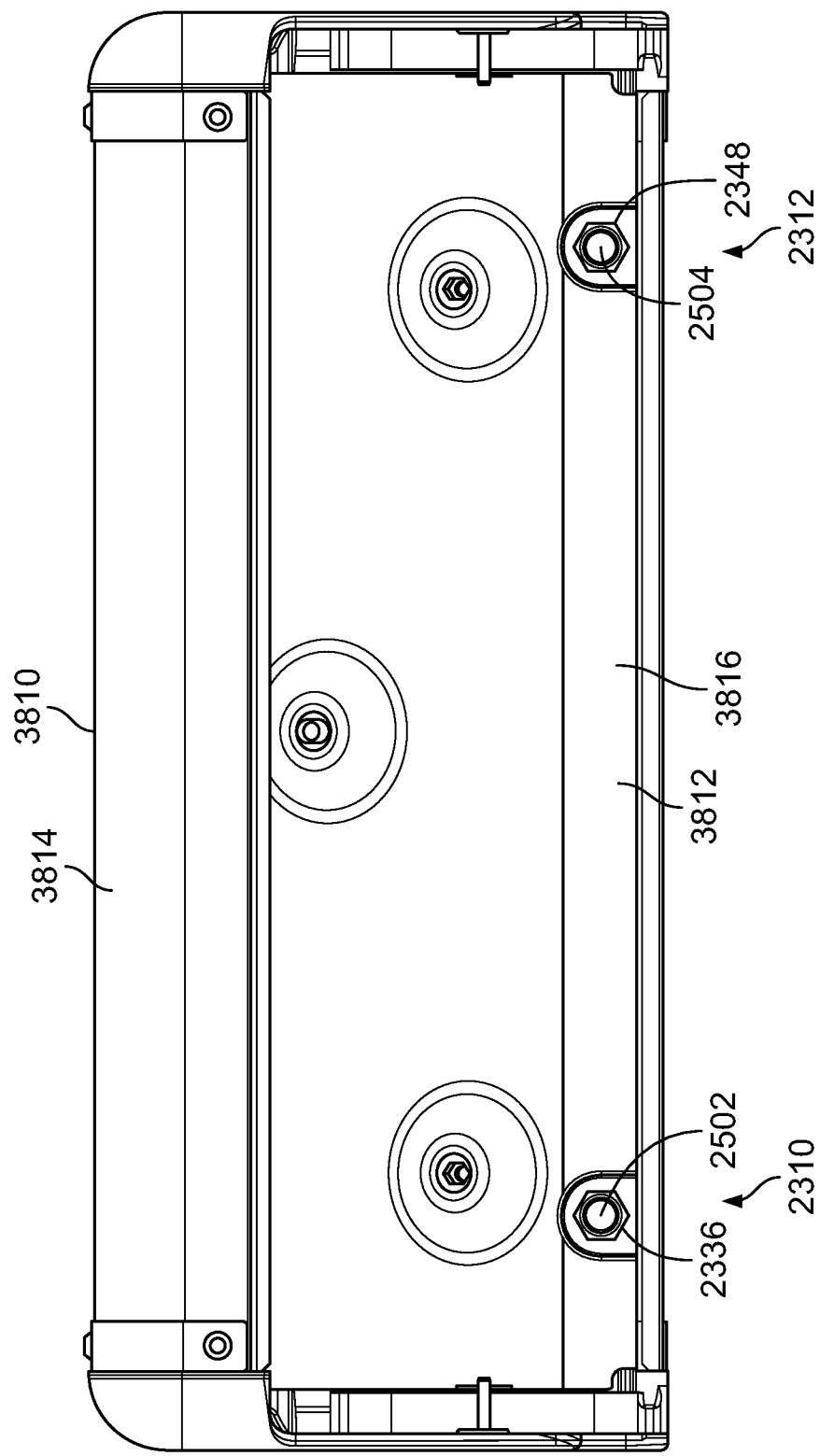
FIG. 41 is a rear view of the handle-integrated lighting assembly of FIGS. 23-40 coupled to the lid of FIGS. 38-40.
Figure 42:
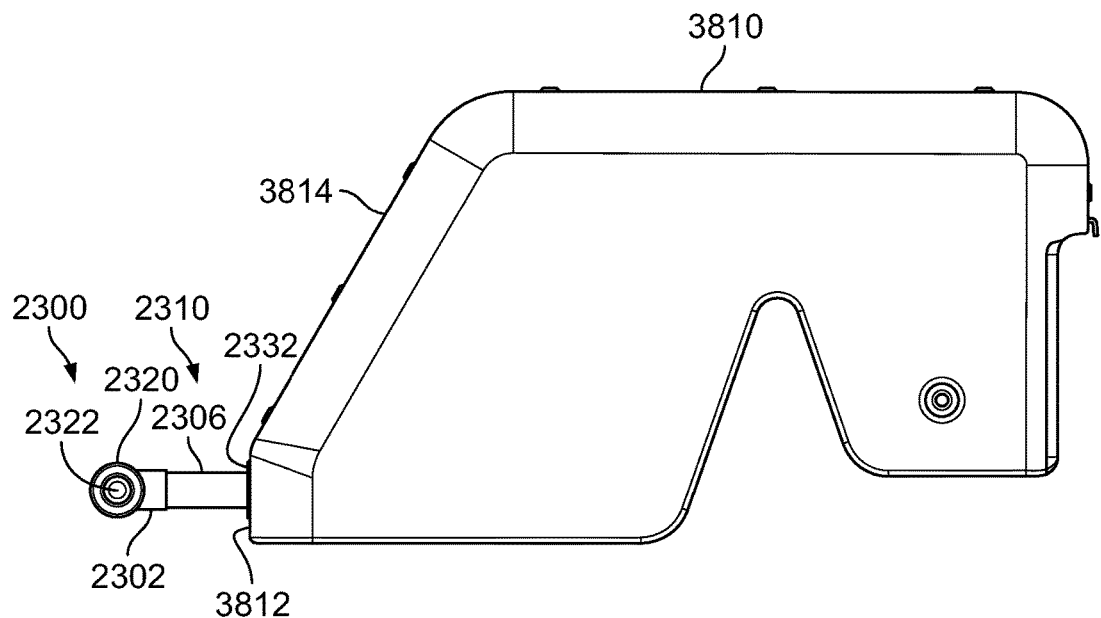
FIG. 42 is a right side view of the handle-integrated lighting assembly of FIGS. 23-41 coupled to the lid of FIGS. 38-41.
Figure 43:
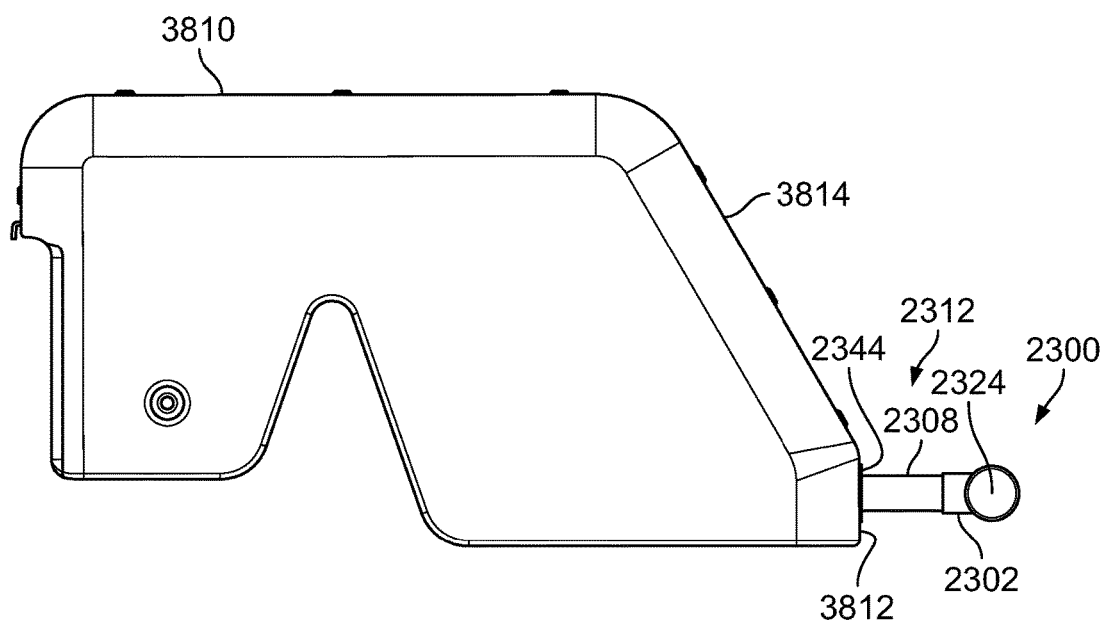
FIG. 43 is a left side view of the handle-integrated lighting assembly of FIGS. 23-42 coupled to the lid of FIGS. 38-42.
Figure 44:
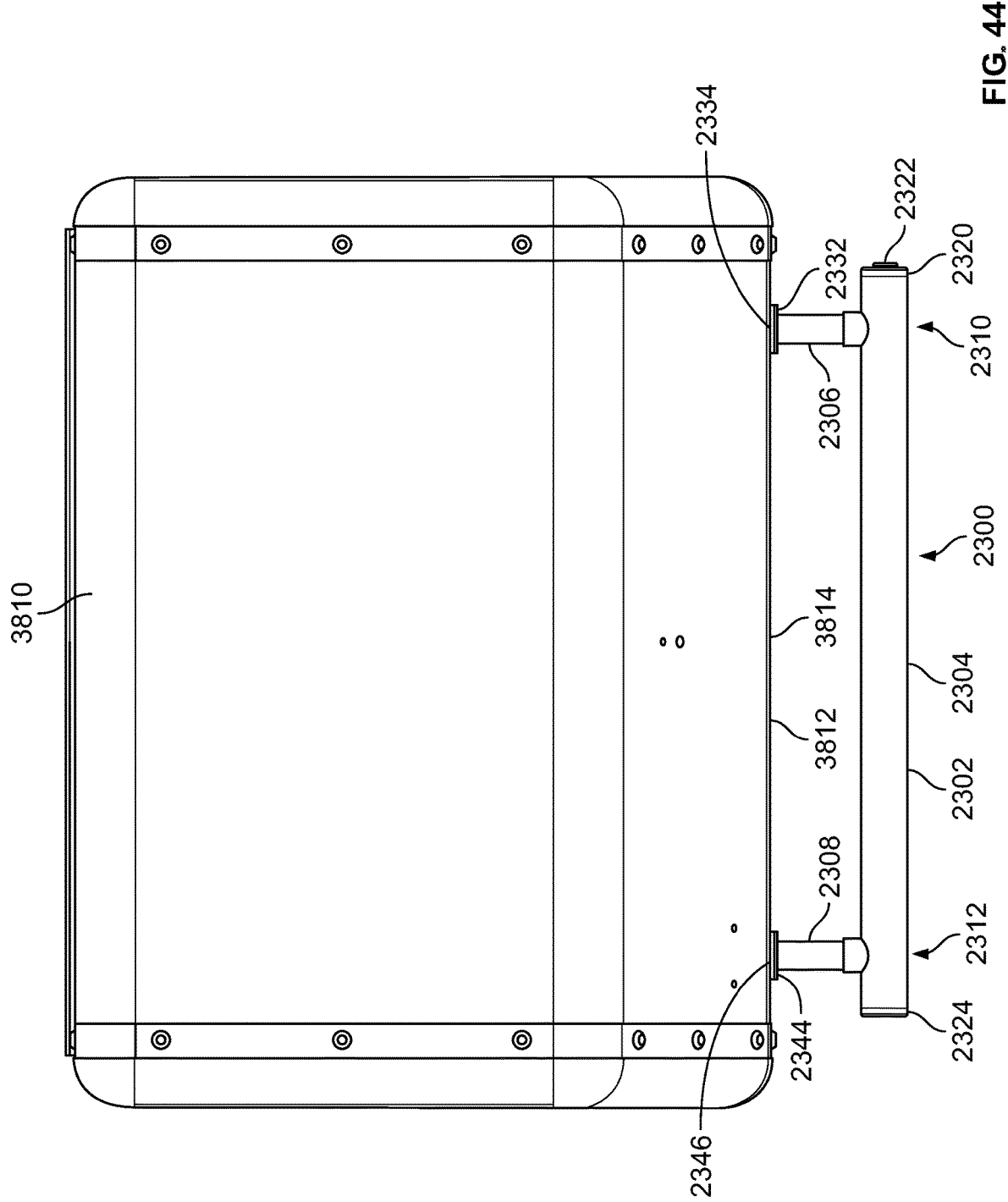
FIG. 44 is a top view of the handle-integrated lighting assembly of FIGS. 23-43 coupled to the lid of FIG. 38-43.
Figure 45:
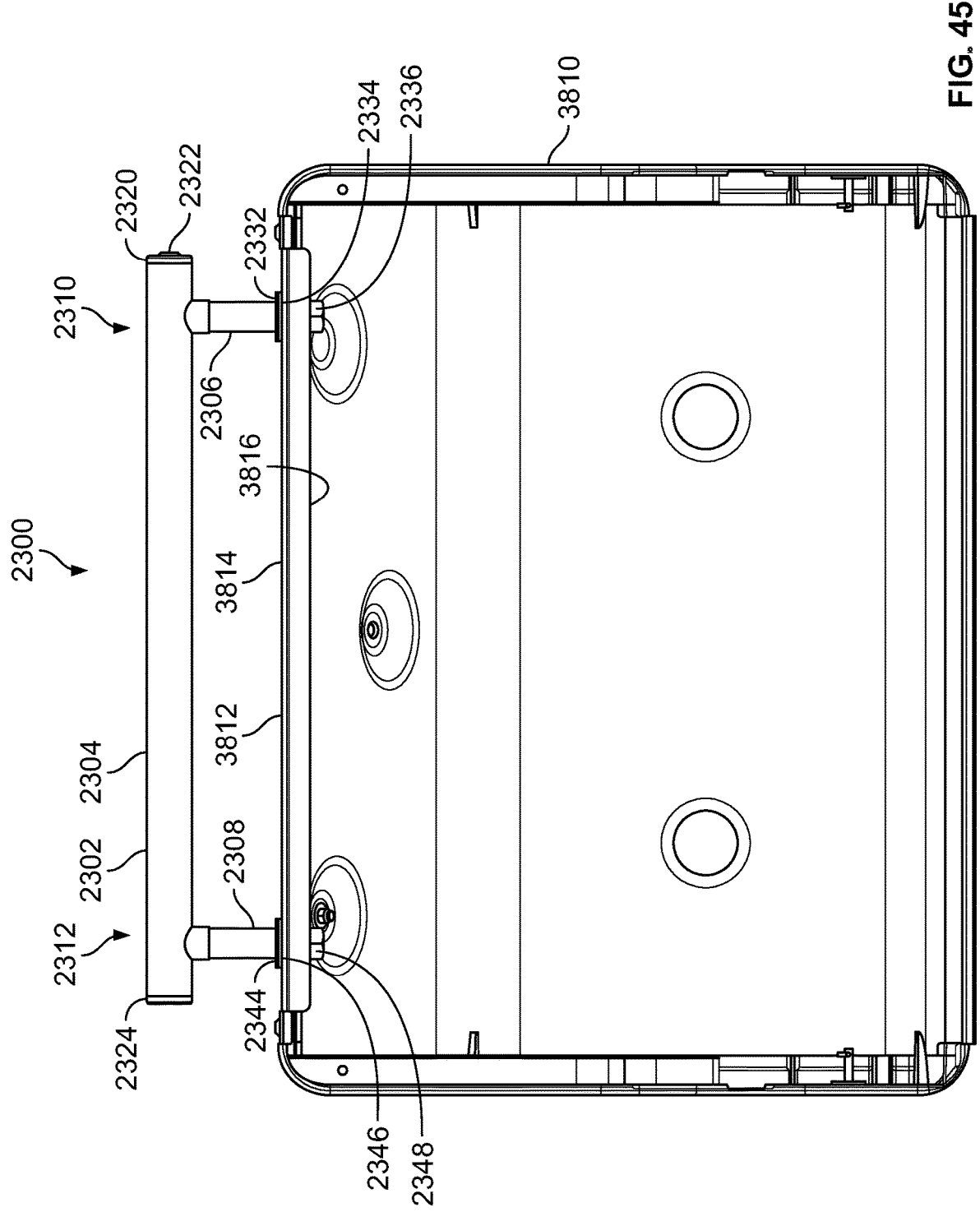
FIG. 45 is a bottom view of the handle-integrated lighting assembly of FIGS. 23-44 coupled to the lid of FIGS. 38-44.
Figure 46:
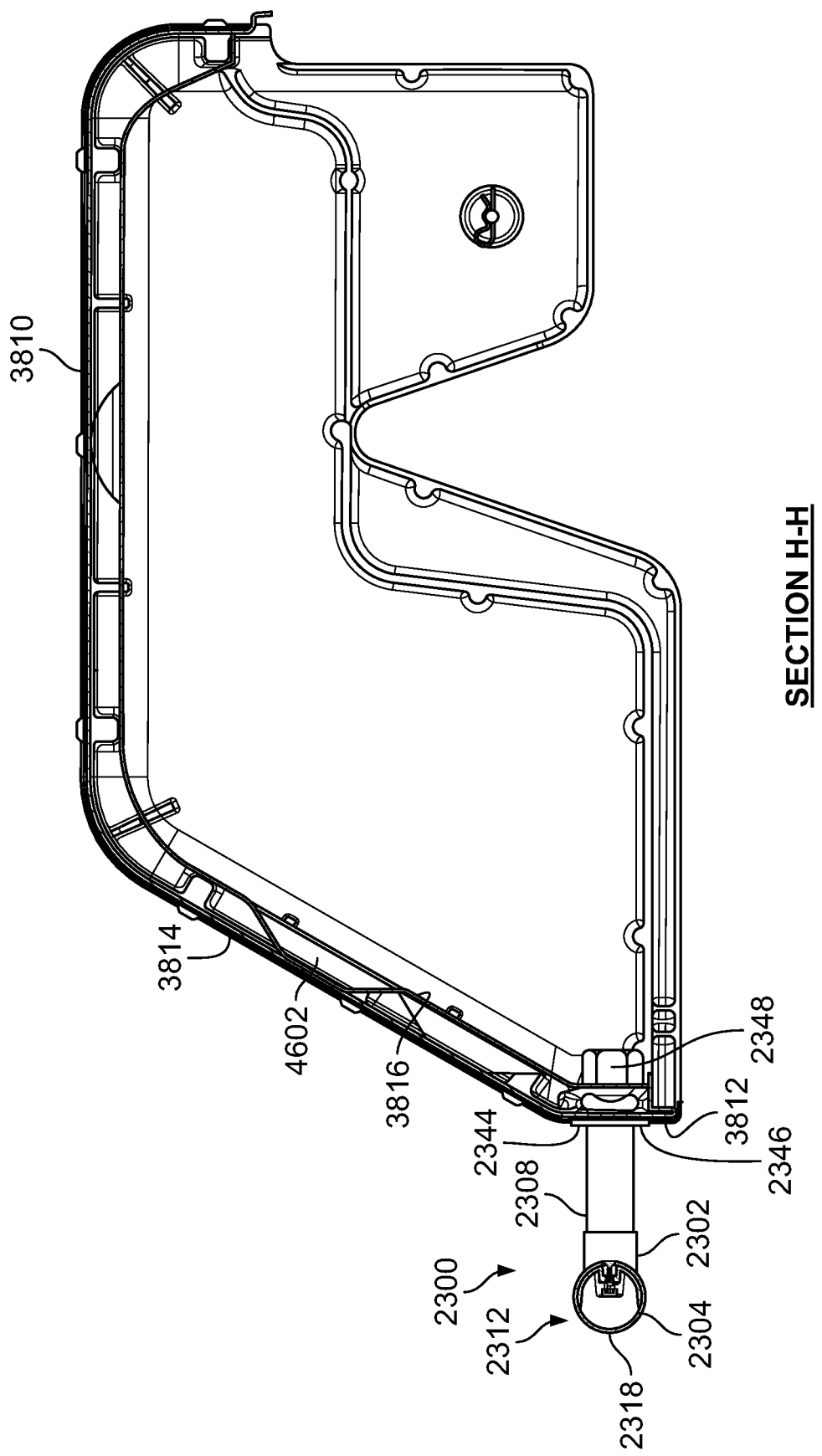
FIG. 46 is a cross-sectional view taken along section H-H of FIG. 40 showing the handle-integrated lighting assembly of FIGS. 23-45 coupled to the lid of FIGS. 38-45.

FIG. 39 is a perspective view of the handle-integrated lighting assembly 2300 of FIGS. 23-38 coupled to the lid 3812 of FIG. 38. FIG. 40 is a front view of the handle-integrated lighting assembly 2300 of FIGS. 23-39 coupled to the lid 3812 of FIGS. 38 and 39. FIG. 41 is a rear view of the handle-integrated lighting assembly 2300 of FIGS. 23-40 coupled to the lid 3812 of FIGS. 38-40. FIG. 42 is a right side view of the handle-integrated lighting assembly 2300 of FIGS. 23-41 coupled to the lid 3812 of FIGS. 38-41. FIG. 43 is a left side view of the handle-integrated lighting assembly 2300 of FIGS. 23-42 coupled to the lid 3812 of FIGS. 38-42. FIG. 44 is a top view of the handle-integrated lighting assembly 2300 of FIGS. 23-43 coupled to the lid 3812 of FIG. 38-43. FIG. 45 is a bottom view of the handle-integrated lighting assembly 2300 of FIGS. 23-44 coupled to the lid 3812 of FIGS. 38-44. FIG. 46 is a cross-sectional view taken along section H-H of FIG. 40 showing the handle-integrated lighting assembly 2300 of FIGS. 23-45 coupled to the lid 3812 of FIGS. 38-45.

In the illustrated example of FIGS. 38-46, the handle-integrated lighting assembly 2300 is coupled and/or mounted to an example front section 3814 of the lid 3812 of the grill 3800. The front section 3814 and/or, more generally, the lid 3812 is a double-walled structure having an example exterior wall 3816, an example interior wall 3818, and an example gap 4602 located between the exterior wall 3816 and the interior wall 3818 of the lid 3812. The shaft portion 2602 of the sidewall 2330 of the first stem 2306 extends through the exterior wall 3816 and the interior wall 3818 of the lid 3812. The engagement surface 2604 of the first bushing 2334 contacts and/or engages the exterior wall 3816 of the lid 3812, and the locking surface 2606 of the first locknut 2336 contacts and/or engages the interior wall 3818 of the lid 3812, thereby coupling the first stem 2306 and/or, more generally, the handle 2302 of the handle-integrated lighting assembly 2300 of FIGS. 23-34 to the lid 3812. Similarly, the shaft portion 2702 of the sidewall 2342 of the second stem 2308 extends through the exterior wall 3816 and the interior wall 3818 of the lid 3812. The engagement surface 2704 of the second bushing 2346 contacts and/or engages the exterior wall 3816 of the lid 3812, and the locking surface 2706 of the second locknut 2348 contacts and/or engages the interior wall 3818 of the lid 3812, thereby coupling the second stem 2308 and/or, more generally, the handle 2302 of the handle-integrated lighting assembly 2300 of FIGS. 23-34 to the lid 3812. In other examples, the lid 3812 can instead be configured as a single-walled structure having an exterior surface to be contacted and/or engaged by the engagement surface 2604 of the first bushing 2334 and/or the engagement surface 2704 of the second bushing 2346, and an interior surface to be contacted and/or engaged by the locking surface 2606 of the first locknut 2336 and/or the locking surface 2706 of the second locknut 2348.

A user of the grill 3800 of FIG. 38 can activate (e.g., power on) the handle-integrated lighting assembly 2300 by actuating (e.g., pressing or holding) the button 2322 of the switch 3002. In response to the user actuating the button 2322 of the switch 3002, an electrical circuit of the handle-integrated lighting assembly 2300 transitions from an open state to a closed state. When the electrical circuit of the handle-integrated lighting assembly 2300 is placed in the closed state, the control board 3018 (1) signals, instructs, commands, and/or otherwise causes the PCB 3004 of the first lighting module 2310 to illuminate the light source 3006 of the first lighting module 2310, and (2) signals, instructs, commands, and/or otherwise causes the PCB 3010 of the second lighting module 2312 to illuminate the light source 3012 of the second lighting module 2312.

In response to such illumination, light emitted and/or projected by the light source 3006 of the first lighting module 2310 is directed, guided, and/or transferred by the light pipe 3008 of the first lighting module 2310 to the lens 2502 of the first lighting module 2310, and light emitted and/or projected by the light source 3012 of the second lighting module 2312 is directed, guided, and/or transferred by the light pipe 3014 of the second lighting module 2312 to the lens 2504 of the second lighting module 2312. The emitted and/or projected light is thereafter focused by the lens 2502 of the first lighting module 2310 and the lens 2504 of the second lighting module 2312, with the resultant focused light being directed and/or projected into the cooking chamber defined by the cookbox 3804 and the lid 3812 of the grill 3800, and/or onto the cooking surface formed by the cooking grate(s) 3806 of the grill 3800.

The user of the grill 3800 of FIG. 38 can thereafter deactivate (e.g., power off) the handle-integrated lighting assembly 2300 by once again actuating (e.g., pressing again, or releasing) the button 2322 of the switch 3002. In response to the user once again actuating the button 2322 of the switch 3002, the electrical circuit of the handle-integrated lighting assembly 2300 transitions from the closed state back to the open state. When the electrical circuit of the handle-integrated lighting assembly 2300 is transitioned back to the open state, the control board 3018 (1) signals, instructs, commands, and/or otherwise causes the PCB 3004 of the first lighting module 2310 to cease illuminating the light source 3006 of the first lighting module 2310, and (2) signals, instructs, commands, and/or otherwise causes the PCB 3010 of the second lighting module 2312 to cease illuminating the light source 3012 of the second lighting module 2312.

Alternatively, a user of the grill 3800 of FIG. 38 can activate (e.g., power on) the handle-integrated lighting assembly 2300 by moving the lid 3812 of the grill 3800 from a closed position to an open position. In response to the user moving the lid 3812 from the lowered position to the raised position, the control board 3018 detects (e.g., based on signals and/or data obtained from an accelerometer of the control board 3018) that the handle-integrated lighting assembly 2300 coupled to the lid 3812 of the grill 3800 is in a raised position. When the raised position is detected, the control board 3018 (1) signals, instructs, commands, and/or otherwise causes the PCB 3004 of the first lighting module 2310 to illuminate the light source 3006 of the first lighting module 2310, and (2) signals, instructs, commands, and/or otherwise causes the PCB 3010 of the second lighting module 2312 to illuminate the light source 3012 of the second lighting module 2312.

In response to such illumination, light emitted and/or projected by the light source 3006 of the first lighting module 2310 is directed, guided, and/or transferred by the light pipe 3008 of the first lighting module 2310 to the lens 2502 of the first lighting module 2310, and light emitted and/or projected by the light source 3012 of the second lighting module 2312 is directed, guided, and/or transferred by the light pipe 3014 of the second lighting module 2312 to the lens 2504 of the second lighting module 2312. The emitted and/or projected light is thereafter focused by the lens 2502 of the first lighting module 2310 and the lens 2504 of the second lighting module 2312, with the resultant focused light being directed and/or projected into the cooking chamber defined by the cookbox 3804 and the lid 3812 of the grill 3800, and/or onto the cooking surface formed by the cooking grate(s) 3806 of the grill 3800.

The user of the grill 3800 of FIG. 38 can thereafter deactivate (e.g., power off) the handle-integrated lighting assembly 2300 by returning the lid 3812 from the open position to the closed position. In response to the user returning the lid 3812 from the raised position to the lowered position, the control board 3018 detects (e.g., based on signals and/or data obtained from an accelerometer of the control board 3018) that the handle-integrated lighting assembly 2300 is in a lowered position. When the lowered position is detected, the control board 3018 (1) signals, instructs, commands, and/or otherwise causes the PCB 3004 of the first lighting module 2310 to cease illuminating the light source 3006 of the first lighting module 2310, and (2) signals, instructs, commands, and/or otherwise causes the PCB 3010 of the second lighting module 2312 to cease illuminating the light source 3012 of the second lighting module 2312.

Example handle-integrated lighting assemblies disclosed herein are configured to include one or more lighting module(s) located substantially within a handle of a lid of a grill, with the lighting module(s) being advantageously configured to emit and/or project light from one or more light source(s) of the lighting module(s) through one or more stem(s) of the handle, and from the stem(s) of the handle directly onto a cooking surface of the grill. Locating and/or positioning the lighting module(s) and/or, more specifically, the light source(s) of said lighting module(s) within the handle of the lid of the grill advantageously distances the lighting source(s) from being exposed to the high temperatures present in the cooking chamber of the grill, which in turn advantageously enables the lighting source(s) to be implemented as one or more high-brightness LED lamp(s) that offer superior brightness and lifespan relative to the surface-mounted halogen lamp(s) found in known commercial implementations of auxiliary and/or supplemental cooking surface lighting for grills. Locating and/or positioning the lighting module(s) within the handle of the lid of the grill also advantageously maintains the exterior of the handle of the grill in an unmodified and/or unencumbered state, which in turn advantageously maintains the user's ability to interact in an unimpeded manner with food item(s) being cooked on the cooking surface of the grill while at the same time obtaining the benefit of the cooking surface lighting provided by the handle-integrated lighting assembly of the grill. Handle-integrated lighting assemblies disclosed herein accordingly provide enhanced usability and consumer experience opportunities associated with auxiliary and/or supplemental cooking surface lighting for a lid of a grill.

In some examples, a lighting assembly is disclosed. In some disclosed examples, the lighting assembly is configured to be coupled to a lid of a grill. In some disclosed examples, the lighting assembly comprises a handle and a lighting module. In some disclosed examples, the handle includes a crossbar and a stem coupled to and oriented at an angle relative to the crossbar. In some disclosed examples, the lighting module includes a light source located within the handle. In some disclosed examples, the light source is configured to project light through the stem in a direction away from the crossbar.

In some disclosed examples, the light source is located within the stem.

In some disclosed examples, the light source is located within the crossbar.

In some disclosed examples, the light source is a light-emitting diode (LED) lamp.

In some disclosed examples, the lighting assembly further comprises a control board located within the crossbar. In some disclosed examples, the light source is operatively coupled to the control board.

In some disclosed examples, the lighting assembly further comprises a control board chassis located within the crossbar. In some disclosed examples, the control board is carried by the control board chassis.

In some disclosed examples, the control board is powered by a power source.

In some disclosed examples, the power source is located within the handle.

In some disclosed examples, the power source is a battery.

In some disclosed examples, the power source is carried by a power chassis located within the crossbar.

In some disclosed examples, the power chassis is slidably removable from within the crossbar.

In some disclosed examples, the power chassis is coupled to an end cap of the crossbar, and the end cap is threadedly coupled to the crossbar.

In some disclosed examples, the power source is located remotely from the handle.

In some disclosed examples, the power source is selectively operatively coupled to the control board by a switch. In some disclosed examples, the switch has a button actuatable to transition the switch between an open state and a closed state. In some disclosed examples, the light source is to project the light when the switch is in the closed state.

In some disclosed examples, the switch is an on/off switch.

In some disclosed examples, the switch is a momentary switch.

In some disclosed examples, the lighting module further includes a light pipe and a lens. In some disclosed examples, the light pipe is located within the stem between the light source and the lens. In some disclosed examples, the light pipe is to transfer the light from the light source to the lens.

In some disclosed examples, the lens is a double concave lens.

In some disclosed examples, the lighting assembly further comprises a bushing and a locknut. In some disclosed examples, the stem has a shaft portion and a flange. In some disclosed examples, the shaft portion is configured to extend through an exterior surface and an interior surface of the lid. In some disclosed examples, the flange is configured to support the bushing. In some disclosed examples, the bushing circumscribes the stem and has an engagement surface configured to contact the exterior surface of the lid. In some disclosed examples, the locknut is threadedly coupled to the shaft portion of the stem. In some disclosed examples, the locknut has a locking surface configured to contact the interior surface of the lid.

In some disclosed examples, the lighting assembly further comprises a fitting and a locknut. In some disclosed examples, the fitting is threadedly coupled to the stem. In some disclosed examples, the fitting has a shaft portion and a flange portion. In some disclosed examples, the shaft portion is configured to extend through an exterior surface and an interior surface of the lid. In some disclosed examples, the flange portion is configured to contact the exterior surface of the lid. In some disclosed examples, the locknut is threadedly coupled to the shaft portion of the fitting. In some disclosed examples, the locknut has a locking surface configured to contact the interior surface of the lid.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A lighting assembly configured to be coupled to a lid of a grill, the lighting assembly comprising:
a handle including a crossbar and a stem coupled to and oriented at an angle relative to the crossbar; and
a lighting module including a light source, a light pipe, and a lens, the light source located within the handle, the light source configured to project light through the stem in a direction away from the crossbar, the light pipe located within the stem between the light source and the lens, the light pipe to transfer the light from the light source to the lens.

2. The lighting assembly of claim 1, wherein the light source is located within the stem.

3. The lighting assembly of claim 1, wherein the light source is located within the crossbar.

4. The lighting assembly of claim 1, wherein the light source is a light-emitting diode (LED) lamp.

5. The lighting assembly of claim 1, further comprising a control board located within the crossbar, the light source operatively coupled to the control board.

6. The lighting assembly of claim 5, further comprising a control board chassis located within the crossbar, the control board carried by the control board chassis.

7. The lighting assembly of claim 5, wherein the control board is powered by a power source.

8. The lighting assembly of claim 7, wherein the power source is located within the handle.

9. The lighting assembly of claim 8, wherein the power source is a battery.

10. The lighting assembly of claim 8, wherein the power source is carried by a power chassis located within the crossbar.

11. The lighting assembly of claim 10, wherein the power chassis is slidably removable from within the crossbar.

12. The lighting assembly of claim 11, wherein the power chassis is coupled to an end cap of the crossbar, and the end cap is threadedly coupled to the crossbar.

13. The lighting assembly of claim 7, wherein the power source is located remotely from the handle.

14. The lighting assembly of claim 7, wherein the power source is selectively operatively coupled to the control board by a switch, the switch having a button actuatable to transition the switch between an open state and a closed state, the light source to project the light when the switch is in the closed state.

15. The lighting assembly of claim 14, wherein the switch is an on/off switch.

16. The lighting assembly of claim 14, wherein the switch is a momentary switch.

17. The lighting assembly of claim 1, wherein the lens is a double concave lens.

18. The lighting assembly of claim 1, further comprising a bushing and a locknut, the stem having a shaft portion and a flange, the shaft portion configured to extend through an exterior surface and an interior surface of the lid, the flange configured to support the bushing, the bushing circumscribing the stem and having an engagement surface configured to contact the exterior surface of the lid, the locknut threadedly coupled to the shaft portion of the stem, the locknut having a locking surface configured to contact the interior surface of the lid.

19. The lighting assembly of claim 1, further comprising a fitting and a locknut, the fitting threadedly coupled to the stem, the fitting having a shaft portion and a flange portion, the shaft portion configured to extend through an exterior surface and an interior surface of the lid, the flange portion configured to contact the exterior surface of the lid, the locknut threadedly coupled to the shaft portion of the fitting, the locknut having a locking surface configured to contact the interior surface of the lid.

20. A lighting assembly configured to be coupled to a lid of a grill, the lighting assembly comprising:
a handle including a crossbar and a stem coupled to and oriented at an angle relative to the crossbar, the stem having a shaft portion and a flange, the shaft portion configured to extend through an exterior surface and an interior surface of the lid;
a bushing configured to be supported by the flange, the bushing circumscribing the stem and having an engagement surface configured to contact the exterior surface of the lid;
a locknut threadedly coupled to the shaft portion of the stem, the locknut having a locking surface configured to contact the interior surface of the lid; and
a lighting module including a light source located within the handle, the light source configured to project light through the stem in a direction away from the crossbar and toward the lid.

21. A lighting assembly configured to be coupled to a lid of a grill, the lighting assembly comprising:
a handle including a crossbar and a stem coupled to and oriented at an angle relative to the crossbar;
a fitting threadedly coupled to the stem, the fitting having a shaft portion and a flange portion, the shaft portion configured to extend through an exterior surface and an interior surface of the lid, the flange portion configured to contact the exterior surface of the lid;
a locknut threadedly coupled to the shaft portion of the fitting, the locknut having a locking surface configured to contact the interior surface of the lid; and
a lighting module including a light source located within the handle, the light source configured to project light through the stem in a direction away from the crossbar and toward the lid.

22. A lighting assembly configured to be coupled to a lid of a grill, the lighting assembly comprising:
a handle including a crossbar and a stem, the stem oriented at an angle relative to the crossbar, the stem including a first end and a second end located opposite the first end, the first end coupled to the crossbar, the second end configured to be coupled to the lid; and
a lighting module including a light source located within the handle, the light source configured to project light through the stem in a direction away from the crossbar and toward the lid such that the light is projected through a wall of the lid into a cooking chamber of the grill, the cooking chamber defined in part by the lid.

23. The lighting assembly of claim 22, wherein the lighting module further includes a light pipe and a lens, the light pipe located within the stem between the light source and the lens, the light pipe to transfer the light from the light source to the lens.

* * * * *